United States Patent
Richter

(10) Patent No.: US 11,317,154 B1
(45) Date of Patent: Apr. 26, 2022

(54) ADAPTIVE CONTENT DELIVERY

(71) Applicant: Apple Inc., Cupertino, CA (US)

(72) Inventor: Ian M. Richter, Los Angeles, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/238,758

(22) Filed: Apr. 23, 2021

Related U.S. Application Data

(60) Provisional application No. 63/032,301, filed on May 29, 2020.

(51) Int. Cl.
*H04N 21/466* (2011.01)
*H04N 21/45* (2011.01)
*G06F 3/01* (2006.01)
*G06F 16/435* (2019.01)
*H04N 21/41* (2011.01)
*H04N 21/442* (2011.01)

(52) U.S. Cl.
CPC ......... *H04N 21/4667* (2013.01); *G06F 3/016* (2013.01); *G06F 16/435* (2019.01); *H04N 21/4126* (2013.01); *H04N 21/44222* (2013.01); *H04N 21/4532* (2013.01); *H04N 21/4661* (2013.01)

(58) Field of Classification Search
CPC ........... H04N 21/4667; H04N 21/4532; H04N 21/4661; H04N 21/4126; H04N 21/44222; G06F 16/435; G06F 3/016
See application file for complete search history.

(56) References Cited

U.S. PATENT DOCUMENTS

| | | | |
|---|---|---|---|
| 7,548,913 B2 | 6/2009 | Ekberg et al. | |
| 9,596,127 B2 | 3/2017 | Bheemarajaiah et al. | |
| 9,633,076 B1 | 4/2017 | Morton et al. | |
| 9,838,743 B2 | 12/2017 | Swaminathan et al. | |
| 10,127,457 B2 | 11/2018 | Diamond et al. | |
| 10,348,981 B1 | 7/2019 | Bostick et al. | |
| 10,380,208 B1 | 8/2019 | Brahmbhatt et al. | |
| 2003/0110236 A1* | 6/2003 | Yang | H04L 29/06 709/219 |
| 2008/0155614 A1* | 6/2008 | Cooper | G06Q 30/0601 725/91 |
| 2009/0070384 A1 | 3/2009 | Seo | |
| 2009/0177794 A1* | 7/2009 | Alexander | G06F 16/435 709/237 |
| 2009/0259654 A1 | 10/2009 | Yamamoto | |
| 2010/0169910 A1* | 7/2010 | Collins | H04N 21/25891 725/14 |

(Continued)

*Primary Examiner* — Fernando Alcon
(74) *Attorney, Agent, or Firm* — Fernando & Partners, LLP

(57) ABSTRACT

A method includes obtaining a user focus indicator value that is associated with a subject. A plurality of filter values for a respective set of media content filters are determined based on the subject and contextual data. The method includes delivering, based on a first combination of the filter values, a first set of media content items associated with a first combination of content delivery mediums. The method includes delivering, based on a second combination of the filter values that is different from the first combination, a second set of media content items that is associated with a second combination of content delivery mediums that is different from the first combination of content delivery mediums. The second set is different from the first set.

29 Claims, 28 Drawing Sheets

(56) References Cited

U.S. PATENT DOCUMENTS

| | | | |
|---|---|---|---|
| 2012/0196261 A1* | 8/2012 | Kim | G09B 7/02 |
| | | | 434/322 |
| 2012/0218089 A1* | 8/2012 | Hill | H04M 1/72457 |
| | | | 340/407.1 |
| 2016/0073162 A1* | 3/2016 | Cooperstein | H04N 21/25 |
| | | | 725/114 |
| 2016/0358225 A1 | 12/2016 | Zhang et al. | |
| 2017/0092085 A1* | 3/2017 | Agarwal | G06F 3/016 |
| 2017/0124171 A1 | 5/2017 | Hastie et al. | |

* cited by examiner

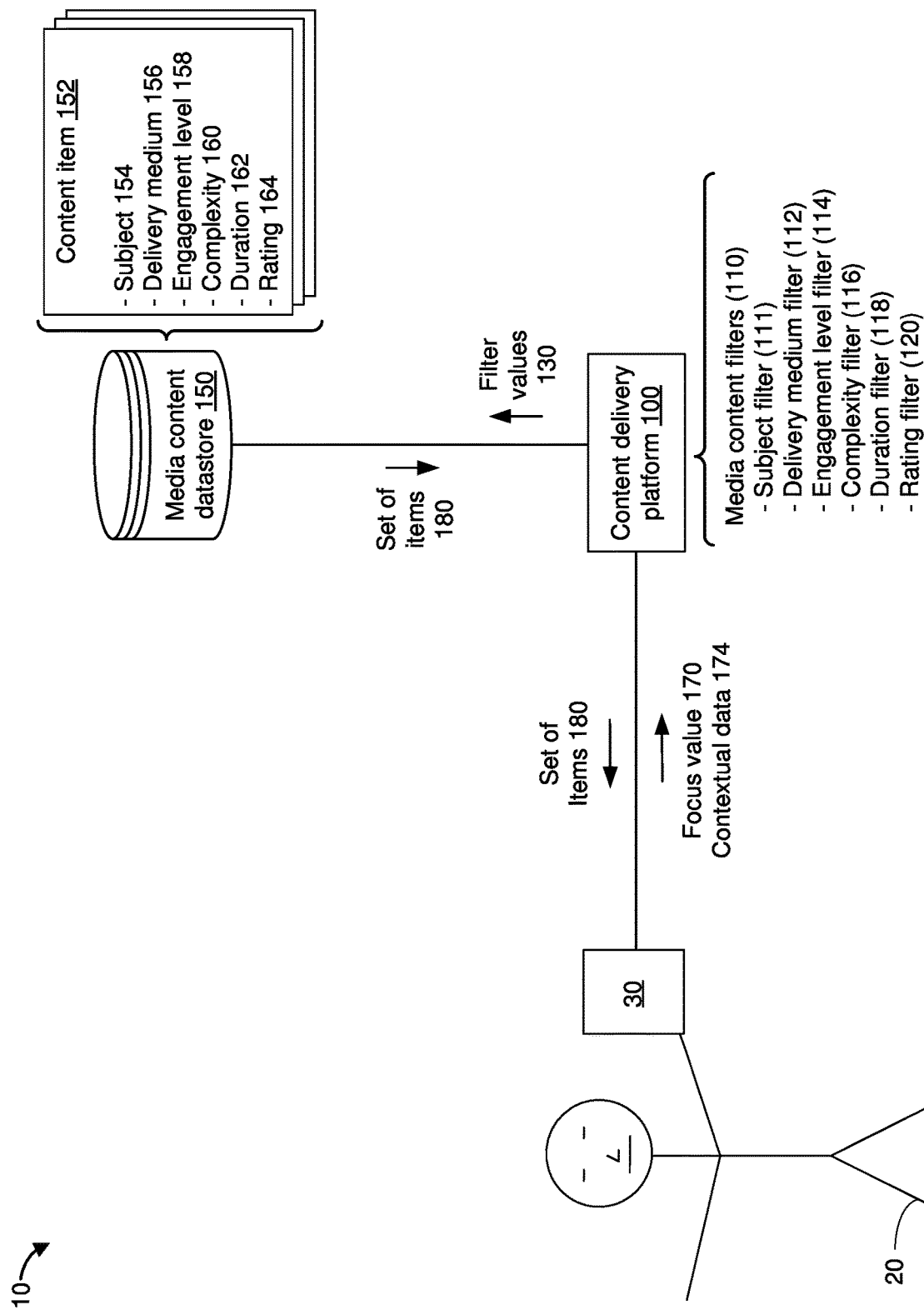

152-2

|  | 152-2a | 152-2b | 152-2c | ... | 152-2n |
|---|---|---|---|---|---|
|  |  | X |  | X | X |
| Reliable | Y | Y | Y | Y | Y |
| Current | Y | N | Y | Y | N |
| Relevant | Y | Y | Y | N | Y |

152-15

|  | Reliable | Current | Relevant |
|---|---|---|---|
| 152-15a  X | N | Y | Y |
| 152-15b | Y | Y | Y |
| 152-15c  X | Y | N | Y |
| ⋮  X | Y | Y | N |
| 152-15m | Y | Y | Y |

Figure 5F

ADAPTIVE CONTENT DELIVERY

CROSS-REFERENCE TO RELATED APPLICATION

This application claims the benefit of U.S. Provisional Patent App. No. 63/032,301, filed on May 29, 2020, which is incorporated by reference in its entirety.

TECHNICAL FIELD

The present disclosure generally relates to adaptive content delivery.

BACKGROUND

Content delivery platforms deliver media content items to users of various devices. Some content delivery platforms store various media content items. A user has to search for a desired media content item and request delivery of the desired media content item upon finding the desired media content item. Searching for the desired media content item can sometimes be resource-intensive and time-consuming.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 1A-1G are diagrams of an example operating environment in accordance with some implementations.

FIGS. 5A-5F are diagrams of another example operating environment in accordance with some implementations.

Figure 1B:
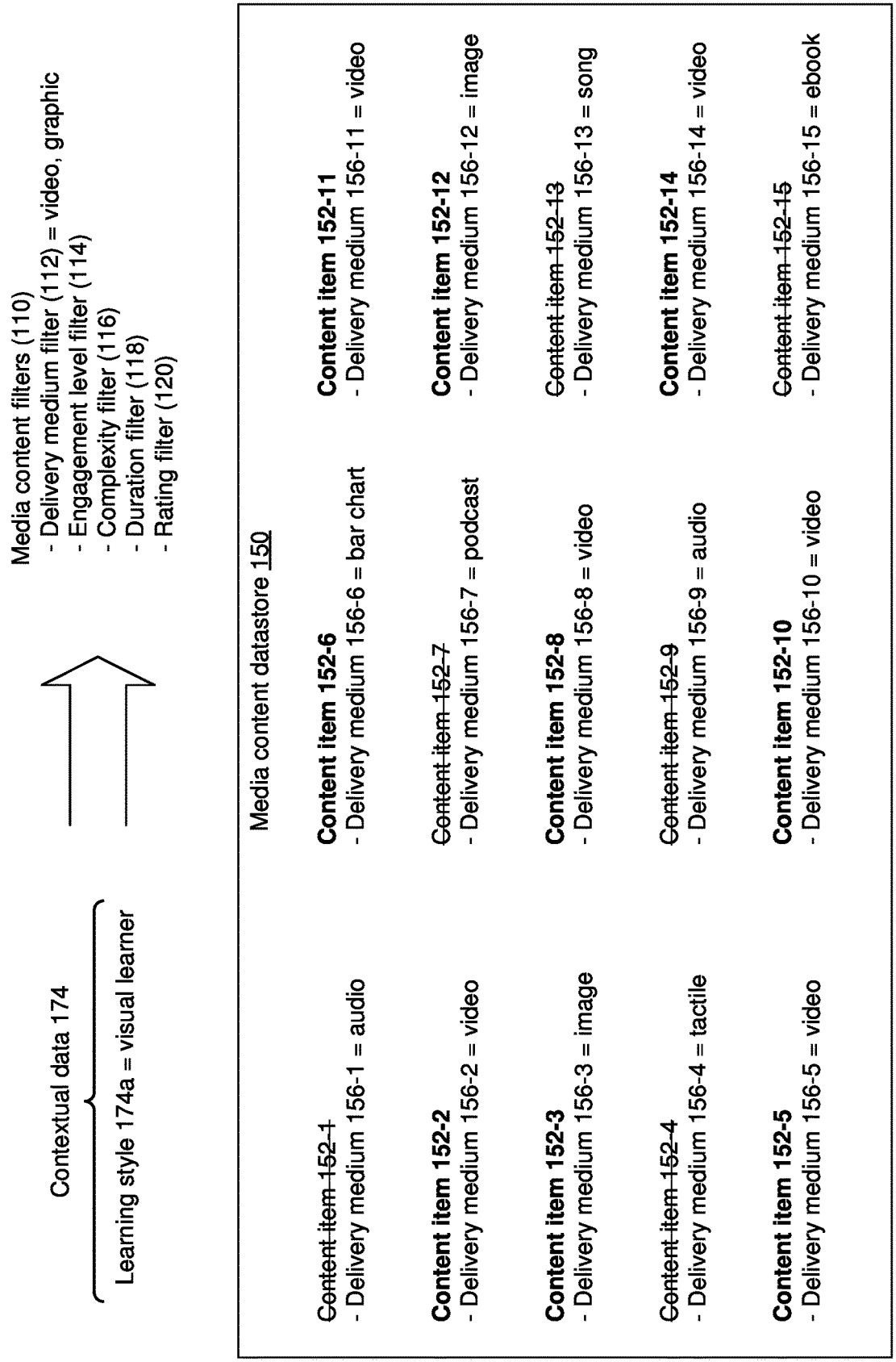

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for delivering media content items. In various implementations, a device includes a display, a non-transitory memory and one or more processors coupled with the display and the non-transitory memory. In some implementations, a method includes obtaining a user focus indicator value that is associated with a subject. In some implementations, the method includes determining a plurality of filter values for a respective set of media content filters based on the subject and contextual data associated with the device or a user of the device. In some implementations, the method includes delivering, based on a first combination of the plurality of filter values, a first set of one or more media content items that is associated with a first combination of content delivery mediums. In some implementations, the first set of one or more media content items is selected from a plurality of media content items that provide information about the subject. In some implementations, the method includes delivering, based on a second combination of the plurality of filter values that is different from the first combination, a second set of one or more media content items that are associated with a second combination of content delivery mediums that is different from the first combination of content delivery mediums. In some implementations, the second set of one or more media content items are selected from the plurality of media content items. In some implementations, the second set is different from the first set.

Various implementations disclosed herein include devices, systems, and methods for curating content that provides information regarding a subject. In various implementations, a device includes a display, a non-transitory memory and one or more processors coupled with the display and the non-transitory memory. In some implementations, a method includes obtaining a user focus indicator value that is associated with a particular subject. In some implementations, the method includes identifying, based on the user focus indicator value, a first media content item that includes information about a first plurality of subjects including a first primary subject that matches the particular subject associated with the user focus indicator value. In some implementations, the first media content item is associated with a first content delivery medium. In some implementations, the method includes identifying a second media content item that includes a second plurality of subjects including a second primary subject. In some implementations, the second plurality of subjects includes the particular subject associated with the user focus indicator value and the second media content item is associated with a second content delivery medium that is different from the first content delivery medium. In some implementations, the method includes synthesizing a third media content item based on a portion of the information included in the first media content item and a portion of the information included in the second media content item. In some implementations, the third media content item is associated with a combination of the first content delivery medium and the second content delivery medium.

Various implementations disclosed herein include devices, systems, and methods for updating a media content item. In various implementations, a device includes a display, a non-transitory memory and one or more processors coupled with the display and the non-transitory memory. In some implementations, a method includes receiving a selection request for a first media content item that includes information about a subject. In some implementations, the first media content item is generated by a first media content provider. In some implementations, the method includes identifying a set of media content items that provides information about the subject. In some implementations, at least a portion of the set of media content items is generated by a second media content provider that is different from the first media content provider. In some implementations, the method includes updating the first media content item based on the information provided by the set of media content items in order to generate an updated first media content item. In some implementations, the method includes presenting the updated first media content item.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Previously available content delivery platforms tend to present content in a manner that results in a uniform user experience. For example, if a user watched a video regarding the American Civil War ("Civil War", hereinafter for the sake of brevity), then a previously available content delivery platform may recommend similar videos regarding the Civil War. Some previously available content delivery platforms include a recommendation engine that tends to recommend content that is delivered via a particular delivery medium (e.g., a video delivery platform recommends videos) and does not recommend content that is delivered via other delivery mediums (e.g., the video delivery platform does not recommend podcasts, songs or braille). As such, some content delivery platforms fail to recommend content that is tailored to a user's context.

While the uniform user experience provided by previously available content delivery platforms provides predictability, the user experience is sometimes inappropriate. For example, presenting a documentary about the Civil War on a Sunday afternoon when the user has less energy and more receptive to passive learning that requires little or no user engagement may be appropriate. However, presenting the documentary about the Civil War during a Monday morning commute may be inappropriate because it may be unsafe for the user to watch a video while driving. Additionally or alternatively, the user may be more receptive to active learning that requires more user engagement than passive learning or is cognitively more demanding than passive learning (e.g., listening to a discussion of the documentary instead of watching another documentary). As such, sometimes the user is unable to engage with recommended content due to the restrictive recommendations of previously available content delivery platforms.

The present disclosure provides methods, systems, and/or devices for selecting media content items based on a number of context variables in order to deliver a user experience that is contextually relevant. A content delivery platform determines respective filter values for media content filters based on the context variables. The media content filters can include a content delivery medium filter, a content engagement level filter, a content complexity filter, a content duration filter and/or a content rating filter.

The content delivery platform can determine filter values based on user characteristics such as a learning style of a user and a current state of the user. The learning style can indicate whether the user is a visual learner, an auditory learner, a passive learner or an active learner. The current state of the user can include a health state of the user (e.g., tired vs. energetic), a dietary intake of the user (e.g., recent caloric input) and/or sleep history of the user (e.g., slept 8 hours vs. slept 4 hours). The current state of the user can also indicate whether the user is under stress or sick. The content delivery platform can determine filter values based on devices that are proximate to the user (e.g., select high definition (HD) movie when there is an HDTV near the user).

Different filter values result in different media content items being selected thereby resulting in different user experiences for the same subject. Filter values based on a first state of the user (e.g., low energy or lack of alertness) result in the selection of a first media content item. For example, the content delivery platform presents a documentary related to the Civil War when contextual data indicates that the user has a passive learning style, the user is tired, the user recently had an eight hundred calorie meal, and there is a TV near the user. By contrast, filter values based on a second state of the user (e.g., energetic or alert) result in the selection of a second media content item. For example, the content delivery platform presents a Civil War discussion between history scholars when the contextual data indicates that the user has a passive learning style, the user is alert, the user had his/her morning coffee, and there is a speaker near the user.

Utilizing contextual data to filter media content items results in the selection and presentation of contextually-relevant media content items thereby enhancing a user experience of the user. Filtering media content items based on contextual data allows a device to present media content items that the user is more likely to engage with thereby enhancing a user experience of the user. Determining filter values based on the contextual data reduces a need for the user to provide user inputs that correspond to manually setting the filter values. Reducing user inputs tends to prolong a battery of a battery-operated device thereby improving an operability of the device.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 30, a content delivery platform 100 and a media content datastore 150. In some implementations, the electronic device 30 includes a handheld computing device that can be held by a user 20. For example, in some implementations, the electronic device 30 includes a smartphone, a tablet, a media player, a laptop, or the like. In some implementations, the electronic device 30 includes a wearable computing device that can be worn by the user 20. For example, in some implementations, the electronic device 30 includes a head-mountable device (HMD), an electronic watch or a pair of headphones.

Although the content delivery platform 100 is shown as being separate from the electronic device 30. In some implementations, the content delivery platform 100 is integrated into the electronic device 30. Although the media content datastore 150 is shown as being separate from the content delivery platform 100. In some implementations, the media content datastore 150 is integrated into the content delivery platform 100. In some implementations, the content delivery platform 100 and/or the media content datastore 150 reside at the electronic device 30.

In various implementations, the media content datastore 150 stores various media content items 152. A media content item 152 (e.g., each media content item 152) provides information regarding a subject 154. For example, a subject 154 of a particular media content item 152 may include the Civil War. In some implementations, a media content item 152 includes information regarding a primary subject and information regarding other secondary subjects. For example, a primary subject of a particular media content item 152 may include the Civil War and a secondary subject of the media content item 152 may include musket.

In various implementations, a media content item 152 (e.g., each media content item 152) is associated with a content delivery medium 156 ("delivery medium 156", hereinafter for the sake of brevity). In some implementations, the media content item 152 provides information regarding the subject 154 via the delivery medium 156 associated with the media content item 152. An example of the delivery medium 156 includes visual delivery such as a video, text such as an ebook, a research paper and a blog article, and a graphic such as an image, a pie chart and a bar chart. Another example of the delivery medium 156 includes audio delivery such as a podcast, a song, a radio station and audio portion of a video. Another example of the delivery medium includes tactile delivery such as a set of haptic feedbacks, for example, braille.

In various implementations, a media content item 152 (e.g., each media content item 152) is associated with a content engagement level 158 ("engagement level 158", hereinafter for the sake of brevity). In some implementations, the engagement level 158 indicates an amount of user interaction that the media content item 152 induces. For example, in some implementations, the engagement level 158 indicates whether or not the media content item 152 requires the user 20 to participate (e.g., by answering questions posed in the media content item 152). In some implementations, if the engagement level 158 of the media content item 152 has a value that is below a threshold engagement level (e.g., the value corresponds to low engagement), then an amount of user interaction that the media content item 152 induces is below a threshold user interaction (e.g., the media content item 152 does not require the user 20 to participate). In some implementations, if the engagement level 158 of the media content item 152 has a value that is above the threshold engagement level (e.g., the value corresponds to high engagement), then an amount of user interaction that the media content item 152 induces is above the threshold user interaction (e.g., the media content item 152 requires the user 20 to participate, for example, by answering questions or performing an accompanying activity).

In various implementations, a media content item 152 (e.g., each media content item 152) is associated with a content complexity 160 ("complexity 160", hereinafter for the sake of brevity). In some implementations, the complexity 160 indicates an amount of cognition associated with the media content item 152 (e.g., an amount of cognition required to comprehend the information provided by the media content item 152). In some implementations, the complexity 160 indicates an amount of cognitive brain power that the user 20 has to expend in order to comprehend the media content item 152. In some implementations, if the complexity 160 of the media content item 152 has a value that is below a threshold complexity (e.g., the value corresponds to low complexity), then an amount of cognitive brain power that the user 20 has to expend to comprehend the media content item 152 is below a threshold cognitive brain power (e.g., the user 20 can likely comprehend the information provided by the media content item 152 with relative ease). In some implementations, if the complexity 160 of the media content item 152 has a value that is above the threshold complexity (e.g., the value corresponds to high complexity), then an amount of cognitive brain power that the user 20 has to expend to comprehend the media content item 152 is above the threshold cognitive brain power (e.g., the user 20 may have some difficulty in comprehending the information provided by the media content item 152).

In various implementations, a media content item 152 (e.g., each media content item 152) is associated with a content duration 162 ("duration 162", hereinafter for the sake of brevity). In some implementations, the duration 162 indicates a time duration of the media content item 152. For example, if the media content item 152 is a video, then the duration 162 indicates a length of the video. In some implementations, the duration 162 indicates an amount of time that the user 20 may require to comprehend the information provided by the media content item 152. For example, if the media content item 152 is a graphic (e.g., an image or a chart), then the duration 162 may indicate an amount of time that the user 20 may require to understand the information provided by the graphic.

In various implementations, a media content item 152 (e.g., each media content item 152) is associated with a content rating 164 ("rating 164", hereinafter for the sake of brevity). In some implementations, the rating 164 indicates an age group that the media content item 152 is suitable for. In some implementations, the rating 164 has a value that indicates that the media content item 152 is suitable for all audiences (e.g., the rating 164 has a value of General (G)). In some implementations, the rating 164 has a value that indicates that portions of the media content item 152 may not be suitable for children (e.g., the rating 164 has a value of Parental Guidance suggested (PG)). In some implementations, the rating 164 has a value that indicates that the media content item 152 contains some adult material (e.g., the rating 164 has a value of Restricted (R)). In some implementations, a value of the rating 164 is set in accordance with the Motion Picture Associated of America (MPAA) rating system.

In various implementations, the content delivery platform 100 obtains a user focus indicator value 170 that indicates a subject that the user 20 is interested in learning about. In some implementations, the content delivery platform 100 receives the user focus indicator value 170 from the electronic device 30. For example, in some implementations, the user 20 specifies the user focus indicator value 170. In some implementations, the content delivery platform 100 determines the user focus indicator value 170 based on the subject 154 of media content items 152 that the electronic device 30 has previously presented to the user 20 within a threshold amount of time (e.g., within the last 24 hours).

In some implementations, the content delivery platform 100 obtains contextual data 174 that is associated with the electronic device 30 or with the user 20 of the electronic device 30. In some implementations, the content delivery platform 100 receives the contextual data 174 from the electronic device 30. In some implementations, the contextual data 174 includes sensor data that is captured by sensors of the electronic device 30. For example, in some implementations, the contextual data 174 includes a location of the electronic device 30. In some implementations, the contextual data 174 indicates which other devices are proximate to the electronic device 30.

In some implementations, the contextual data 174 indicates user characteristics of the user 20. For example, in some implementations, the contextual data 174 indicates a learning style of the user 20 (e.g., the contextual data 174 indicates whether the user 20 is a visual learner, an auditory learner, an active learner, a passive learner, etc.).

A visual learner generally refers to a person that prefers to learn information regarding a subject by viewing visual content such as images or videos. As such, in various implementations, a visual learner tends to prefer media content items 152 in which the delivery medium 156 corresponds to visual delivery. For example, a visual learner tends to prefer media content items 152 that include images or videos.

An auditory learner generally refers to a person that prefers to learn information regarding a subject by listening to auditory content such as podcasts, audiobooks or music. As such, in various implementations, an auditory learner tends to prefer media content items 152 in which the delivery medium 156 corresponds to aural delivery. For example, an auditory learner tends to prefer media content items 152 that include podcasts, audiobooks, music, etc.

An active learner generally refers to a person that prefers to learn information regarding a subject by actively participating in an activity that leads to discovery of the information. For example, an active learner may prefer to learn information regarding a subject by answering questions. An active learner may refer to a person that enjoys hands-on learning (e.g., a person that learns by performing a physical activity). In some implementations, an active learner is referred to as a kinesthetic learner. As such, in various implementations, an active learner tends to prefer media content items 152 in which the engagement level 158 is greater than a threshold engagement level (e.g., media content items 152 that require a relatively high level of engagement).

A passive learner generally refers to a person that prefers to learn information regarding a subject via passive participation, for example, instead of active participation. For example, a passive learner may prefer to watch or listen to a media content item 152 without having to answer questions or perform a physical activity to discover the information provided by the media content item 152. A passive learner may refer to a person that does not enjoy hands-on learning. As such, in various implementations, a passive learner tends to prefer media content items 152 in which the engagement level 158 is less than the threshold engagement level (e.g., media content items 152 that require a relatively low level of engagement).

In some implementations, the contextual data 174 indicates a current state of the user 20 (e.g., a current health state of the user 20). For example, in some implementations, the contextual data 174 indicates an energy level of the user (e.g., whether the user is tired or fresh). In some implementations, the contextual data 174 indicates an alertness level of the user (e.g., whether the user has had his/her morning coffee). In some implementations, the contextual data 174 indicates a drowsiness level of the user (e.g., whether the user is sleepy or wide awake).

In various implementations, the content delivery platform 100 determines the current state of the user 20 based on sensor data from a set of one or more sensors in the electronic device 30 (e.g., an image sensor, a heart rate sensor, etc.). In some implementations, the content delivery platform 100 determines the current state of the user 20 by performing facial analysis on a facial image of the user 20 captured by the electronic device 30. For example, the content delivery platform 100 may determine that the user 20 is sleepy if the user's eyes are open less than a threshold amount (e.g., the user's eyes appear droopy). In some implementations, the content delivery platform 100 determines the current state of the user 20 based on a heart rate of the user. For example, the content delivery platform 100 may determine that the user is under stress when an average heart rate of the user 20 is greater than a threshold heart rate. In some implementations, the content delivery platform 100 obtains a user input that indicates the current state of the user 20 (e.g., the user 20 specifies whether the user 20 is tired, energetic, alert, sleepy, etc.).

In various implementations, the content delivery platform 100 utilizes a set of one or more media content filters 110 to filter the media content items 152 and generate a set 180 of one or more media content items 152. The content delivery platform 100 delivers (e.g., transmits) the set 180 to the electronic device 30. In various implementations, the content delivery platform 100 determines filter values 130 for the media content filters 110 based on the user focus indicator value 170 and the contextual data 174.

In various implementations, the media content filters 110 include a content subject filter 111 ("subject filter 111", hereinafter for the sake of brevity). In some implementations, the content delivery platform 100 determines a filter value 130 for the subject filter 111 based on the user focus indicator value 170. For example, if the user focus indicator value 170 indicates that the user 20 is interested in learning about the Civil War, then the content delivery platform 100 sets a filter value 130 of the subject filter 111 to the Civil War.

In various implementations, the media content filters 110 include a content delivery medium filter 112 ("delivery medium filter 112", hereinafter for the sake of brevity). In some implementations, the content delivery platform 100 determines a filter value 130 for the delivery medium filter 112 based on the contextual data 174. In some implementations, the content delivery platform 100 set a filter value 130 of the delivery medium filter 112 to visual delivery when the contextual data 174 indicates that the user 20 is a visual learner. In some implementations, the content delivery platform 100 sets a filter value 130 of the delivery medium filter 112 to audio delivery when the contextual data 174 indicates that the user 20 is performing a task such as driving and cannot look at visual content. In some implementations, the content delivery platform 100 set a filter value 130 of the delivery medium filter 112 to tactile delivery when the contextual data 174 indicates that the electronic device 30 is in an accessibility mode. Controlling the delivery medium 156 of the set 180 of media content items 152 based on the contextual data 174 increases a likelihood of the user 20 engaging with the set 180 of media content items 152 thereby enhancing a user experience provided by the electronic device 30.

In various implementations, the media content filters 110 include a content engagement level filter 114 ("engagement level filter 114", hereinafter for the sake of brevity). In some implementations, the content delivery platform 100 determines a filter value 130 for the engagement level filter 114 based on the contextual data 174. In some implementations, the content delivery platform 100 sets a filter value 130 of the engagement level filter 114 to a value that is below a threshold engagement level (e.g., to a relatively low engagement level) when the contextual data 174 indicates that the user 20 is a passive learner (e.g., when the contextual data 174 indicates that the user 20 does not like to participate while learning). Controlling the engagement level 158 of the set 180 of media content items 152 based on the contextual data 174 increases a likelihood of the set 180 of media content items 152 matching a current state of the user 20 thereby enhancing a user experience provided by the electronic device 30.

In various implementations, the content delivery platform 100 sets a filter value 130 of the engagement level filter 114 based on a current state (e.g., a current health state) of the user 20. In some implementations, the content delivery platform 100 sets a filter value 130 of the engagement level filter 114 to a value that is above the threshold engagement level (e.g., to a relatively high engagement level) when the contextual data 174 indicates that an energy level of the user 20 is above a threshold energy level (e.g., when the contextual data 174 indicates that the user 20 has sufficient energy to participate, for example, answer questions). In some implementations, the content delivery platform 100 sets the filter value 130 of the engagement level filter 114 to a value that is below the threshold engagement level (e.g., to a relatively low engagement level) when the contextual data 174 indicates that the energy level of the user 20 is below the threshold energy level (e.g., when the contextual data 174 indicates that the user 20 is tired and does not have sufficient energy to participate, for example, answer questions).

In various implementations, the media content filters 110 include a content complexity filter 116 ("complexity filter 116", hereinafter for the sake of brevity). In some implementations, the content delivery platform 100 determines a filter value 130 for the complexity filter 116 based on the contextual data 174. In some implementations, the content delivery platform 100 sets a filter value 130 of the complexity filter 116 to a value that is below a threshold complexity (e.g., to a relatively low complexity) when the contextual data 174 indicates that the user 20 is tired or drowsy. In some implementations, the content delivery platform 100 sets a filter value 130 of the complexity filter 116 to a value that is above the threshold complexity (e.g., to a relatively high complexity) when the contextual data 174 indicates that the user 20 is alert or wide awake. Controlling the complexity 160 of the set 180 of media content items 152 based on the contextual data 174 increases a likelihood of the user 20 comprehending the information provided by the set 180 of media content items 152 thereby enhancing a user experience provided by the electronic device 30.

In various implementations, the media content filters 110 include a content duration filter 118 ("duration filter 118", hereinafter for the sake of brevity). In some implementations, the content delivery platform 100 determines a filter value 130 for the duration filter 118 based on the contextual data 174. In some implementations, the content delivery platform 100 sets a filter value 130 of the duration filter 118 based on an amount of time between a current time and a start time of an upcoming calendar event. For example, if the upcoming calendar event is in 45 minutes, then the content delivery platform 100 sets the filter value 130 of the duration filter 118 to less than 30 minutes. In some implementations, the content delivery platform 100 sets a filter value 130 of the duration filter 118 based on a current health state of the user 20. For example, if the user 20 appears drowsy, then the content delivery platform 100 sets the filter value 130 of the duration filter 118 based on an average amount of time that the user 20 takes to fall asleep. For example, if the user 20 falls asleep within 20 minutes on average, then the content delivery platform 100 sets the filter value 130 of the duration filter 118 to a value between 15 minutes and 30 minutes. Controlling the duration 162 of the set 180 of media content items 152 based on the contextual data 174 reduces a likelihood of the electronic device 30 playing the set 180 of media content items 152 when the user 20 is not engaging with the set of 180 of media content items 152 thereby reducing a battery consumption of the electronic device 30 and improving an operability of the electronic device 30.

In various implementations, the media content filters 110 include a content rating filter 120 ("rating filter 120", hereinafter for the sake of brevity). In some implementations, the content delivery platform 100 determines a filter value 130 for the rating filter 120 based on the contextual data 174. In some implementations, the content delivery platform 100 sets a filter value 130 of the rating filter 120 based on an estimated age of the user 20. For example, if the estimated age of the user 20 is less than 10 years, then the content delivery platform 100 sets the filter value 130 of the rating filter 120 to a value that corresponds to a rating that is suitable for all audiences (e.g., General (G)). In some implementations, the content delivery platform 100 sets a filter value 130 of the rating filter 120 based on an estimated age of a person within a threshold distance of the user 20. For example, if the user 20 is near his/her child, then the content delivery platform 100 sets the filter value to a rating that is suitable for kids (e.g., G). Controlling the rating 164 of the set 180 of media content items 152 based on the contextual data 174 increases a likelihood of the set 180 of the media content items 152 being relevant and/or age-appropriate to the user 20 and/or to a person near the user 20.

In various implementations, the content delivery platform 100 generates the set 180 of media content items 152 by retrieving media content items 152 that satisfy the filter values 130 for the media content filters 110. In some implementations, the content delivery platform 100 filters out media content items 152 that do not satisfy the filter values 130 of the media content filters 110. As such, the content delivery platform 100 forgoes including media content items 152 that breach the filter values 130 of the media content filters 110 into the set 180. In various implementations, the content delivery platform 100 delivers (e.g., transmits) the set 180 of the media content items 152 to the electronic device 30.

In the example of FIG. 1B, the media content datastore 150 includes a first media content item 152-1, a second media content item 152-2, . . . , and a fifteenth media content item 152-15. Each media content item 152 in the media content datastore 150 is associated with a content delivery medium value ("delivery medium value", hereinafter for the sake of brevity). The first media content item 152-1 has a first delivery medium value 156-1 indicating that the first media content item 152-1 includes audio. For example, the first media content item 152-1 may include an audiobook, a podcast or a song. The second media content item 152-2 has a second delivery medium value 156-2 indicating that the second media content item 152-2 includes video content. For example, the second media content item 152-2 is a video clip, a documentary or a movie. The third media content item 152-3 has a third delivery medium value 156-3 that corresponds to an image. For example, the third media content item 152-3 includes a picture. The fourth media content item 152-4 has a fourth delivery medium value 156-4 that corresponds to tactile delivery. For example, the fourth media content item 152-4 includes haptic content (e.g., vibrational responses, pneumatic responses or braille-style content).

The fifth media content item 152-5 has a fifth delivery medium value 156-5 that corresponds to video. The sixth media content item 152-6 has a sixth delivery medium value 156-6 that corresponds to a bar chart. The seventh media content item 152-7 has a seventh delivery medium value 156-7 indicating that the seventh media content item 152-7 is a podcast. The eighth media content item 152-8 has an eighth delivery medium value 156-8 indicating that the eighth media content item 152-8 is a video. The ninth media content item 152-9 has a ninth delivery medium value 156-9 indicating that the ninth media content item 152-9 includes audio content.

The tenth media content item 152-10 has a tenth delivery medium value 156-10 indicating that the tenth media content item 152-10 is a video. The eleventh media content item 152-11 has an eleventh delivery medium value 156-11 indicating that the eleventh media content item 152-11 is a video. The twelfth media content item 152-12 has a twelfth delivery medium value 156-12 indicating that the twelfth media content item 152-12 is an image. The thirteenth media content item 152-13 has a thirteenth delivery medium value 156-13 indicating that the thirteenth media content item 152-13 is a song. The fourteenth media content item 152-14 has a fourteenth delivery medium value 156-14 indicating that the fourteenth media content item 152-14 is a video. The fifteenth media content item 152-15 has a fifteenth delivery medium value 156-15 indicating that the fifteenth media content item 152-15 is an ebook.

In the example of FIG. 1B, the contextual data 174 indicates that a learning style 174a of the user 20 corresponds to a visual learner. The content delivery platform 100 sets a value of the delivery medium filter 112 to video and graphic based on the learning style 174a indicating that the user 20 is a visual learner. Since the user 20 is a visual learner, setting the value of the delivery medium filter 112 to video and graphic filters out audio content such as audiobooks and textual context such as ebooks. The content delivery platform 100 filters out the first media content item 152-1 (as indicated by the strike-through) because the first media content item 152-1 is audio content and not a video or a graphic. The content delivery platform 100 filters out the fourth media content item 152-4 (as indicated by the strike-through) because the fourth media content item 152-4 is tactile content and not a video or a graphic. The content delivery platform 100 filters out the seventh media content item 152-7 (as indicated by the strike-through) because the seventh media content item 152-7 is a podcast and not a video or a graphic. The content delivery platform 100 filters out the ninth media content item 152-9 (as indicated by the strike-through) because the ninth media content item 152-9 is an audio and not a video or a graphic. The content delivery platform 100 filters out the thirteenth media content item 152-13 (as indicated by the strike-through) because the thirteenth media content item 152-13 is a song and not a video or a graphic. The content delivery platform 100 filters out the fifteenth media content item 152-15 (as indicated by the strike-through) because the fifteenth media content item 152-15 is an ebook and not a video or a graphic. In the example of FIG. 1B, the set 180 of media content items 152 includes the second media content item 152-2, the third media content item 152-3, the fifth media content item 152-5, the sixth media content item 152-6, the eighth media content item 152-8, the tenth media content item 152-10, the eleventh media content item 152-11, the twelfth media content item 152-12, and the fourteenth media content item 152-14.

Figure 1C:
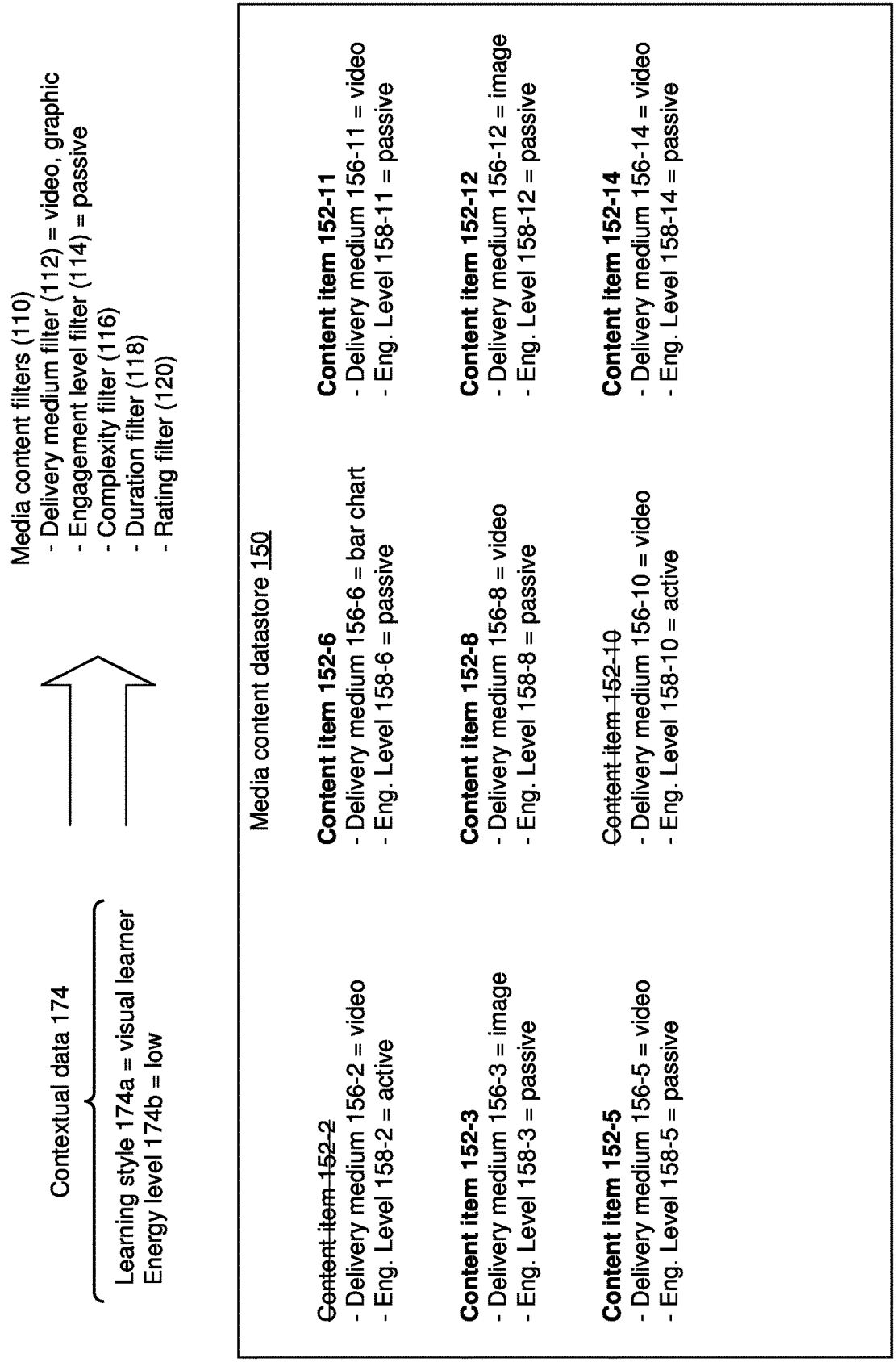

In the example of FIG. 1C, the contextual data 174 further indicates that an energy level 174b of the user 20 is low. In some implementations, the energy level 174b includes a value that is below a threshold energy value. In some implementations, the energy level 174b includes a biological measurement of the user 20, for example, a blood glucose measurement of the user 20. In some implementations, the blood glucose measurement of the user 20 is below a threshold blood glucose measurement. In some implementations, the contextual data 174 indicates a body pose of the user 20, and the content delivery platform 100 determines the energy level 174b based on the body pose. For example, if the body pose of the user 20 indicates that the user 20 is slouching, then the content delivery platform 100 determines that an energy level of the user 20 is below a threshold energy level (e.g., the user 20 has low energy). By contrast, if the body pose of the user 20 indicates that the user 20 is sitting up straight, then the content delivery platform 100 determines that an energy level of the user 20 is greater than the threshold energy level (e.g., the user 20 has high energy). In some implementations, the contextual data 174 includes a set of facial images of the user 20, and the content delivery platform 100 determines the energy level 174b based on the set of facial images. For example, if the facial images indicate that the user 20 is closing his/her eyes more frequently than a threshold rate for closing eyes, then the content delivery platform 100 determines that the user 20 has low energy.

In some implementations, each media content item 152 in the media content datastore 150 is associated with an engagement level value. The second media content item 152-2 has an engagement level value 158-2 indicating that the second media content item 152-2 likely requires active participation from the user 20 (e.g., the second media content item 152-2 requires the user 20 to answer questions or to think critically). Similar to the second media content item 152-2, the tenth media content item 152-10 has an engagement level value 158-10 indicating that the tenth media content item 152-10 likely requires active participation from the user 20.

The third media content item 152-3 has an engagement level value 158-3 indicating that the third media content item 152-3 is suitable for passive consumption (e.g., the third media content item 152-3 does not require active participation from the user 20, for example, the third media content item 152-3 does not require the user 20 to answer questions or to think critically). Similar to the third media content item 152-3, the fifth media content item 152-5, the sixth media content item 152-6, the eighth media content item 152-8, the eleventh media content item 152-11, the twelfth media content item 152-12 and the fourteenth media content item 152-14 have engagement level values 158-3, 158-5, 158-6, 158-8, 158-11, 158-12 and 158-14, respectively, indicative of delivering information in a passive manner (e.g., not requiring the user 20 to answer questions or to think critically).

Since the energy level 174b of the user 20 is low, the content delivery platform 100 sets a value of the engagement level filter 114 to passive content. As such, the content delivery platform 100 filters out the second media content item 152-2 and the tenth media content item 152-10 (as indicated by the strike-through) because of the requisite active participation. In the example of FIG. 1C, the set 180 of media content items 152 includes the third media content item 152-3, the fifth media content item 152-5, the sixth media content item 152-6, the eighth media content item 152-8, the eleventh media content item 152-11, the twelfth media content item 152-12 and the fourteenth media content item 152-14.

Figure 1D:
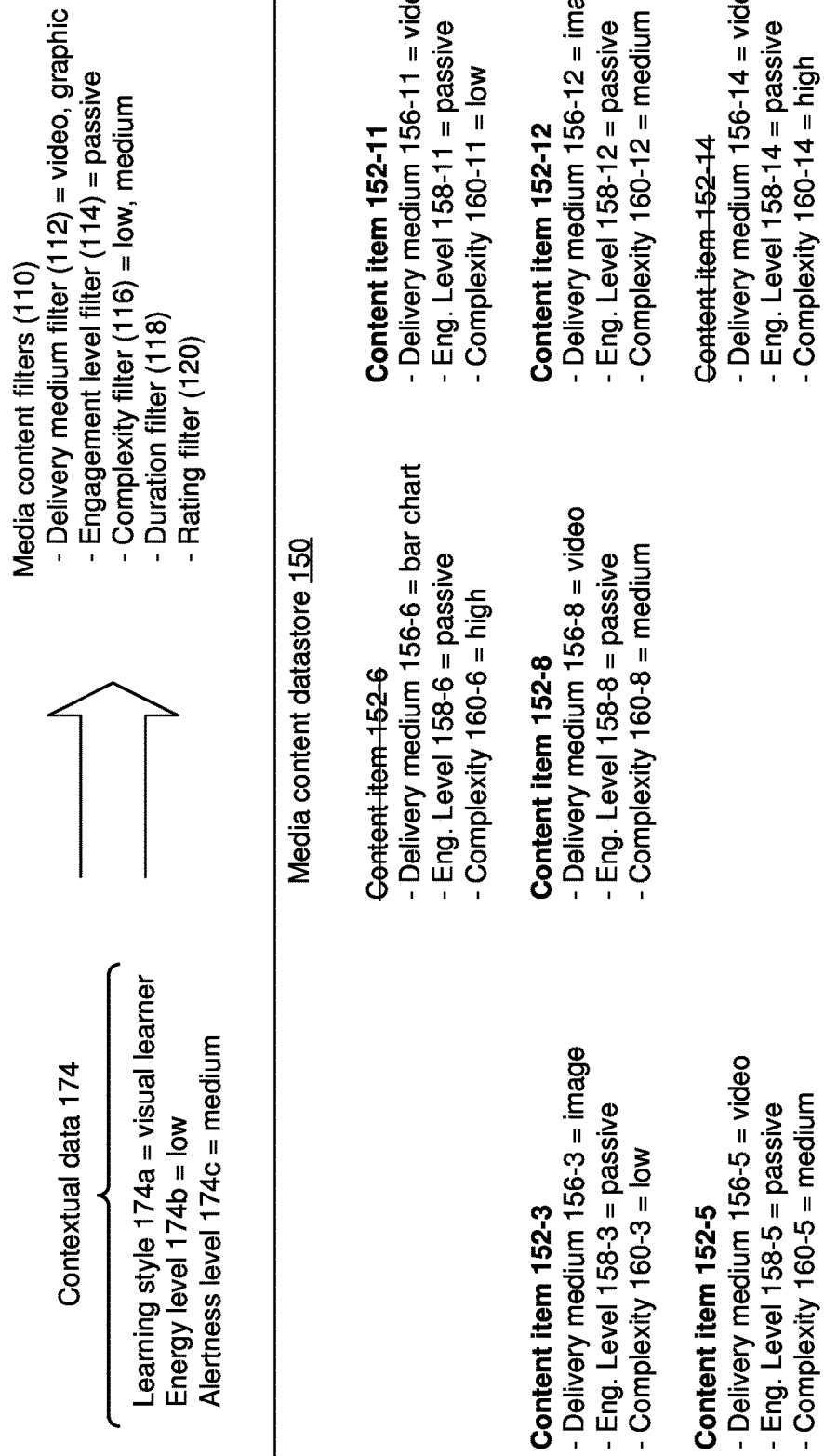

In the example of FIG. 1D, the contextual data 174 further indicates that an alertness level 174c of the user 20 is medium (e.g., because, based on sleep tracking data and dietary intake data, the user 20 woke up and had a coffee recently). In some implementations, the alertness level 174c includes a value that is between two threshold alertness values. In some implementations, the alertness level 174c includes a biological measurement of the user 20, for example, a global oscillatory power of the user 20 and/or a brain wave being exhibited by the user 20. In some implementations, the contextual data 174 indicates a body pose of the user 20, and the content delivery platform 100 determines the alertness level 174c based on the body pose. For example, if the body pose of the user 20 indicates that the user 20 is slouching, then the content delivery platform 100 determines that the user 20 is at an alertness level that is between two threshold alertness levels (e.g., a medium alertness level). By contrast, if the body pose of the user 20 indicates that the user 20 is sitting up straight, then the content delivery platform 100 determines that the user 20 is at an alertness level that is greater than a threshold alertness level (e.g., a high alertness level). In some implementations, the contextual data 174 includes a set of facial images of the user 20, and the content delivery platform 100 determines the alertness level 174c based on the set of facial images. For example, if the facial images indicate that the user 20 is closing his/her eyes more frequently than a threshold rate for closing eyes, then the content delivery platform 100 determines that the user 20 is at an alertness level that is below a threshold alertness level (e.g., a low alertness level).

In some implementations, each media content item 152 in the media content datastore 150 is associated with a complexity value. The third media content item 152-3 has a complexity value 160-3 indicating that the third media content item 152-3 includes information that is of low complexity (e.g., given the alertness level 174c of the user 20, the user 20 can likely understand the information provided by the third media content item 152-3 with relative ease). Similar to the third media content item 152-3, the eleventh media content item 152-11 has a complexity value 160-11 indicating that the eleventh media content item 152-11 includes information that is of low complexity. In some implementations, the complexity values 160-3 and 160-11 are low because the complexity values 160-3 and 160-11 are below a threshold complexity value.

The fifth media content item 152-5 has a complexity value 160-5 indicating that the fifth media content item 152-5 includes information that is of medium complexity (e.g., given the alertness level 174c of the user 20, the user 20 can likely understand the information provided by the fifth media content item 152-5 with some effort). Similar to the fifth media content item 152-5, the eighth media content item 152-8 and the twelfth media content item 15-12 have complexity values 160-8 and 160-12, respectively, indicative of medium complexity information.

The sixth media content item 152-6 and the fourteenth media content item 152-14 have complexity values 160-6 and 160-14, respectively, indicative of high complexity information. Given the alertness level 174c of the user 20, the user 20 will likely have great difficulty in understanding the information provided by the sixth media content item 152-6 and the fourteenth media content item 152-14. As a result, the content delivery platform 100 filters out the sixth media content item 152-6 and the fourteenth media content item 152-14 (as indicated by the strike-through). In the example of FIG. 1D, the set 180 of media content items 152 includes the third media content item 152-3, the fifth media content item 152-5, the eighth media content item 152-8, the eleventh media content item 152-11 and the twelfth media content item 152-12.

Figure 1E:
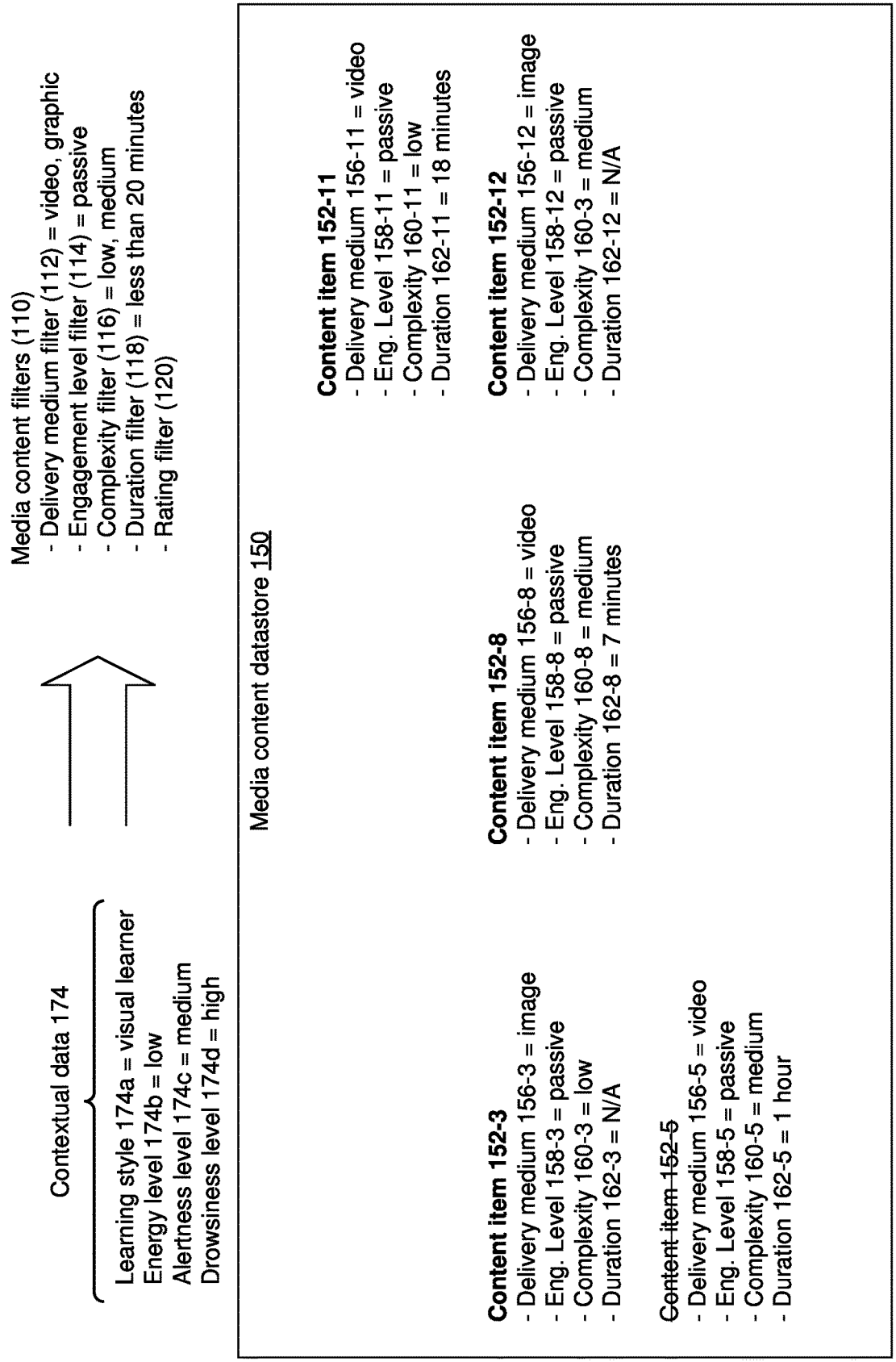

In the example of FIG. 1E, the contextual data 174 further indicates that a drowsiness level 174d of the user 20 is high (e.g., because, based on a set of facial images of the user 20, eyelids of the user 20 are closed more than a threshold amount of time or the user 20 is yawning more than a threshold number of times). In some implementations, the drowsiness level 174d is low because a value of the drowsiness level 174d is greater than a threshold drowsiness value. In some implementations, the drowsiness level 174d includes a physiological measurement of the user 20, for example, position of eyelids.

In some implementations, each media content item 152 in the media content datastore 150 is associated with a duration value indicating a time length of the media content item 152. The fifth media content item 152-5 has a duration value 162-5 of one hour. The eighth media content item 152-8 has a duration value 162-8 of seven minutes. The eleventh media content item 152-11 has a duration value 162-11 of eighteen minutes. The third media content item 152-3 and the twelfth media content item 152-12 have duration values 162-3 and 162-12, respectively, that are null because the third media content item 152-3 and the twelfth media content item 152-12 are images.

In the example of FIG. 1E, the content delivery platform 100 determines that, since the user 20 is very drowsy, the user 20 will likely not be able to watch a media content item 152 that is longer than a threshold amount of time (e.g., thirty minutes). As such, the content delivery platform 100 filters out the fifth media content item 152-5 (as indicated by the strike-through). In some implementations, the content delivery platform 100 determines the threshold amount of time based on an estimated amount of time that the user 20 will take to fall asleep (e.g., based on prior sleep patterns and the drowsiness level 174d). In the example of FIG. 1E, the set 180 of media content items 152 includes the third media content item 152-3, the eighth media content item 152-8, the eleventh media content item 152-11 and the twelfth media content item 152-12.

Figure 1F:
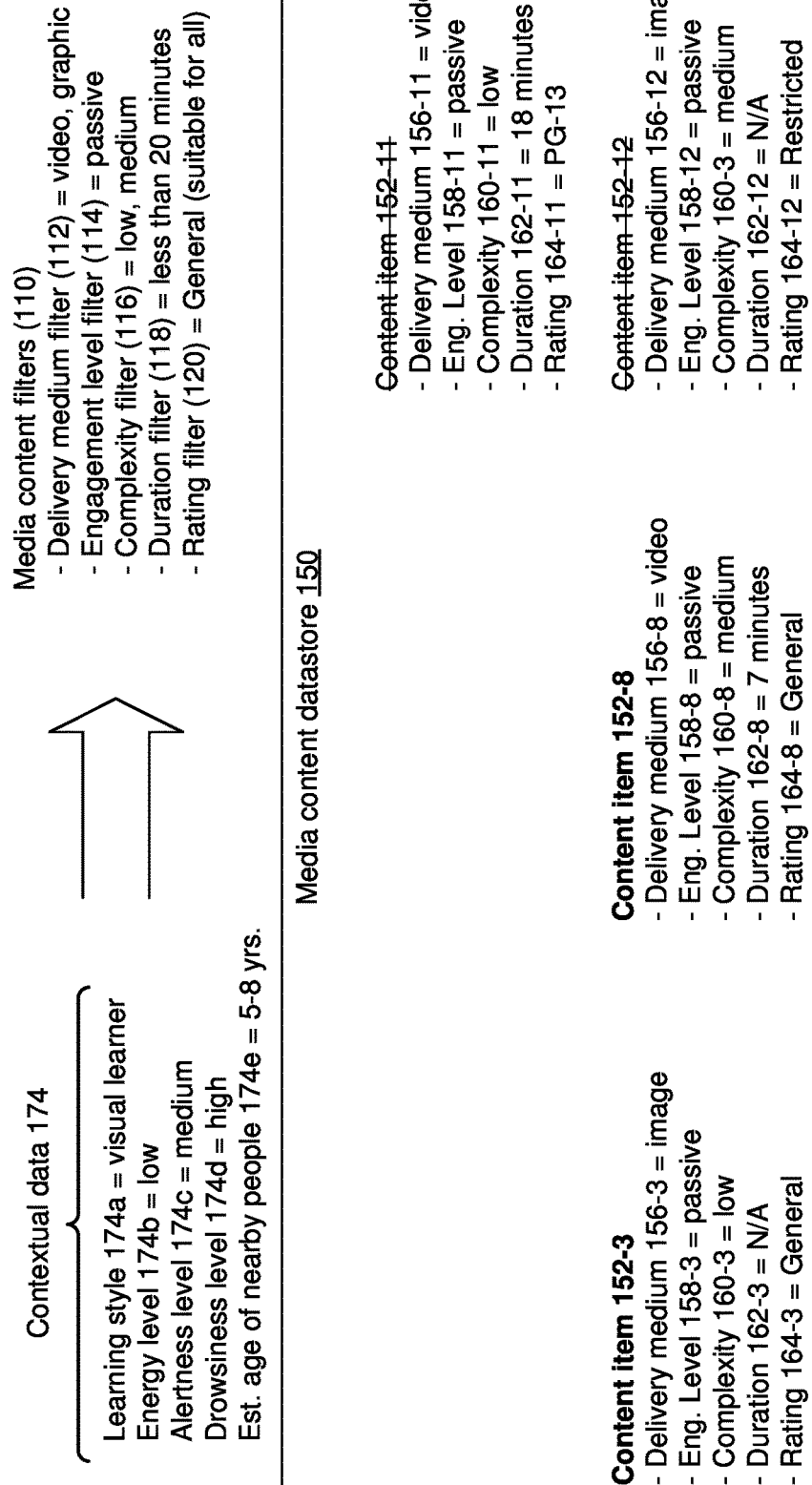

In the example of FIG. 1F, the contextual data 174 further indicates that an estimated age 174e of the user 20 and/or of a person near the user 20. In the example of FIG. 1F, the estimate age 174e is between five and eight years. In some implementations, there are multiple people watching the electronic device 30, and the estimated age 174e indicates an age of the youngest person watching the electronic device 30. For example, if the user 20 is watching the electronic device 30 with his/her child, then the estimated age 174e indicates an age of the child. In some implementations, the estimated age 174e is determined based on facial features represented in a facial image.

In some implementations, each media content item 152 in the media content datastore 150 is associated with a rating value indicating a suitability of the media content item 152 for various ages. The third media content item 152-3 has a rating value 164-3 of General (G) indicating that the third media content item 152-3 is suitable for all ages. The eighth media content item 152-8 has a rating value 164-8 of General indicating that the eighth media content item 152-8 is suitable for all ages. The eleventh media content item 152-11 has a rating value 164-11 of PG-13 indicating that some information in the eleventh media content item 152-11 may be inappropriate for children under thirteen. The twelfth media content item 152-12 has a rating value 164-12 of Restricted (R) indicating that persons under seventeen require a parent or an adult guardian to accompany them.

In the example of FIG. 1F, the content delivery platform 100 filters out media content items 152 that are not suitable for the estimated age 174e of 5-8 years. As such, the content delivery platform 100 filters out the eleventh media content item 152-11 and the twelfth media content item 152-12 (as indicated by the strike-through). As a result, the set 180 of media content items 152 includes the third media content item 152-3 and the eighth media content item 152-8.

Figure 1G:
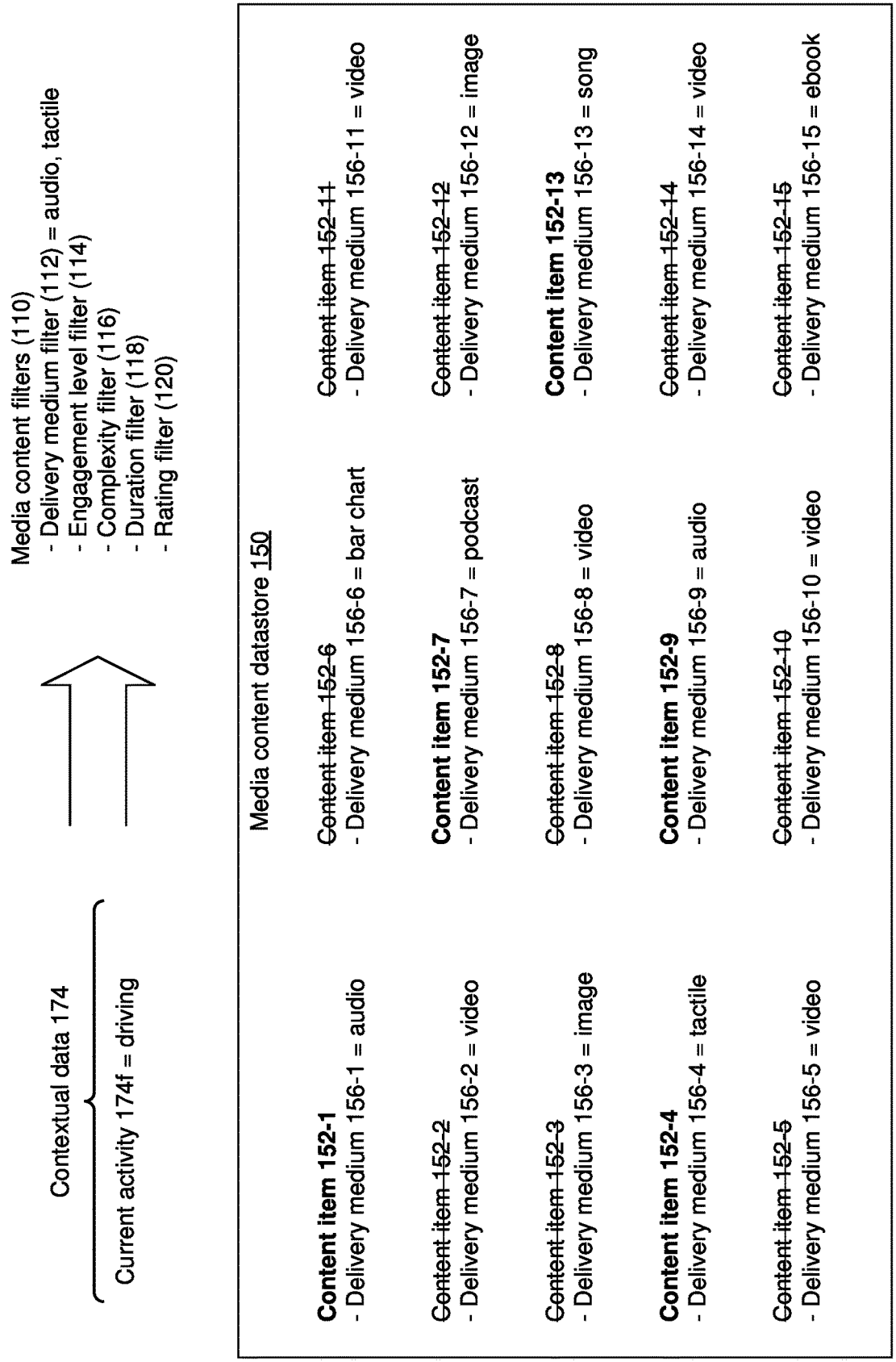

Referring to FIG. 1G, in some implementations, the contextual data 174 indicates a current activity 174f of the user 20. In the example of FIG. 1G, the contextual data 174 indicates that the user 20 is currently driving. Since the user 20 is currently driving, the content delivery platform 100 determines that visual delivery is not suitable. As such, the content delivery platform 100 sets a value of the delivery medium filter 112 to audio or tactile delivery. As such, video content will be filtered out while the current activity 174f corresponds to driving.

In the example of FIG. 1G, the content delivery platform 100 filters out the second media content item 152-2, the third media content item 152-3, the fifth media content item 152-5, the sixth media content item 152-6, the eighth media content item 152-8, the tenth media content item 152-10, the eleventh media content item 152-11, the twelfth media content item 152-12, the fourteenth media content item 152-14 and the fifteenth media content item 152-15 because of their association with visual delivery. As a result, the set 180 of media content items 152 includes the first media content item 152-1, the fourth media content item 152-4, the seventh media content item 152-7, the ninth media content item 152-9 and the thirteenth media content item 152-13 because of their association with audio delivery or tactile delivery.

Figure 2:
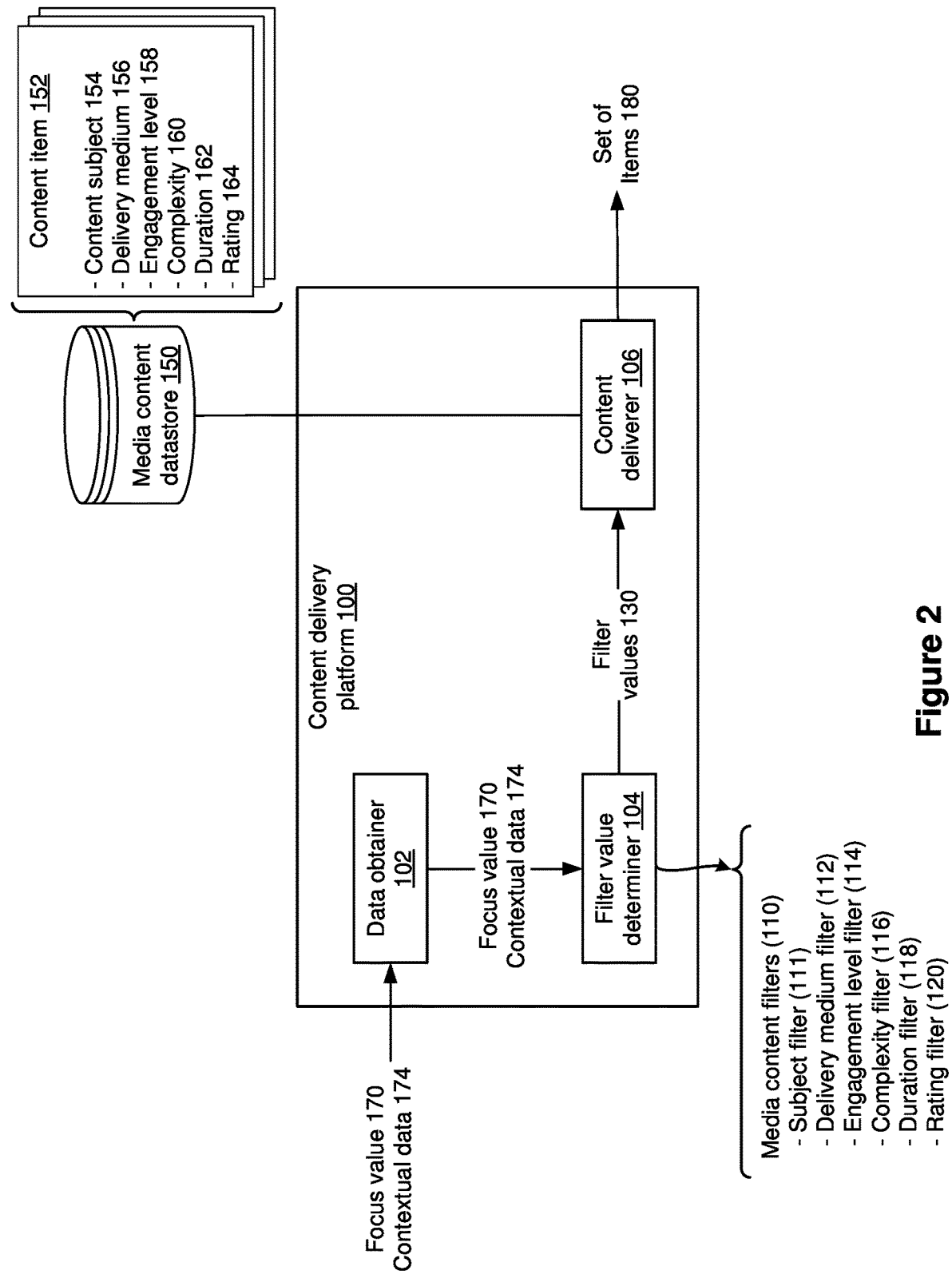
FIG. 2 is a block diagram of a content delivery platform in accordance with some implementations.

FIG. 2 is a block diagram of the content delivery platform 100 in accordance with some implementations. In various implementations, the content delivery platform 100 includes a data obtainer 102, a filter value determiner 104 and a content deliverer 106. In various implementations, the data obtainer 102 obtains the user focus indicator value 170 and the contextual data 174. For example, in some implementations, the data obtainer 102 receives the user focus indicator value 170 and the contextual data 174 from the electronic device 30. The data obtainer 102 provides the user focus indicator value 170 and the contextual data 174 to the filter value determiner 104.

In various implementations, the filter value determiner 104 determines the filter values 130 for the media content filters 110. In some implementations, the filter value determiner 104 determines the filter values 130 for the media content filters 110 based on the user focus indicator value 170 and the contextual data 174. In some implementations, the filter value determiner 104 determines a filter value 130 for the subject filter 111 based on the user focus indicator value 170. For example, the filter value determiner 104 sets a filter value 130 of the subject filter 111 to a subject indicated by the user focus indicator value 170.

In some implementations, the filter value determiner 104 sets a filter value 130 for the delivery medium filter 112 based on the contextual data 174. In some implementations, the contextual data 174 indicates a user preference for a particular delivery medium. In such implementations, the filter value determiner 104 sets the filter value 130 for the delivery medium filter 112 to the particular delivery medium indicated by the user preference. In some implementations, the contextual data 174 indicates that the user 20 is engaged in an activity such as driving. In such implementations, the filter value determiner 104 sets the filter value 130 of the delivery medium filter 112 so as to exclude visual delivery. For example, the filter value determiner 104 sets the filter value 130 of the delivery medium filter 112 to audio delivery or to tactile delivery.

In various implementations, the filter value determiner 104 sets the filter values 130 for the media content filters 110 based on a location of the electronic device 30. For example, in some implementations, the filter value determiner 104 sets a filter value 130 of the rating filter 120 to General when the electronic device 30 is located in a public place (e.g., on a transit bus). In some implementations, the filter value determiner 104 sets a filter value 130 of the complexity filter 116 to low complexity when the electronic device 30 is moving (e.g., when the user 20 is walking).

In various implementations, the filter value determiner 104 sets the filter values 130 for the media content filters 110 based on a time of day. For example, in some implementations, the filter value determiner 104 sets a filter value 130 for the engagement level filter 114 to high in the morning (e.g., when the user is wide awake). By contrast, in some implementations, the filter value determiner 104 sets the filter value 130 of the engagement level filter 114 to low at night (e.g., the when the user is tired and sleepy).

In various implementations, the filter value determiner 104 sets the filter values 130 for the media content filters 110 based on a type of another device that is near the electronic device 30. For example, in some implementations, the filter value determiner 104 sets the filter value 130 for the delivery medium filter 112 to High Definition (HD) video when there is TV near the electronic device 30. In some implementations, the filter value determiner 104 sets the filter value 130 for the delivery medium filter 112 to a radio station when there is an audio-only device (e.g., a wireless speaker or a device configured with a virtual assistant) near the electronic device 30.

In various implementations, the filter value determiner 104 sets the filter values 130 for the media content filters 110 based on a learning style of the user 20 indicated by the contextual data 174. In some implementations, the filter value determiner 104 sets the filter value 130 for the delivery medium filter 112 to visual delivery when a learning style of the user 20 corresponds to a visual learner. In some implementations, the filter value determiner 104 sets the filter value 130 for the engagement level filter 114 to high when the contextual data 174 indicates that the user 20 is an active learner.

In various implementations, the filter value determiner 104 sets the filter values 130 for the media content filters 110 based on a current state of the user 20. For example, in some implementations, the filter value determiner 104 sets the filter value 130 for the complexity filter 116 to low when the current state of the user 20 corresponds to being tired or drowsy. In some implementations, the filter value determiner 104 sets the filter value 130 for the rating filter 120 to Restricted when the user 20 is with his/her spouse and there are no children near the user.

In various implementations, the content deliverer 106 generates the set 180 of media content items 152 based on the filter values 130. In some implementations, the content deliverer 106 filters the media content items 152 in the media content datastore 150 based on the filter values 130. For example, in some implementations, the content deliverer 106 filters out media content items 152 that breach the filter values 130 (e.g., do not satisfy the filter values 130). In some implementations, the content deliverer 106 includes media content items 152 in the set 180 that satisfy the filter values 130. The content deliverer 106 provides the set 180 of media content items 152 to the electronic device 30.

Figure 3:
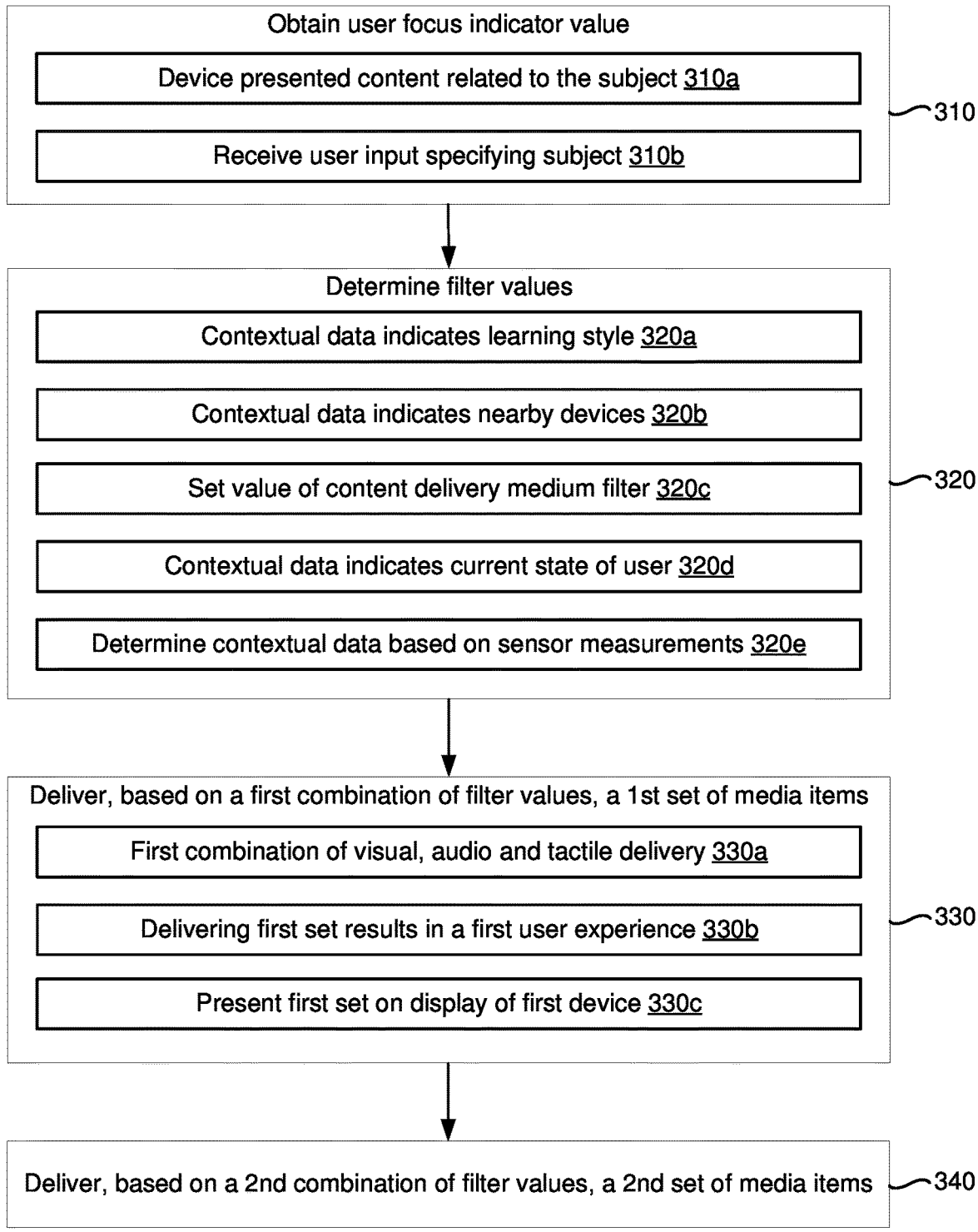
FIG. 3 is a flowchart representation of a method of delivering media content items in accordance with some implementations.

FIG. 3 is a flowchart representation of a method 300 of delivering media content items. In various implementations, the method 300 is performed by a device with a non-transitory memory and one or more processors coupled with the non-transitory memory (e.g., the electronic device 30 and/or the content delivery platform 100 shown in FIG. 1A). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in some implementations, the method 300 includes obtaining a user focus indicator value that is associated with a subject. For example, as shown in FIG. 1A, the content delivery platform 100 receives the user focus indicator value 170 from the electronic device 30. In some implementations, the user focus indicator value includes a user interest value that indicates that the user is interested in the subject.

As represented by block 310a, in some implementations, the method 300 includes detecting that the electronic device has presented media content items that relate to the subject within a threshold amount of time. For example, detecting that the electronic device 30 has presented media content items 152 related to the Civil War within the last 2 weeks. As such, in some implementations, the method 300 includes determining the user focus indicator value based on the user's interaction with other content media items.

As represented by block 310b, in some implementations, the method 300 includes receiving a user input that specifies the subject. In some implementations, the user input specifies that the user is interested in learning about the subject. For example, in some implementations, the user 20 provides a user input, captured by the electronic device 30, that specifies the subject.

As represented by block 320, in some implementations, the method 300 includes determining a plurality of filter values for a respective set of media content filters based on the subject and contextual data associated with the device or a user of the device. For example, as shown in FIG. 1A, the content delivery platform 100 determines the filter values 130 for the media content filters 110 based on the contextual data 174.

As represented by block 320a, in some implementations, the contextual data indicates a learning style of a user of the device. For example, as shown in FIG. 1B, the contextual data 174 indicates the learning style 174a of the user 20. In some implementations, the learning style indicates that the user is a visual learner, an auditory learner, a reading/writing learner, a kinesthetic learner (e.g., an active learner) or a passive learner. In some implementations, the method 300 includes determining the learning style of the user based on the delivery medium of media content items that the user has accessed in the past. For example, in some implementations, the method 300 includes determining that the user is an auditory learner in response to a number of auditory media content items that the user has listened to being greater than a number of visual media content items that the user has watched. In some implementations, the method 300 includes determining the learning style of the user based on a level of user engagement (e.g., a level of user participation) required by media content items that the user has accessed in the past. For example, in some implementations, the method 300 includes determining that the user is an active learner in response to an average engagement level of media content items that the user has accessed being greater than a threshold engagement level. In some implementations, the method 300 includes determining that the user is a passive learner in response to the average engagement level of the media content items that the user has accessed being less than the threshold engagement level.

In some implementations, the method 300 includes setting a value of a content delivery medium filter to visual delivery when the learning style of the user corresponds to a visual learner. For example, as shown in FIG. 1B, the content delivery platform 100 sets a filter value 130 of the delivery medium filter 112 to video and/or graphic when the learning style 174a indicates that the user 20 is a visual learner. Setting the value of the delivery medium filter to visual delivery allows the content delivery platform to deliver media content items that are more suitable to the user's visual learning style thereby enhancing a user experience of the device.

In some implementations, the method 300 includes setting a value of a content delivery medium filter to audio delivery when the learning style of the user corresponds to an auditory learner. Setting the value of the delivery medium filter to audio delivery allows the content delivery platform to deliver media content items that are more suitable to the user's auditory learning style thereby enhancing a user experience of the device.

In some implementations, the method 300 includes setting a value of a content engagement filter to a value that is less than a threshold engagement level when the learning style of the user corresponds to a passive learner. In some implementations, the method 300 includes filtering out media content items that require user participation (e.g., in the form of answering questions). In some implementations, the method 300 includes including delivering media content items that provide information in a passive manner (e.g., displaying a documentary).

In some implementations, the method 300 includes setting a value of a content engagement level filter to a value that is greater than a threshold engagement level when the learning style of the user corresponds to an active learner (e.g., a kinesthetic learner, for example, a person who enjoys hands-on learning). In some implementations, the method 300 includes including media content items that provide a hands-on learning experience to the user. In some implementations, the method 300 includes including media content items that require user participation (e.g., in the form of answering questions or performing a real-world activity along with the media content item).

As represented by block 320b, in some implementations, the contextual data indicates other devices that are proximate to the device. In some implementations, the contextual data indicates types of the other devices that are within a threshold distance of the device.

In some implementations, the method 300 includes setting a value of a content delivery medium to visual delivery when the contextual data indicates that there is a television within a threshold viewing distance of the user. In some implementations, the method 300 includes setting the value of the content delivery medium to High Definition (HD) video when the user is within a viewing distance of an HD TV.

In some implementations, the method 300 includes setting a value of a content delivery medium filter to tactile delivery when the contextual delivery indicates that there is a tactile device within a threshold tactile distance of the user. In some implementations, the method 300 includes setting the value to the content delivery medium filter to vibrational delivery when the user is within a vibration detection distance of a device that vibrates (e.g., when the user is sitting on a vibrating chair).

In some implementations, the method 300 includes setting a value of a content delivery medium filter to audio delivery when the contextual data indicates that there is a speaker within a threshold auditory distance of the user. In some implementations, the method 300 includes setting the value of the content delivery medium filter to audio delivery when the user is within a listening distance of a speaker device.

As represented by block 320c, in some implementations, the method 300 includes setting a value of a content delivery medium filter based on a time of day. For example, in some implementations, the method 300 includes setting the value of the content delivery medium filter to audio delivery during a time that corresponds to a commute time (e.g., when the user is likely driving to/from work and cannot view visual content). In some implementations, the method 300 includes setting the value of the content delivery medium filter to video delivery during a time that corresponds to a leisure time (e.g., when the user is likely lounging in his/her family room).

In some implementations, the method 300 includes setting a value of a content delivery medium filter based on a location of the device. For example, in some implementations, the method 300 includes setting the value of the content delivery medium filter to audio delivery or tactile delivery when the device is in a state of motion (e.g., when the device is moving at a speed that is greater than a threshold speed, for example, when the user is commuting to/from work). In some implementations, the method 300 includes setting the value of the content delivery medium filter to visual delivery when the device is located at a home of the user.

In some implementations, the method 300 includes setting a value of a content delivery medium filter based on a user preference for a particular content delivery medium. For example, in some implementations, the method 300 includes setting the value of the content delivery medium filter to audio delivery when the user prefers audio content. In some examples, the method 300 includes setting the value of the content delivery medium filter to audiobooks when the user prefers listening to audiobooks over reading books or watching movies that are based on books.

As represented by block 320d, in some implementations, the contextual data indicates a current state of the user or the device. In some implementations, the current state includes a current health state of the user, for example, an energy level of the user, a dietary state of the user, a sleep state of the user, etc.

In some implementations, the method 300 includes setting a value of a content complexity filter based on a current alertness of the user. For example, as shown in FIG. 1D, the content delivery platform 100 sets the filter value 130 of the complexity filter 116 to low or medium in response to the alertness level 174c of the user 20 being medium. Delivering media content items based on the current alertness of the user improves the user experience of the device by providing content that the user is more likely to comprehend given the current alertness and forgoing presentation of content that is too complex for the user to comprehend given the current alertness of the user.

In some implementations, the method 300 includes setting a value of a content duration filter based on a current drowsiness of the user. For example, as shown in FIG. 1E, the content delivery platform 100 sets a filter value 130 for the duration filter 118 to less than 20 minutes when the drowsiness level 174d is high. Controlling a duration of the delivered content tends to reduce a power consumption of the device by forgoing presentation of longer media content items that the user is unlikely to watch after having fallen asleep.

In some implementations, the method 300 includes setting a value of a content engagement level filter based on an estimated energy level of the user. For example, as shown in FIG. 1C, the content delivery platform 100 sets the filter value 130 of the engagement level filter 114 to passive when the energy level 174b of the user 20 is low. Controlling an engagement level of the delivered content based on an estimated energy level of the user enhances a user experience of the device by allowing presentation of content that is suitable for the user's energy level.

As represented by block 320e, in some implementations, the method 300 includes determining the contextual data based on sensor data captured by a set of one or more sensors. In some implementations, the sensor data includes an image of an eye of the user, a heart rate measurement, a blood glucose measurement or a brain wave exhibited by the user.

As represented by block 330, in some implementations, the method 300 includes delivering based on a first combination of the plurality of filter values, a first set of one or more media content items that are associated with a first combination of content delivery mediums. In some implementations, the first set of one or more media content items is selected from a plurality of media content items that provide information about the subject. For example, as shown in FIG. 1C, the content delivery platform 100 includes the third media content item 152-3, the fifth media content item 152-5, the sixth media content item 152-6, the eighth media content item 152-8, the eleventh media content item 152-11, the twelfth media content item 152-12 and the fourteenth media content item 152-14 in the set 180 of media content items 152 in response to the delivery medium filter 112 having a value that corresponds to video or graphic content and the engagement level filter 114 having a value that corresponds to passive content. In the example of FIG. 1C, the selected media content items are associated with visual delivery (e.g., video or graphic).

As represented by block 330a, in some implementations, the first combination of content delivery mediums includes a first combination of visual delivery, audio delivery or tactile delivery, and the second combination of content delivery mediums includes a second combination of visual delivery, audio delivery or tactile delivery. For example, the selected media content items in FIG. 1C are associated with visual delivery, whereas the selected media content items in FIG. 1G are associated with audio delivery.

In some implementations, visual delivery includes displaying text (e.g., an ebook, a research paper or a blog article), a still image (e.g., a picture) or a video (e.g., a movie, a TV show or a documentary). In some implementations, audio delivery includes playing an audiobook, a podcast, a song or an audio portion of a video. In some implementations, tactile delivery includes generating vibrations or providing tactile feedback (e.g., presenting braille-style content).

As represented by block 330b, in some implementations, delivering the first set results in a first user experience, and delivering the second set results in a second user experience that is different from the first user experience.

As represented by block 330c, in some implementations, delivering the first set includes displaying the first set of one or more media content items on the display of the device (e.g., the device itself presents the first set of one or more media content items), and delivering the second set includes displaying the second set of one or more media content items on a second device that is proximate to the device (e.g., the device causes another device to present the second set of one or more media content items, for example, a nearby TV displays the second set of one or more media content items).

As represented by block 340, in some implementations, the method 300 includes delivering, based on a second combination of the plurality of filter values that is different from the first combination, a second set of one or more media content items that are associated with a second combination of content delivery mediums that is different from the first combination of content delivery mediums. In some implementations, the second set of one or more media content items is selected from the plurality of media content items. In some implementations, the second set is different from the first set. For example, as shown in FIG. 1G, the content delivery platform 100 includes the first media content item 152-1, the fourth media content item 152-4, the seventh media content item 152-7, the ninth media content item 152-9 and the thirteenth media content item 152-13 in the set 180 of media content items 152 in response to the delivery medium filter 112 having a value that corresponds to audio delivery or tactile delivery.

In some implementations, the method 300 includes converting a first media content item from a first content delivery medium to a second content delivery medium based on the contextual data (e.g., converting a written article into an audio clip, a podcast or a video transcript).

In some implementations, the first set and the second set include a common media content item. For example, there is some overlap between the first set and the second set. Alternatively, in some implementations, the first set and the second set do not include a common media content item. For example, there is no overlap between the first set and the second set.

Figure 4:
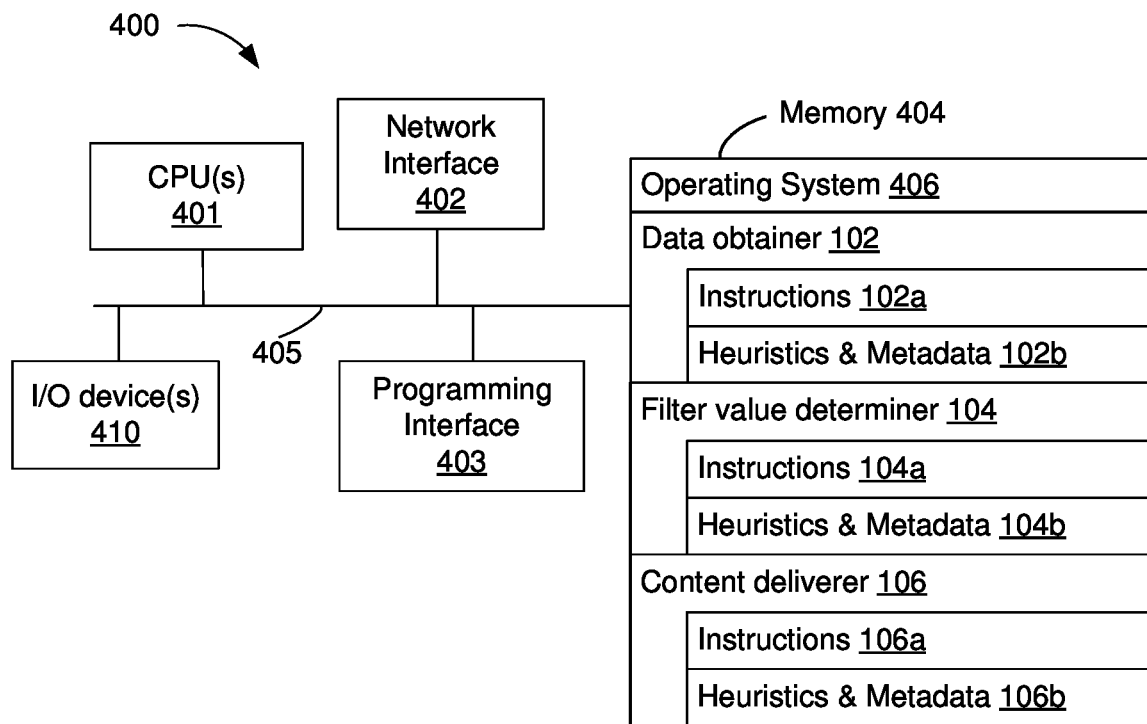
FIG. 4 is a block diagram of a device that delivers media content items in accordance with some implementations.

FIG. 4 is a block diagram of a device 400 that delivers media content items in accordance with some implementations. In some implementations, the device 400 implements the electronic device 30 and/or the content delivery platform 100 shown in FIG. 1A and/or 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud-hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 102, the filter value determiner 104 and the content deliverer 106. In various implementations, the device 400 performs the method 300 shown in FIG. 3.

In some implementations, the data obtainer 102 obtains a user focus indicator value (e.g., the user focus indicator value 170 shown in FIGS. 1A and 2) and contextual data (e.g., the contextual data 174 shown in FIGS. 1A-2). In some implementations, the data obtainer 102 performs the operation(s) represented by block 310 in FIG. 3. To that end, the data obtainer 102 includes instructions 102a, and heuristics and metadata 102b.

In some implementations, the filter value determiner 104 determines filter values for one or more media content filters (e.g., the filter values 130 for the media content filters 110 shown in FIGS. 1A and 2). In some implementations, the filter value determiner 104 performs the operations(s) represented by block 320 shown in FIG. 3. To that end, the filter value determiner 104 includes instructions 104a, and heuristics and metadata 104b.

In some implementations, the content deliverer 106 delivers a set of one or more media content items that the content deliverer 106 selects based on the filter values determined by the filter value determiner 104 (e.g., the set 180 shown in FIGS. 1A and 2). In some implementations, the content deliverer 106 performs the operation(s) represented by blocks 330 and 340 shown in FIG. 3. To that end, the content deliverer 106 includes instructions 106a, and heuristics and metadata 106b.

In some implementations, the one or more I/O devices 410 include one or more sensors for capturing contextual data (e.g., the contextual data 174 shown in FIGS. 1A-1G). For example, in some implementations, the one or more I/O devices 410 include an image sensor (e.g., a camera), an ambient light sensor (ALS), a microphone, a location sensor, a heart rate sensor and/or a blood glucose sensor. In some implementations, the one or more I/O devices 410 include a display, a speaker and/or a haptic device (e.g., a vibrational device that generates vibrations) for presenting media content items.

When a user wants to learn information about a subject, the user generally accesses a fixed media content item that includes information about the subject. For example, the user accesses a book, a newspaper article, a web page, a podcast and/or a video about the subject. However, the information in the fixed media content item may not be current or reliable by the time the user accesses the fixed media content item. In many instances, information in fixed media content items starts becoming out-of-date as soon as the media content item is published.

The present disclosure provides methods, systems, and/or devices for curating content that provides information regarding a particular subject that the user is interested in learning about. A content curation engine determine a subject that the user is interested in learning about. The content curation engine identifies media content items that include information regarding the subject that the user is interested in. The content curation engine selectively extracts portions of information from different media content items, and synthesizes a media content item based on the extracted portions of the information.

After identifying existing media content items that provide information regarding the subject, the content curation engine extracts portions of information that are reliable and forgoes extracting portions of information that are unreliable. As such, the media content item synthesized by the content curation engine includes reliable information and not unreliable information.

In some implementations, the content curation engine extracts portions of information that are current and forgoes extracting portions of information that are not current. As such, the media content item synthesized by the content curation engine includes information that is up-to-date and does not include information that is out-of-date.

In some implementations, the content curation engine extracts portions of information that are relevant based on contextual data indicating a context of a device or a user of the device, and forgoes extracting portions of information that are not relevant based on the contextual data. As such, the media content item synthesized by the content curation engine includes information that is relevant based on the contextual data and does not include information that is irrelevant based on contextual data.

Figure 5A:
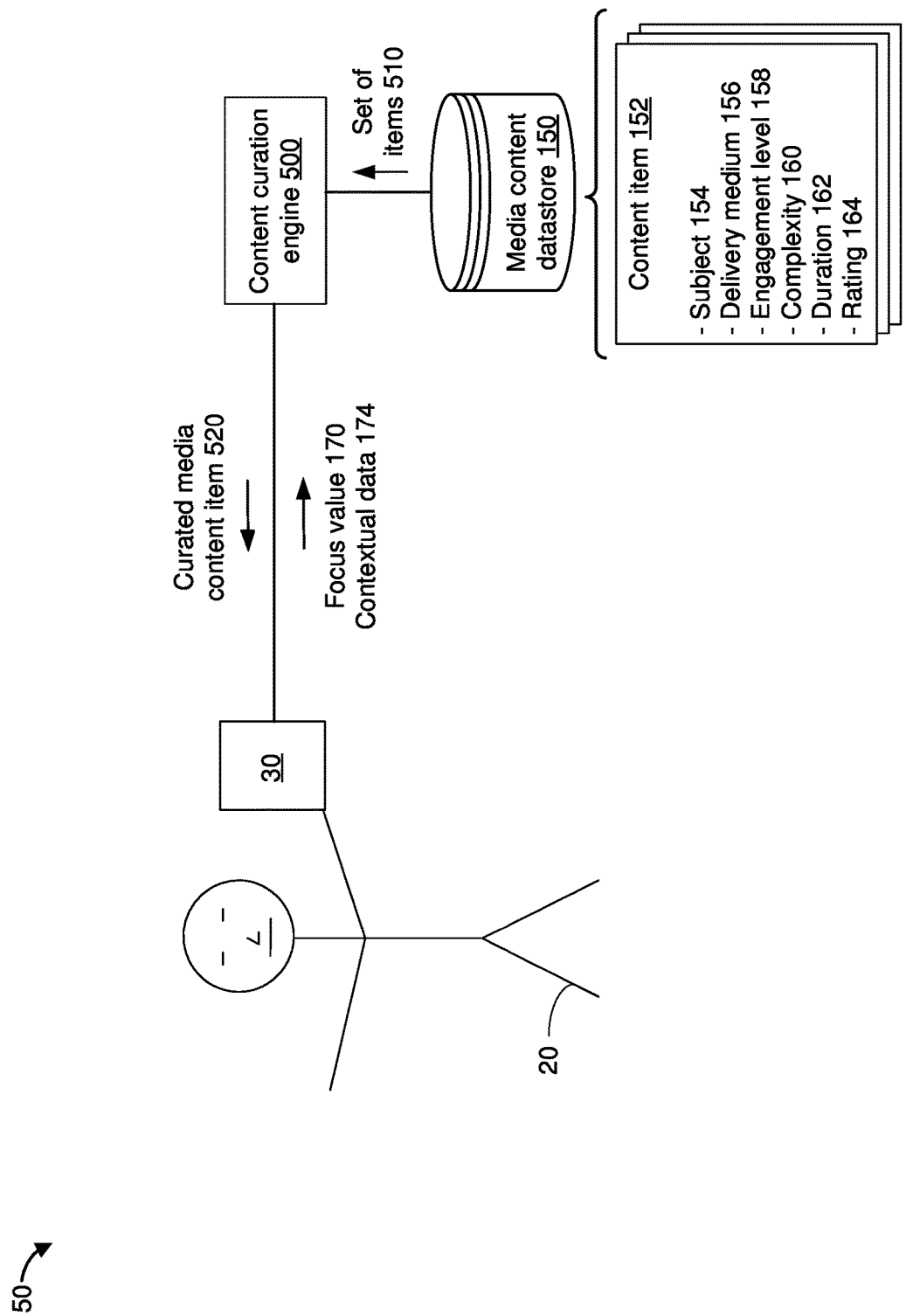

FIG. 5A is a block diagram of an example operating environment 50 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 50 includes the electronic device 30, a content curation engine 500 and the media content datastore 150.

Although the content curation engine 500 is shown as being separate from the electronic device 30. In some implementations, the content curation engine 500 is integrated into the electronic device 30. Although the media content datastore 150 is shown as being separate from the content curation engine 500. In some implementations, the media content datastore 150 is integrated into the content curation engine 500. In some implementations, the content curation engine 500 and/or the media content datastore 150 reside at the electronic device 30. In some implementations, the content curation engine 500 is integrated into the content delivery platform 100 shown in FIGS. 1A and 2. As such, in some implementations, the content delivery platform 100 performs the operations described in relation to the content curation engine 500. In some implementations, the content delivery platform 100 (shown in FIGS. 1A and 2) is integrated into the content curation engine 500. As such, in some implementations, the content curation engine 500 performs the operations described in relation to the content delivery platform 100.

In various implementations, the content curation engine 500 obtains the user focus indicator value 170 that indicates a subject that the user 20 is interested in learning about. In some implementations, the content curation engine 500 receives the user focus indicator value 170 from the electronic device 30. For example, in some implementations, the user 20 specifies the user focus indicator value 170. In some implementations, the content curation engine 500 determines the user focus indicator value 170 based on respective subjects 154 of media content items 152 that the electronic device 30 has presented to the user 20 within a threshold amount of time (e.g., within the last 24 hours).

In some implementations, the content curation engine 500 obtains contextual data 174 that is associated with the electronic device 30 or with the user 20 of the electronic device 30. In some implementations, the content curation engine 500 receives the contextual data 174 from the electronic device 30. In some implementations, the contextual data 174 includes sensor data that is captured by sensors of the electronic device 30. For example, in some implementations, the contextual data 174 includes a location of the electronic device 30. In some implementations, the contextual data 174 indicates which other devices are proximate to the electronic device 30. In some implementations, the contextual data 174 indicates user characteristics of the user 20. For example, in some implementations, the contextual data 174 indicates a learning style of the user 20 (e.g., the contextual data 174 indicates whether the user 20 is a visual learner, an auditory learner, an active learner, a passive learner, etc.). In some implementations, the contextual data 174 indicates a current state of the user 20 (e.g., a current health state of the user 20). For example, in some implementations, the contextual data 174 indicates an energy level of the user (e.g., whether the user is tired or fresh). In some implementations, the contextual data 174 indicates an alertness level of the user (e.g., whether the user has had his/her morning coffee). In some implementations, the contextual data 174 indicates a drowsiness level of the user (e.g., whether the user is sleepy or wide awake). In some implementations, the contextual data 174 indicates a motion state of the electronic device 30 (e.g., the contextual data 174 indicates that the electronic device 30 is in a car that is being driven). In some implementations, the contextual data 174 indicates media content items that the electronic device 30 recently presented (e.g., within a threshold time period of a current time). In some implementations, the contextual data 174 indicates a web browsing history of the user 20.

In various implementations, the content curation engine 500 identifies a set of items 510 from the various media content items 152 based on the user focus indicator value 170. In some implementations, the set of items 510 includes a subset of the media content items 152 that provides information regarding a subject indicated by the user focus indicator value 170. In some implementations, the set of items 510 includes a subset of the media content items 152 that provides information regarding a subject that the user is interested in learning about. In some implementations, the content curation engine 500 identifies the set of items 510 by filtering out media content items 152 that do not provide information regarding the subject indicated by the user focus indicator value 170. For example, the content curation engine 500 filters out media content items 152 with respective subjects 154 that do not match the subject indicated by the user focus indicator value 170.

In some implementations, the content curation engine 500 identifies the set of items 510 based on the contextual data 174. In some implementations, the content curation engine 500 identifies the set of items 510 by identifying a subset of the media content items 152 that is contextually relevant to a context of the user 20 and/or the electronic device 30. In some implementations, the content curation engine 500 identifies the set of items 510 by filtering out media content items 152 that are not contextually relevant to a context of the user 20 and/or the electronic device 30 indicated by the contextual data 174. In some implementations, the content curation engine 500 identifies the set of items 510 by performing operations described in relation to the content delivery platform 100. As such, in some implementations, the set of items 510 is the same as the set 180 shown in FIGS. 1A and 2.

In various implementations, the content curation engine 500 synthesizes a curated media content item 520 based on the set of items 510. In some implementations, the content curation engine 500 selectively extracts portions of information from the set of items 510 and includes the extracted portions in the curated media content item 520. In some implementations, the content curation engine 500 extracts, from the set of items 510, portions of information that appear to be reliable. For example, the content curation engine 500 extracts, from the set of items 510, portions of information that satisfy a reliability threshold. In some implementations, the content curation engine 500 forgoes extracting, from the set of items 510, portions of information that appear to be unreliable. For example, the content curation engine 500 forgoes extracting, from the set of items 510, portions of information that breach the reliability threshold, for example, do not satisfy the reliability threshold. As such, the curated media content item 520 includes information that appears to be reliable and does not include information that appears to be unreliable.

In some implementations, the content curation engine 500 extracts, from the set of items 510, portions of information that appear to be current or up-to-date. For example, the content curation engine 500 extracts, from the set of items 510, portions of information that satisfy a currentness threshold. In some implementations, the content curation engine 500 forgoes extracting, from the set of items 510, portions of information that appear to be out-of-date or not current. For example, the content curation engine 500 forgoes extracting, from the set of items 510, portions of information that breach the currentness threshold, for example, portions that do not satisfy the currentness threshold. As such, the curated media content item 520 includes information that appears to be current (e.g., up-to-date) and does not include information that does not appear to be current (e.g., out-of-date).

In some implementations, the content curation engine 500 extracts, from the set of items 510, portions of information that appear to be relevant to (e.g., suitable for) a context of the user 20 and/or the electronic device 30 indicated by the contextual data 174. For example, the content curation engine 500 extracts, from the set of items 510, portions of information that satisfy a relevance threshold. In some implementations, the content curation engine 500 forgoes extracting, from the set of items 510, portions of information that appear to be irrelevant to (e.g., unsuitable for) the context of the user 20 and/or the electronic device 30 indicated by the contextual data 174. For example, the content curation engine 500 forgoes extracting, from the set of items 510, portions of information that breach (e.g., do not satisfy) the relevance threshold. As such, the curated media content item 520 includes information that is relevant to a context of the user 20 and/or the electronic device 30, and does not include information that is not relevant to the context of the user 20 and/or the electronic device 30.

In various implementations, synthesizing the curated media content item 520 enhances a user experience of the electronic device 30 by including, from the set of items 510, portions of information that are reliable, current, relevant or likely being sought by the user 20, and excluding, from the set of items 510, portions of information that are unreliable, out-of-date, not relevant or likely not being sought by the user 20. In various implementations, synthesizing the curated media content item 520 enhances operability of the electronic device 30 by improving a battery life of the electronic device due to a reduction in a number of user inputs corresponding to the user 20 trying to determine whether information included in the curated media content item 520 is reliable and/or current. For example, synthesizing the curated media content item 520 reduces a need for user inputs that correspond to the user 20 performing searches on a search engine to determine whether or not the information included in the curated media content item 520 is reliable and/or current.

Figure 5B:
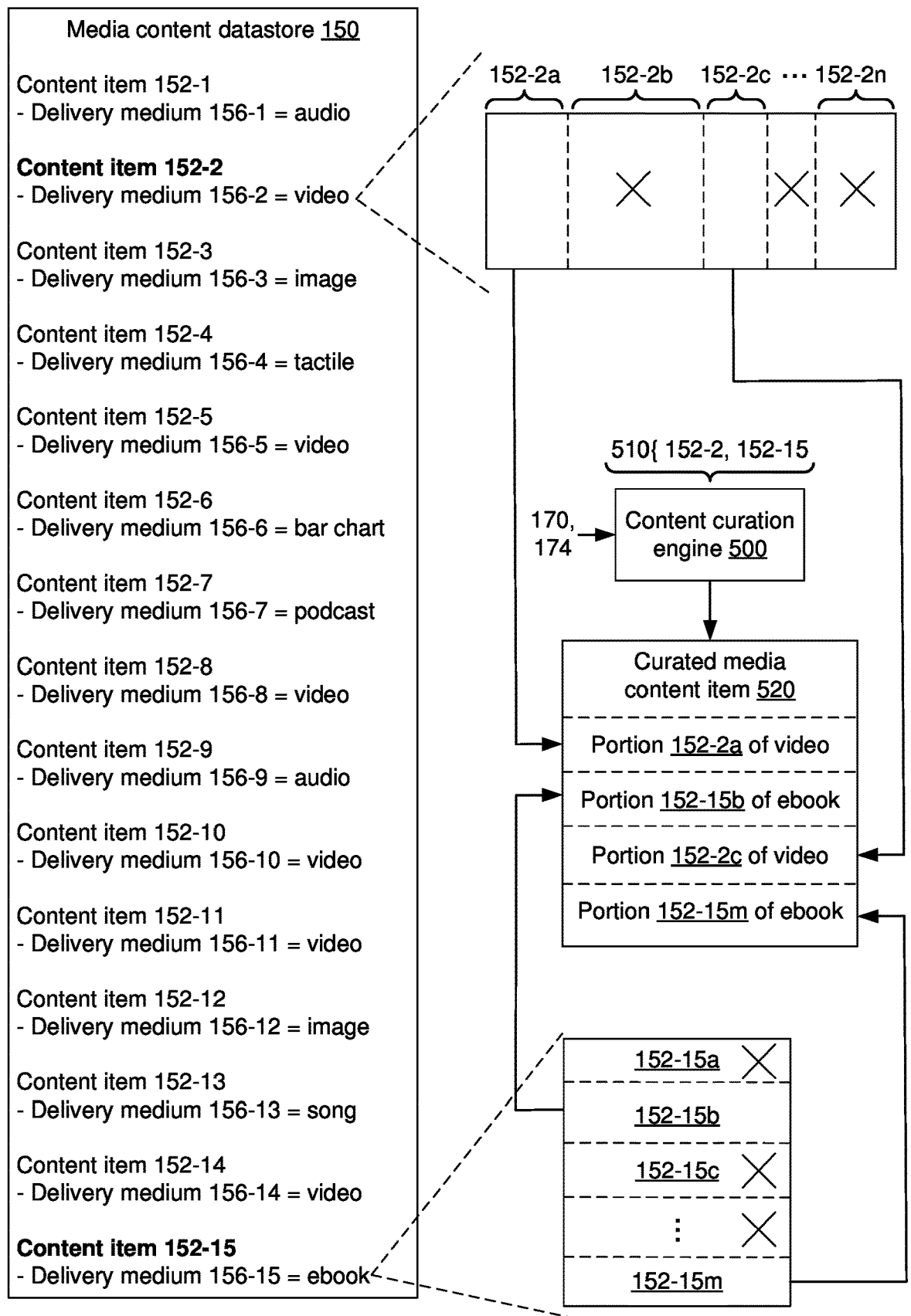

Referring to FIG. 5B, the content curation engine 500 identifies the second media content item 152-2 and the fifteenth media content item 152-15 based on the user focus indicator value 170 and/or the contextual data 174. In the example of FIG. 5B, the set of items 510 includes the second media content item 152-2 and the fifteenth media content item 152-15. As described in relation to FIG. 1B, the second media content item 152-2 has a second delivery medium value 156-2 indicating that the second media content item 152-2 includes video content. For example, the second media content item 152-2 is a video clip, a documentary or a movie. The fifteenth media content item 152-15 has a fifteenth delivery medium value 156-15 indicating that the fifteenth media content item 152-15 is an ebook.

As illustrated in FIG. 5B, in some implementations, the second media content item 152-2 includes a first video portion 152-2*a*, a second video portion 152-2*b*, a third video portion 152-2*c*, . . . , and an nth video portion 152-2*n*. In some implementations, the different video portions of the second media content item 152-2 correspond to different time periods of the video. For example, the first video portion 152-2*a* corresponds to the first two minutes of the video, the second video portion 152-2*b* corresponds to the next two minutes of the video, etc. In some implementations, the time periods corresponding to the different portions of the second media content item 152-2 are of equal temporal lengths (e.g., each portion of the video is 2 minutes long). Alternatively, in some implementations, the time periods corresponding to the different portions of the second media content item 152-2 are of different temporal lengths (e.g., the first video portion 152-2*a* is two minutes long, the second video portion 152-2*b* is thirty seconds long, etc.).

In some implementations, the fifteenth media content item 152-15 includes a first ebook portion 152-15*a*, a second ebook portion 152-15*b*, a third ebook portion 152-15*c*, . . . , and an nth ebook portion 152-15*n*. In some implementations, the different ebook portions of the fifteenth media content item 152-15 correspond to different chapters in the ebook. For example, the first ebook portion 152-15a corresponds to a first chapter of the ebook, the second ebook portion 152-15b corresponds to a second chapter of the ebook, the third ebook portion 152-15c corresponds to a third chapter of the ebook, . . . , and the nth ebook portion 152-15n corresponds to an nth chapter of the ebook. In some implementations, the different ebook portions of the fifteenth media content item 152-15 correspond to different pages, paragraphs, sentences and/or phrases in the ebook. In some implementations, the ebook portions are of equal lengths. Alternatively, in some implementations, the ebook portions are of different lengths.

In various implementations, the content curation engine 500 extracts the first video portion 152-2a and the third video portion 152-2c from the second media content item 152-2, and forgoes extracting the remaining video portions of the second media content item 152-2. For example, the content curation engine 500 forgoes extracting the second video portion 152-2b and the nth video portion 152-2n. In some implementations, the content curation engine 500 generates a new media content item and includes the first video portion 152-2a and the third video portion 152-2c in the new media content item. Alternatively, in some implementations, the content curation engine 500 generates a copy of the second media content item 152-2 and removes all video portions except the first video portion 152-2a and the third video portion 152-2c from the copy of the second media content item 152-2.

In various implementations, the content curation engine 500 extracts the second ebook portion 152-15b and the mth ebook portion 152-15m from the fifteenth media content item 152-15, and forgoes extracting the remaining ebook portions from the fifteenth media content item 152-15. For example, the content curation engine 500 forgoes extracting the first ebook portion 152-15a, the third ebook portion 152-15c and various other ebook portions between the third ebook portion 152-15c and the mth ebook portion 152-15m. In some implementations, the content curation engine 500 includes the second ebook portion 152-15b and the mth ebook portion 152-15m into the curated media content item 520.

In various implementations, the content curation engine 500 orders the extracted portions of the second media content item 152-2 and the fifteenth media content item 152-15 based on one or more characteristics of the extracted portions. For example, in some implementations, the content curation engine 500 orders the extracted portions such that portions that convey the information in general terms are placed towards a beginning of the curated media content item 520 and portions that convey the information in more specific terms are placed towards an end of the curated media content item 520. As an example, the first video portion 152-2a is placed before the second ebook portion 152-15b because the first video portion 152-2a may provide an overview of the subject, whereas the second ebook portion 152-15b may provide detailed information regarding the subject.

In some implementations, the content curation engine 500 orders the extracted portions in increasing order of their complexity. For example, the least complex portions are placed towards the beginning of the curated media content item 520 and the most complex portions are placed towards the end of the curated media content item 520. As an example, the first video portion 152-2a is placed before the second ebook portion 152-15b because the first video portion 152-2a is less complex than the second ebook portion 152-15b.

In some implementations, the content curation engine 500 places an extracted portion that introduces the subject (e.g., an executive summary of the subject) towards the beginning of the curated media content item 520, an extracted portion that provides closing remarks regarding the subject (e.g., a conclusion or a closing summary) towards the end of the curated media content item 520, and extracted portions that provide detailed information in the middle of the curated media content item 520. As an example, the first video portion 152-2a provides an introduction to the subject that the user 20 is interested in, the mth book portion provides a closing summary or a conclusion to the subject, and the second ebook portion 152-15b and the third video portion 152-2c provide details regarding the subject.

Figure 5C:
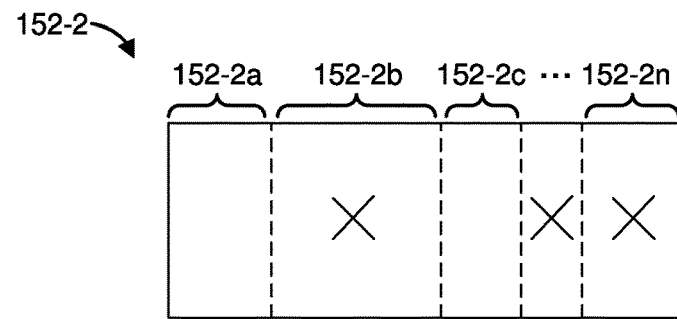
Figure 5C:
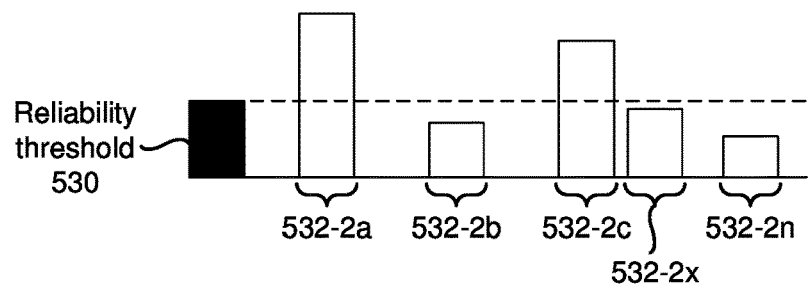
Figure 5C:
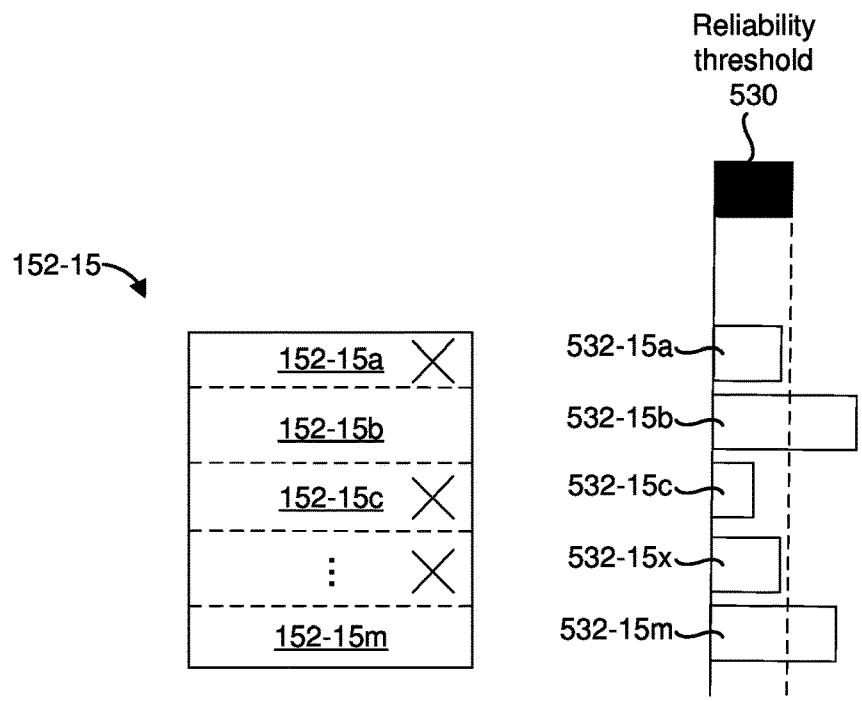

Referring to FIG. 5C, in various implementations, the content curation engine 500 extracts a portion of the information from a media content item 152 in response to determining that the portion satisfies a reliability threshold 530. In some implementations, the content curation engine 500 determines respective reliability scores for the portions and extracts the portions with reliability scores that satisfy (e.g., exceed) the reliability threshold 530. For example, the content curation engine 500 extracts the first video portion 152-2a and the third video portion 152-2c because their reliability scores 532-2a and 532-2c, respectively, exceed the reliability threshold 530. Similarly, the content curation engine 500 extracts the second ebook portion 152-15b and the mth ebook portion 152-15m because their reliability scores 532-15b and 532-15m, respectively, exceed the reliability threshold 530.

In various implementations, the content curation engine 500 forgoes extracting portions with reliability scores that breach (e.g., are less than) the reliability threshold 530. For example, the content curation engine 500 forgoes extracting the second video portion 152-2b, the nth video portion 152-2n and the video portions between the third video portion 152-2c and the nth video portion 152-2n because their respective reliability scores 532-2b, 532-2n and 532-2x are below the reliability threshold 530. Similarly, the content curation engine 500 forgoes extracting the first ebook portion 152-15a, the third ebook portion 152-15c and the ebook portions between the third ebook portion 152-15c and the mth ebook portion 152-15m because their respective reliability scores 532-15a, 532-15c and 532-15x are below the reliability threshold 530.

In some implementations, the reliability threshold 530 indicates a threshold number of forward citations. In such implementations, a reliability score for a portion of information indicates a number of forward citations that the portion of information has. In some implementations, the number of forward citations indicates a number of other media content items that cite the portion of information. If the number of other media content items that cite the portion of information is greater than the threshold number of forward citations, then the portion of information is more likely to be reliable. As such, in some implementations, the content curation engine 500 extracts the portion of information if the number of other media content items that cite the portion of information is greater than the threshold number of forward citations. If the number of other media content items that cite the portion of information is less than the threshold number of forward citations, then the portion of information is less likely to be reliable. As such, in some implementations, the content curation engine 500 forgoes extracting the portion of information if the number of other media content items that cite the portion of information is less than the threshold number of forward citations.

In some implementations, the reliability threshold 530 indicates a threshold number of backward citations. In such implementations, a reliability score for a portion of information indicates a number of backward citations that the portion of information has. In some implementations, the number of backward citations indicates a number of other media content items that the portion of information cites. If the number of other media content items that the portion of information cites is greater than the threshold number of backward citations, then the portion of information is more likely to be reliable. As such, in some implementations, the content curation engine 500 extracts the portion of information if the number of other media content items that the portion of information cites is greater than the threshold number of forward citations. If the number of other media content items that the portion of information cites is less than the threshold number of backward citations, then the portion of information is less likely to be reliable. As such, in some implementations, the content curation engine 500 forgoes extracting the portion of information if the number of other media content items that the portion of information cites is less than the threshold number of backward citations.

In some implementations, the reliability threshold 530 indicates a set of trusted information sources (e.g., journal papers, news articles from well-established news outlets, textbooks, etc.). In such implementations, a reliability score for a portion of information indicates types of information sources that the portion of information cites. In some implementations, the content curation engine 500 extracts a portion of information if the portion of information cites information sources that are among the set of trusted information sources. For example, the content curation engine 500 extracts a portion of information in response to determining that the portion of the information cites peer-reviewed journal articles. In some implementations, the content curation engine 500 forgoes extracting a portion of information if the portion of information cites information sources that are not among the set of trusted information sources. For example, the content curation engine 500 forgoes extracting a portion of information in response to determining that the portion of information cites a crowd-sourced news article with unverified facts.

Figure 5D:
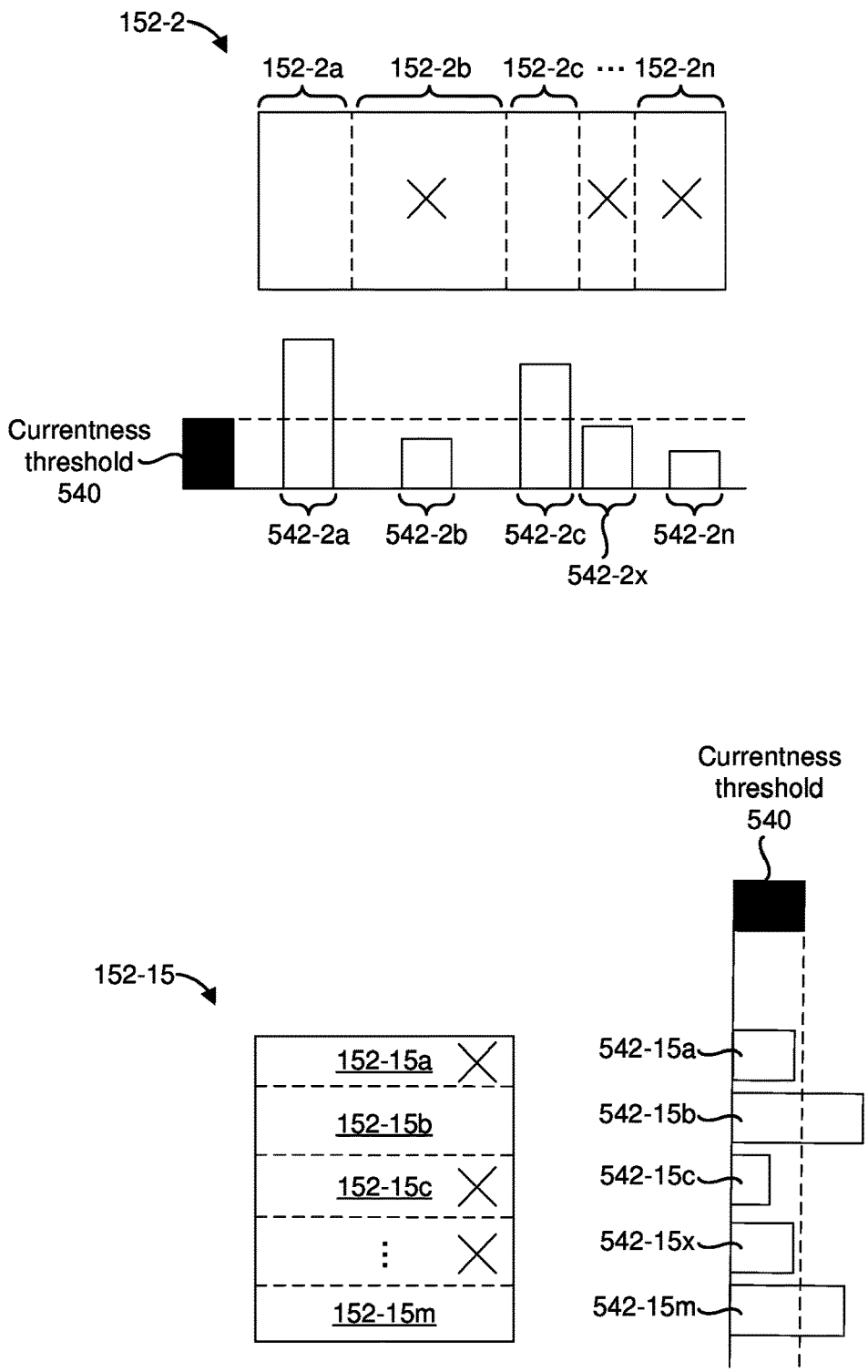

Referring to FIG. 5D, in various implementations, the content curation engine 500 extracts a portion of the information from a media content item 152 in response to determining that the portion satisfies a currentness threshold 540. In some implementations, the content curation engine 500 determines respective currentness scores for the portions and extracts the portions with currentness scores that satisfy (e.g., exceed) the currentness threshold 540. For example, the content curation engine 500 extracts the first video portion 152-2a and the third video portion 152-2c because their currentness scores 542-2a and 542-2c, respectively, exceed the currentness threshold 540. Similarly, the content curation engine 500 extracts the second ebook portion 152-15b and the mth ebook portion 152-15m because their currentness scores 542-15b and 542-15m, respectively, exceed the currentness threshold 540.

In various implementations, the content curation engine 500 forgoes extracting portions with currentness scores that breach (e.g., are less than) the currentness threshold 540. For example, the content curation engine 500 forgoes extracting the second video portion 152-2b, the nth video portion 152-2n and the video portions between the third video portion 152-2c and the nth video portion 152-2n because their respective currentness scores 542-2b, 542-2n and 542-2x are below the currentness threshold 540. Similarly, the content curation engine 500 forgoes extracting the first ebook portion 152-15a, the third ebook portion 152-15c and the ebook portions between the third ebook portion 152-15c and the mth ebook portion 152-15m because their respective currentness scores 542-15a, 542-15c and 542-15x are below the currentness threshold 540.

In some implementations, the currentness threshold 540 indicates a threshold age. In such implementations, a currentness score for a portion of information indicates an age of the portion of information. In some implementations, the more recent a portion of information is, the more current the portion of information may be. In some implementations, the content curation engine 500 extracts the portion of information, if the age of the portion of information is less than the threshold age. In some implementations, the content curation engine 500 forgoes extracting a portion of information, if the age of the portion of information is more than the threshold age.

In some implementations, the currentness threshold 540 indicates a threshold number. In some implementations, a currentness score for a portion of information indicates a number of later-published media content items that affirm the portion of information. In various implementations, a portion of information is more likely to be current, if later-published media content items (e.g., more recent media content items than the portion of information) affirm or verify the portion of information. As such, in some implementations, the content curation engine 500 extracts the portion of information when a number of later-published media content items that affirm the portion of information exceeds the threshold number. In some implementations, a portion of information is less likely to be current, if later-published media content items do not affirm or actively debunk the portion of information. As such, in some implementations, the content curation engine 500 forgoes extracting a portion of information when the portion of information is not affirmed by at least a number of later-published media content items that exceed the threshold number.

Figure 5E:
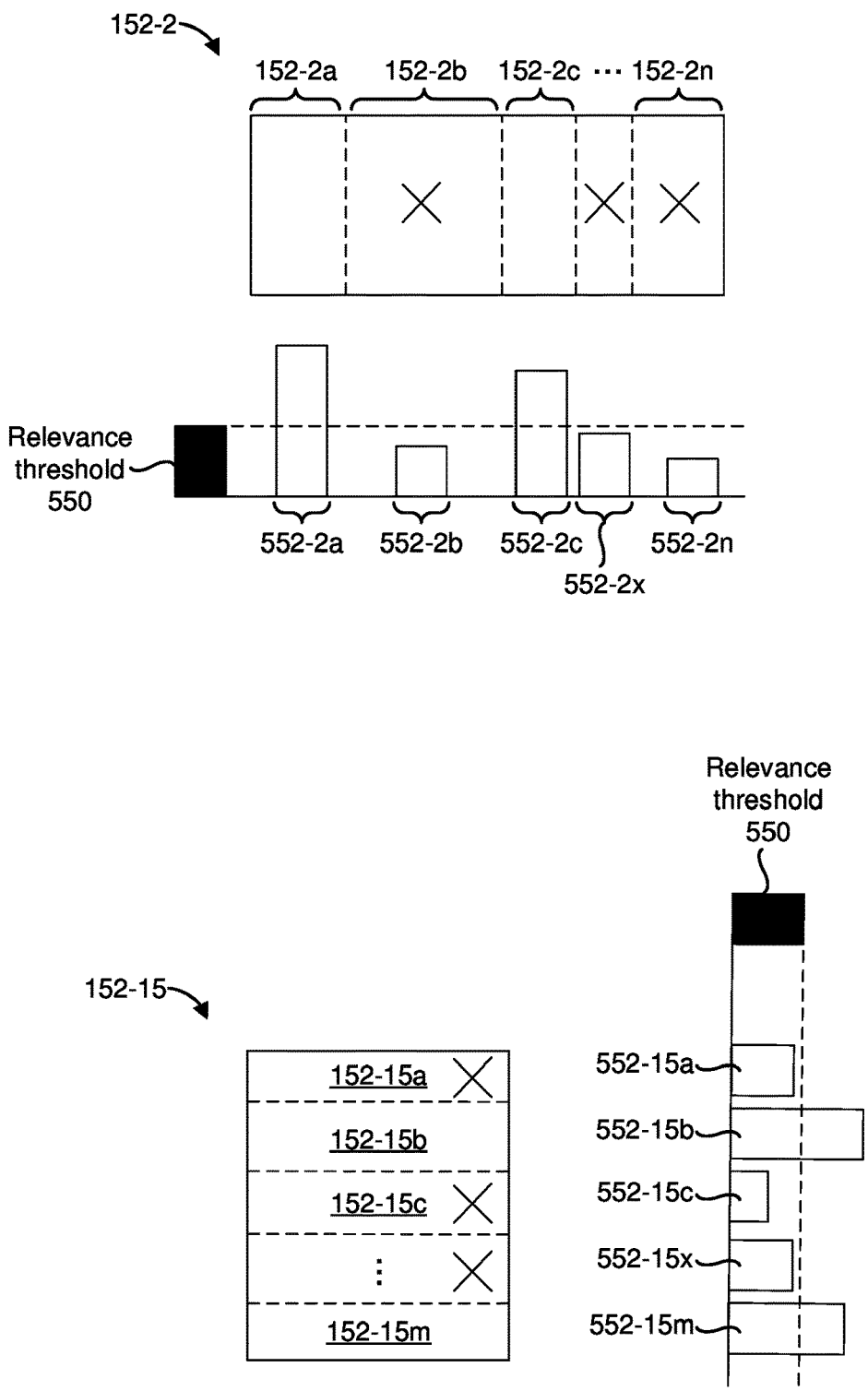

Referring to FIG. 5E, in various implementations, the content curation engine 500 extracts a portion of the information from a media content item 152 in response to determining that the portion satisfies a relevance threshold 550. In some implementations, the content curation engine 500 determines respective relevance scores for the portions and extracts the portions with relevance scores that satisfy (e.g., exceed) the relevance threshold 550. For example, the content curation engine 500 extracts the first video portion 152-2a and the third video portion 152-2c because their relevance scores 552-2a and 552-2c, respectively, exceed the relevance threshold 550. Similarly, the content curation engine 500 extracts the second ebook portion 152-15b and the mth ebook portion 152-15m because their relevance scores 552-15b and 552-15m, respectively, exceed the relevance threshold 550.

In various implementations, the content curation engine 500 forgoes extracting portions with relevance scores that breach (e.g., are less than) the relevance threshold 550. For example, the content curation engine 500 forgoes extracting the second video portion 152-2b, the nth video portion 152-2n and the video portions between the third video portion 152-2c and the nth video portion 152-2n because their respective relevance scores 552-2b, 552-2n and 552-2x are below the relevance threshold 550. Similarly, the content curation engine 500 forgoes extracting the first ebook portion 152-15a, the third ebook portion 152-15c and the ebook portions between the third ebook portion 152-15c and the mth ebook portion 152-15m because their respective relevance scores 552-15a, 552-15c and 552-15x are below the relevance threshold 550.

In some implementations, a value of the relevance threshold 550 is based on (e.g., a function of) the contextual data 174 shown in FIG. 5A. For example, in some implementations, the value of the relevance threshold 550 corresponds to the learning style 174a (shown in FIG. 1B) of the user 20. In such implementations, a relevance score for a portion of information indicates whether or not the portion of information conforms to the learning style 174a of the user 20. The content curation engine 500 extracts the portion of information if the portion of information conforms to the learning style 174a and forgoes extracting the portion of information if the portion of information does not conform to the learning style 174a.

In some implementations, a value of the relevance threshold 550 corresponds to the energy level 174b (shown in FIG. 1C) of the user 20. In such implementations, a relevance score for a portion of information indicates whether or not the portion of information matches the energy level 174b of the user 20. The content curation engine 500 extracts the portion of information if the portion of information matches the energy level 174b (e.g., if a level of engagement associated with the portion matches the energy level 174b of the user 20) and forgoes extracting the portion of information if the portion of information does not match the energy level 174b (e.g., if the level of engagement associated with the portion does not match the energy level 174b of the user 20).

In some implementations, a value of the relevance threshold 550 corresponds to the alertness level 174c (shown in FIG. 1D) of the user 20. In such implementations, a relevance score for a portion of information indicates whether or not the portion of information matches the alertness level 174c of the user 20. The content curation engine 500 extracts the portion of information if the portion of information matches the alertness level 174c (e.g., if a complexity of the portion matches the alertness level 174c of the user 20) and forgoes extracting the portion of information if the portion of information does not match the alertness level 174c (e.g., if the complexity of the portion does not match the alertness level 174c of the user 20).

In some implementations, a value of the relevance threshold 550 corresponds to the drowsiness level 174d (shown in FIG. 1E) of the user 20. In such implementations, a relevance score for a portion of information indicates whether or not the portion of information matches the drowsiness level 174d of the user 20. The content curation engine 500 extracts the portion of information if the portion of information matches the drowsiness level 174d and forgoes extracting the portion of information if the portion of information does not match the drowsiness level 174d.

In some implementations, a value of the relevance threshold 550 corresponds to the estimated age 174e (shown in FIG. 1F) of nearby people. In such implementations, a relevance score for a portion of information indicates whether or not the portion of information matches (e.g., is suitable for) the estimated age 174e of nearby people. The content curation engine 500 extracts the portion of information if the portion of information matches the estimated age 174e of nearby people (e.g., if a content rating of the portion matches the estimated age 174e of nearby people) and forgoes extracting the portion of information if the portion of information does not match the estimated age 174e of nearby people (e.g., if the content rating of the portion does not match the estimated age 174e of nearby people).

Referring to FIG. 5F, in some implementations, the content curation engine 500 extracts a portion of information from a media content item in response to determining that the portion of information satisfies the reliability threshold 530 (shown in FIG. 5C), the currentness threshold 540 (shown in FIG. 5D) and the relevance threshold 550 (shown in FIG. 5E). In the example of FIG. 5F, the content curation engine 500 extracts the first video portion 152-2a and the third video portion 152-2c because the first video portion 152-2a and the third video portion 152-2c satisfy the reliability threshold 530, the currentness threshold 540 and the relevance threshold 550, as indicated by the letter 'Y' for the reliability, currentness and relevance of the first video portion 152-2a and the third video portion 152-2c. In the example of FIG. 5F, the content curation engine 500 forgoes extracting the second video portion 152-2b and the nth video portion 152-2n because the second video portion 152-2b and the nth video portion 152-2n do not satisfy the currentness threshold 540, as indicated by the letter 'N' for the currentness of the second video portion 152-2b and the nth video portion 152-2n. In the example of FIG. 5F, the content curation engine 500 forgoes extracting the video portions between the third video portion 152-2c and the nth video portion 152-2n because the video portions do not satisfy the relevance threshold 550, as indicated by the letter 'N' for the relevance of the video portions between the third video portion 152-2c and the nth video portion 152-2n.

In the example of FIG. 5F, the content curation engine 500 extracts the second ebook portion 152-15b and the mth ebook portion 152-15m because the second ebook portion 152-15b and the mth ebook portion 152-15m satisfy the reliability threshold 530, the currentness threshold 540 and the relevance threshold 550, as indicated by the letter 'Y' for the reliability, currentness and relevance of the second ebook portion 152-15b and the mth ebook portion 152-15m. In the example of FIG. 5F, the content curation engine 500 forgoes extracting the first ebook portion 152-15a because the first ebook portion 152-15a does not satisfy the reliability threshold 530, as indicated by the letter 'N' for the reliability of the first ebook portion 152-15a. In the example of FIG. 5F, the content curation engine 500 forgoes extracting the third ebook portion 152-15c because the third ebook portion 152-15c does not satisfy the currentness threshold 540, as indicated by the letter 'N' for the currentness of the third ebook portion 152-15c. In the example of FIG. 5F, the content curation engine 500 forgoes extracting the ebook portions between the third ebook portion 152-15c and the mth ebook portion 152-15m because the ebook portions do not satisfy the relevance threshold 550, as indicated by the letter "N" for the relevance of the ebook portions between the third ebook portion 152-15c and the mth ebook portion 152-15m.

Figure 6:
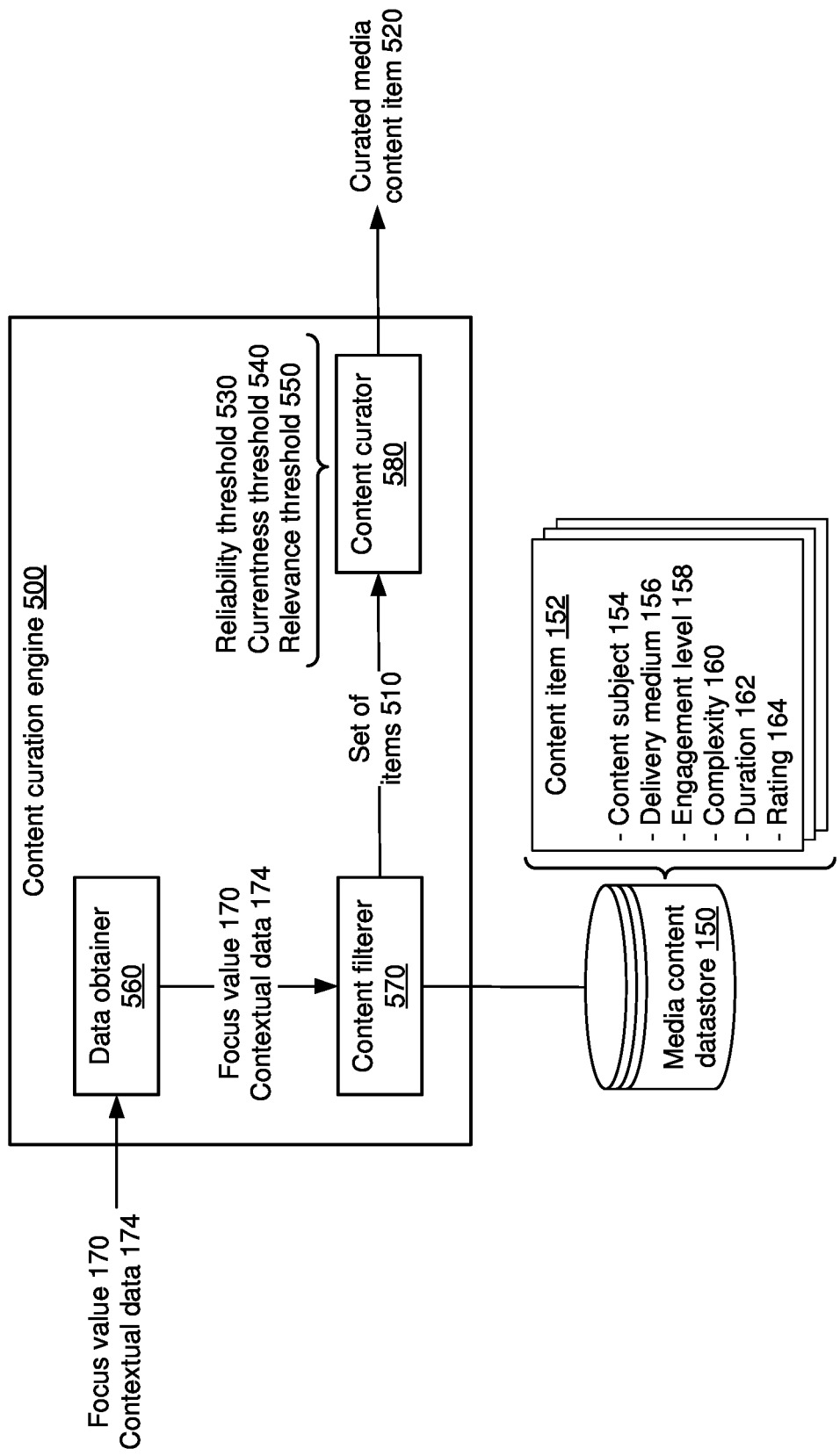
FIG. 6 is a block diagram of a content curation engine in accordance with some implementations.

FIG. 6 is a block diagram of the content curation engine 500 in accordance with some implementations. In various implementations, the content curation engine 500 includes a data obtainer 560, a content filterer 570 and a content curator 580. In various implementations, the data obtainer 560 obtains the user focus indicator value 170 and the contextual data 174. For example, in some implementations, the data obtainer 560 receives the user focus indicator value 170 and the contextual data 174 from the electronic device 30. The data obtainer 560 provides the user focus indicator value 170 and the contextual data 174 to the content filterer 570.

In various implementations, the content filterer 570 identifies a set of items 510 that provides information regarding the subject identified by the user focus indicator value 170. In some implementations, the content filter 570 generates the set of items 510 by identifying media content items 152 with content subjects 154 that match the subject identified by the user focus indicator value 170. In some implementations, the content filter 570 generates the set of items 510 by filtering out media content items 152 that do not provide information regarding the subject identified by the user focus indicator value 170.

In some implementations, the content filter 570 identifies the set of items 510 based on the contextual data 174. In some implementations, the set of items 510 includes media content items 152 that are contextually relevant to a context indicated by the contextual data 174. In some implementations, the content filter 570 generates the set of items 510 by filtering out media content items 152 that are not contextually relevant to the context indicated by the contextual data 174.

In some implementations, the content filter 570 utilizes a set of media content filters (e.g., the media content filters 110 shown in FIG. 2) to identify the set of items 510. In some implementations, the content filter 570 determines filter values (e.g., the filter values 130 shown in FIG. 2) for the set of media content filters based on the contextual data 174. To that end, in various implementations, the content filter 570 performs the operations described with respect to the filter value determiner 104 (shown in FIG. 2) to identify the set of items 510.

In some implementations, the set of items 510 includes two or more media content items 152. In some implementations, the media content items 152 in the set of items 510 utilize different delivery mediums to provide the information regarding the subject indicated by the user focus indicator value 170. For example, in some implementations, one media content item 152 in the set of items 510 utilizes textual delivery (e.g., the fifteenth media content item 152-15 shown in FIG. 5B), whereas another media content item 152 in the set of items 510 utilizes video delivery (e.g., the second media content item 152-2 shown in FIG. 5B).

In various implementations, the content curator 580 curates (e.g., synthesizes, for example, generates) the curated media content item 520 based on the set of items 510. In various implementations, the content curator 580 extracts portions of information from the set of items 510, and synthesizes the curated media content item 520 by placing the extracted portions of information in a data container. In some implementations, the content curator 580 extracts portions of information from the set of items 510 such that the curated media content item 520 includes portions of information that are associated with different delivery mediums. For example, in some implementations, the content curator 580 extracts portions of information from the set of items 510 such that curated media content item 520 includes a portion of the text from the fifteenth media content item 152-15 and a portion of the video from the second media content item 152-2.

In various implementations, the content curator 580 performs reliability analysis on the set of items 510 to identify portions of information that satisfy the reliability threshold 530. In some implementations, portions of information that satisfy the reliability threshold 530 are more likely to be reliable. As such, in some implementations, the content curator 580 extracts the portions of information that satisfy the reliability threshold 530 and includes the portions of information that satisfy the reliability threshold 530 in the curated media content item 520. In some implementations, portions of information that breach the reliability threshold 530 are less likely to be reliable. As such, in some implementations, the content curator 580 forgoes extracting the portions of information that breach the reliability threshold 530 and does not include the portions of information that breach the reliability threshold 530 in the curated media content item 520.

In some implementations, the content curator 580 generates respective reliability scores for the portions of information. In such implementations, the content curator 580 extracts the portions of information with reliability scores that are greater than the reliability threshold 530 for inclusion in the curated media content item 520. The content curator 580 forgoes extracting the portions of information with reliability scores that are less than the reliability threshold 530. As described in relation to FIG. 5C, in some implementations, the content curator 580 generates a reliability score for a particular portion of information by identifying a number of citations associated with the particular portion (e.g., a number of forward citations and/or a number of backward citations) and comparing the number of citations to a threshold number of citations.

In various implementations, the content curator 580 performs currentness analysis on the set of items 510 to identify portions of information that satisfy the currentness threshold 540. In some implementations, portions of information that satisfy the currentness threshold 540 are more likely to be current (e.g., up-to-date). As such, in some implementations, the content curator 580 extracts the portions of information that satisfy the currentness threshold 540 and includes the portions of information that satisfy the currentness threshold 540 in the curated media content item 520. In some implementations, portions of information that breach the currentness threshold 540 are less likely to be current. As such, in some implementations, the content curator 580 forgoes extracting the portions of information that breach the currentness threshold 540 and does not include the portions of information that breach the currentness threshold 540 in the curated media content item 520.

In some implementations, the content curator 580 generates respective currentness scores for the portions of information. In such implementations, the content curator 580 extracts the portions of information with currentness scores that are greater than the currentness threshold 540 for inclusion in the curated media content item 520. The content curator 580 forgoes extracting the portions of information with currentness scores that are less than the currentness threshold 540. As described in relation to FIG. 5D, in some implementations, the content curator 580 generates a currentness score for a particular portion of information by comparing an age of the particular portion with a threshold age. As further described in relation to FIG. 5D, in some implementations, the content curator 580 generates a currentness score for a particular portion of information by determining whether later-published media content items have affirmed the particular portion of information.

In various implementations, the content curator 580 performs relevance analysis on the set of items 510 to identify portions of information that satisfy the relevance threshold 550. In some implementations, portions of information that satisfy the relevance threshold 550 are more likely to be contextually relevant. As such, in some implementations, the content curator 580 extracts the portions of information that satisfy the relevance threshold 550 and includes the portions of information that satisfy the relevance threshold 550 in the curated media content item 520. In some implementations, portions of information that breach the relevance threshold 550 are less likely to be contextually relevant. As such, in some implementations, the content curator 580 forgoes extracting the portions of information that breach the relevance threshold 550 and does not include the portions of information that breach the relevance threshold 550 in the curated media content item 520.

In some implementations, the content curator 580 generates respective relevance scores for the portions of information. In such implementations, the content curator 580 extracts the portions of information with relevance scores that are greater than the relevance threshold 550 for inclusion in the curated media content item 520. The content curator 580 forgoes extracting the portions of information with relevance scores that are less than the relevance threshold 550. As described in relation to FIG. 5E, in some implementations, the content curator 580 generates a relevance score for a particular portion of information by determining a relevance of the particular portion to the learning style 174*a* (shown in FIG. 1B) of the user 20, the energy level 174*b* (shown in FIG. 1C) of the user 20, the alertness level 174*c* (shown in FIG. 1D) of the user 20, the drowsiness level 174*d* (shown in FIG. 1E) of the user 20 and/or the estimated age 174*e* (shown in FIG. 1F) of nearby people.

Figure 7:
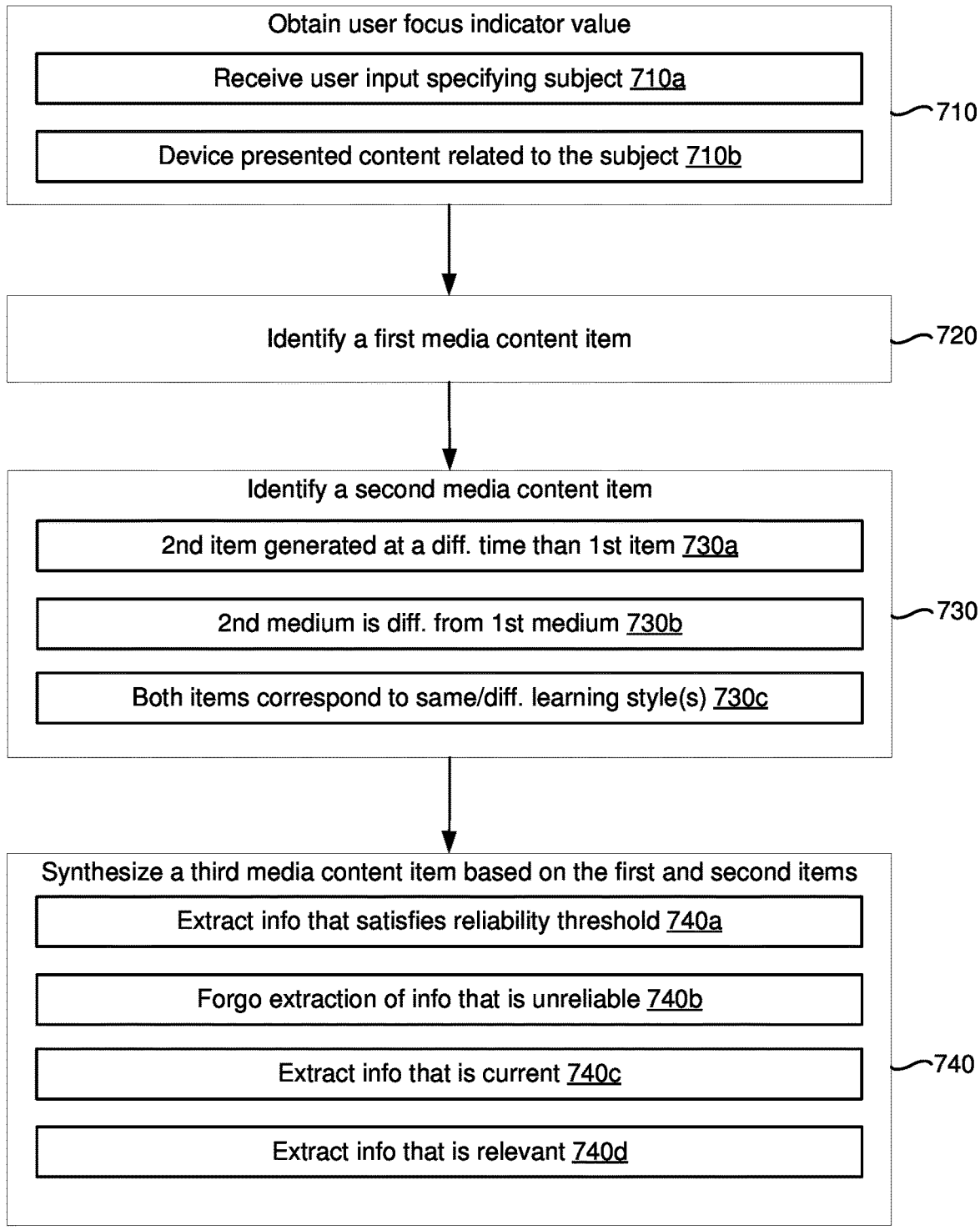
FIG. 7 is a flowchart representation of a method of curating content in accordance with some implementations.

FIG. 7 is a flowchart representation of a method 700 of curating content. In various implementations, the method 700 is performed by a device with a non-transitory memory and one or more processors coupled with the non-transitory memory (e.g., the electronic device 30 and/or the content curation engine 500 shown in FIG. 5A). In some implementations, the method 700 is performed by processing logic, including hardware, firmware, software, or a combination thereof. In some implementations, the method 700 is performed by a processor executing code stored in a non-transitory computer-readable medium (e.g., a memory).

As represented by block 710, in some implementations, the method 700 includes obtaining a user focus indicator value that is associated with a subject. For example, as shown in FIG. 5A, the content curation engine 500 receives the user focus indicator value 170 from the electronic device 30. In some implementations, the user focus indicator value includes a user interest value that indicates that the user is interested in the subject.

As represented by block 710*a*, in some implementations, the method 700 includes receiving a user input that specifies the subject. In some implementations, the user input specifies that the user is interested in learning about the subject. For example, in some implementations, the user 20 provides a user input, via the electronic device 30, that specifies the subject.

As represented by block 710*b*, in some implementations, the method 700 includes detecting that the electronic device has presented media content items that relate to the subject within a threshold amount of time. For example, the method 700 includes detecting that the electronic device 30 has presented media content items 152 related to the Civil War within the last 2 weeks.

As represented by block 720, in some implementations, the method 700 includes identifying, based on the user focus indicator value, a first media content item that includes information about a first plurality of subjects including a first primary subject that matches the particular subject associated with the user focus indicator value. In some implementations, the first media content item is associated with a first content delivery medium. For example, as shown in FIG. 5B, the content curation engine 500 identifies the second media content item 152-2 that has a second delivery medium value 156-2 indicating that the second media content item 152-2 includes is a video.

As represented by block 730, in some implementations, the method 700 includes identifying a second media content item that includes a second plurality of subjects including a second primary subject. In some implementations, the second plurality of subjects includes the particular subject associated with the user focus indicator value and the second media content item is associated with a second content delivery medium that is different from the first content delivery medium. For example, as shown in FIG. 5B, the content curation engine 500 identifies the fifteenth media content item 152-15 that has a fifteenth delivery medium value 156-15 indicating that the fifteenth media content item 152-15 is an ebook.

As represented by block 730*a*, in some implementations, the first media content item was generated at a first time and the second media content item was generated at a second time that is after the first time. For example, in some implementations, the video represented by the second media content item 152-2 in FIG. 5B was created in the year 2010, and the ebook represented by the fifteenth media content item 152-15 was published in the year 2016.

As represented by block 730*b*, in some implementations, the first content delivery medium is visual and the second content delivery medium is aural. For example, in some implementations, the first media content item is a video, a web article or an ebook, and the second media content item is a podcast, a radio station, an audio file or a song. In some implementations, the first content delivery medium is textual and the second content delivery medium is video. For example, in some implementations, the first media content item is a web article or an ebook, and the second media content item is a video. In some implementations, the first content delivery medium is textual and the second content delivery medium is aural. For example, the first media content item is a web article or an ebook, and the second media content item is a podcast, a talk show, a radio station, an audio file or a song.

As represented by block 730*c*, in some implementations, the first content delivery medium corresponds to a first learning style and the second content delivery medium corresponds to a second learning style. In some implementations, media content items delivered via the first content delivery medium are more suitable for the first learning style, and media content items delivered via the second content delivery medium are more suitable for the second learning style. For example, the first delivery medium is more suitable for a user with an active learning style (e.g., for a user who likes to learn by doing), whereas the second content delivery medium is more suitable for a user with a passive learning style (e.g., for a user who likes to learn by watching). Alternatively, in some implementations, the first content delivery medium and the second content delivery medium correspond to (e.g., are suitable for) the same learning style (e.g., the first learning style).

As represented by block 740, in some implementations, the method 700 includes synthesizing a third media content item based on a portion of the information included in the first media content item and a portion of the information included in the second media content item. For example, as shown in FIG. 5B, the content curation engine 500 synthesizes the curated media content item 520 by selectively extracting portions of the second media content item 152-2 and the fifteenth media content item 152-15. In some implementations, the third media content item is associated with a combination of the first content delivery medium and the second content delivery medium. For example, as shown in FIG. 5B, the curated media content item 520 utilizes video delivery (e.g., for displaying the first video portion 152-2*a* and the third video portion 152-2*c*) and textual delivery (e.g., for displaying the second ebook portion 152-15*b* and the mth ebook portion 152-15*m*).

As represented by block 740*a*, in some implementations, the method 700 includes extracting the portion of the information included in the first media content item in response to the portion of the information included in the first media item satisfying a reliability threshold. For example, as shown in FIG. 5C, the content curation engine 500 extracts the first video portion 152-2*a* and the third video portion 152-2*c* because their reliability scores 532-2*a* and 532-2*c*, respectively, exceed the reliability threshold 530.

In some implementations, the method 700 includes determining a reliability of the portion of the information included in the first media content item based on a number of citations associated with the portion of the information included in the first media content item satisfying a citation criterion. In some implementations, the citation criterion indicates a threshold number of citations. In some implementations, the reliability of the portion of the information indicates a likelihood of the portion of the information being accurate. In some implementations, the citation criterion indicates a threshold number of citations. In such implementations, the method 700 includes extracting the portion of the information in response to the number of citations associated with the portion of the information being greater than the threshold number of citations.

In some implementations, the method 700 includes determining that a number of other media content items that cite the portion of the information included in the first media content item is greater than a threshold number. For example, in some implementations, the method 700 includes determining that a number of forward citations associated with the portion of the information exceeds a threshold number of forward citations.

In some implementations, the method 700 includes determining that a number of other media content items cited by the portion of the information included in the first media content item is greater than a threshold number. For example, in some implementations, the method 700 includes determining that a number of backward citations associated with the portion of the information exceeds a threshold number of backward citations.

In some implementations, the method 700 includes determining that a number of other media content items cited by the portion of the information included in the first media content item are from a content publisher that satisfies a content publisher criterion. In some implementations, the content publisher criterion specifies a set of whitelisted content publishers. In some implementations, the method 700 includes extracting the portion of the information in response to the portion of the information citing other media content items that are from the set of whitelisted content publishers specified by the content publisher criterion. In some implementations, the content publisher criterion specifies a type of content publisher (e.g., a news organization, a book publishing company, etc.). In some implementations, the method 700 includes extracting the portion of the information in response to the portion of the information citing other media content items that are from the type of content publisher specified by the content publisher criterion.

As represented by block 740*b*, in some implementations, the method 700 includes forgoing extraction of another portion of the information included in the first media content item that is unreliable. For example, as shown in FIG. 5B, in some implementations, the content curation engine 500 forgoes extracting the second video portion 152-2*b*, the nth video portion 152-2*n* and the video portions between the third video portion 152-2*c* and the nth video portion 152-2*n* in response to the content curation engine 500 determining that the second video portion 152-2*b*, the nth video portion 152-2*n* and the video portions between the third video portion 152-2*c* and the nth video portion 152-2*n* are unreliable.

In some implementations, the method 700 includes determining that the other portion is unreliable in response to the other portion breaching a citation criterion. In some implementations, the method 700 includes determining that the other portion is unreliable based on a number of forward citations associated with the other portion. In some implementations, the method 700 includes determining that a number of other media content items that cite the other portion is less than a threshold number. In some implementations, the method 700 includes determining that the other portion is unreliable based on a number of backward citations associated with the other portion. In some implementations, the method 700 includes determining that a number of other media content items cited by the other portion is less than a threshold number.

In some implementations, determining that the other portion is unreliable includes determining that a number of other media content items cited by the other portion are from a content publisher that breaches a content publisher criterion. In some implementations, the content publisher criterion specifies a set of content publishers and the other media content items cited by the other portion are not from the set of content publishers specified by the content publisher criterion. In some implementations, the content publisher criterion specifies a type of content publisher (e.g., a news organization, a book publishing company, etc.) and the other media content items cited by the other portion are not from the type of content publisher specified by the content publisher criterion.

As represented by block 740*c*, in some implementations, the method 700 includes extracting the portion of the information included in the first media content item in response to determining that the portion of the information included in the first media item is current. For example, as shown in FIG. 5D, the content curation engine 500 extracts the first video portion 152-2*a* and the third video portion 152-2*c* because their currentness scores 542-2*a* and 542-2*c*, respectively, exceed the currentness threshold 540.

In some implementations, the method 700 includes determining that the portion of the information included in the first media content item is current based on a recency of the first media content item. In some implementations, the method 700 includes determining that the portion of the information included in the first media content item is current based on an age of the first media content item. In some implementations, the method 700 includes determining that the portion of the information is current in response to a time at which the first media content item was published being within a threshold amount of time from a current time.

In some implementations, the method 700 includes determining that the portion of the information included in the first media content item is current based on a later-published media content item affirming the portion of the information. In some implementations, the method 700 includes determining that the portion of the information included in the first media content item is current in response to other media content items, published after the first media content item and within a threshold amount of time of a current time, affirming the portion of the information included in the first media content item.

In some implementations, the method 700 includes forgoing extraction of another portion of the information included in the first media content item in response to determining that the other portion is not current. For example, as shown in FIG. 5D, the content curation engine 500 forgoes extracting the second video portion 152-2b, the nth video portion 152-2n and the video portions between the third video portion 152-2c and the nth video portion 152-2n because their respective currentness scores 542-2b, 542-2n and 542-2x are below the currentness threshold 540.

As represented by block 740d, in some implementations, the method 700 includes extracting the portion of the information included in the first media content item in response to the portion of the information included in the first media content item satisfying a relevancy threshold in relation to the user focus indicator value. For example, as shown in FIG. 5E, the content curation engine 500 extracts the first video portion 152-2a and the third video portion 152-2c because their relevance scores 552-2a and 552-2c, respectively, exceed the relevance threshold 550.

In some implementations, the content curation engine 500 forgoes extracting another portion of the information included in the first media content item in response to the other portion of the information included in the first media content item breaching the relevancy threshold in relation to the user focus indicator value. For example, as shown in FIG. 5E, the content curation engine 500 forgoes extracting the second video portion 152-2b, the nth video portion 152-2n and the video portions between the third video portion 152-2c and the nth video portion 152-2n because their respective relevance scores 552-2b, 552-2n and 552-2x are below the relevance threshold 550.

Figure 8:
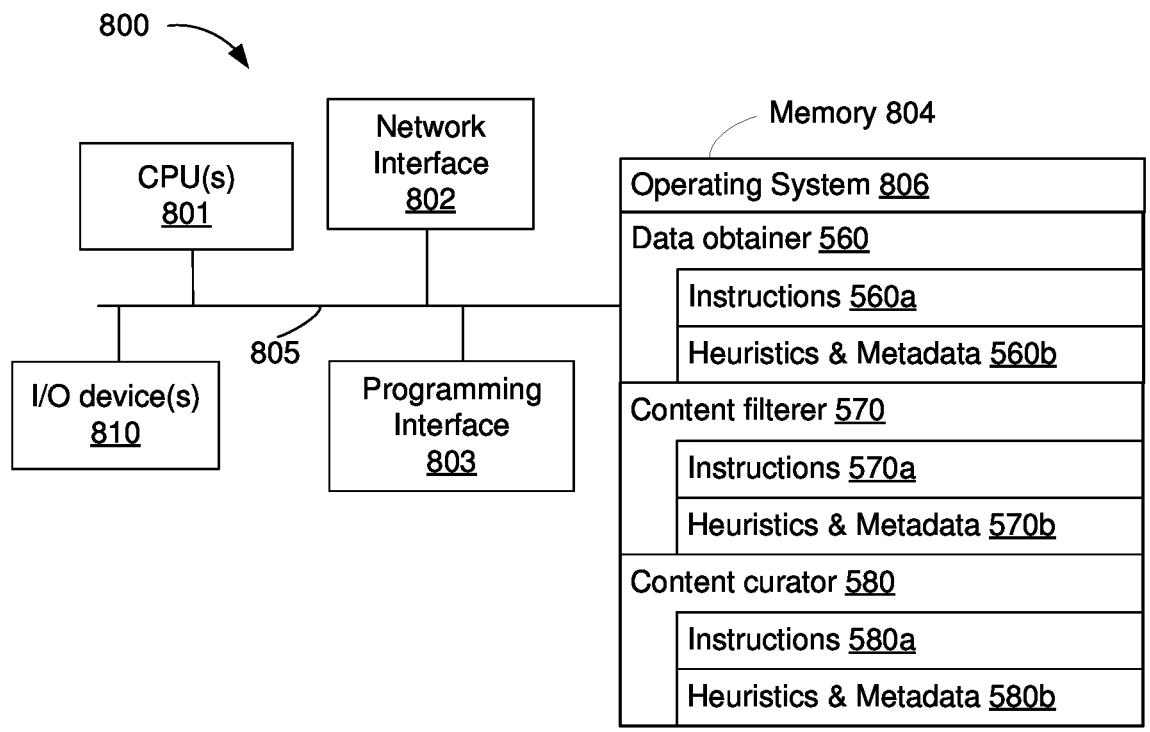
FIG. 8 is a block diagram of a device that curates content in accordance with some implementations.

FIG. 8 is a block diagram of a device 800 that curates content in accordance with some implementations. In some implementations, the device 800 implements the electronic device 30 and/or the content curation engine 500 shown in FIG. 5A. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 800 includes one or more processing units (CPUs) 801, a network interface 802, a programming interface 803, a memory 804, one or more input/output (I/O) devices 810, and one or more communication buses 805 for interconnecting these and various other components.

In some implementations, the network interface 802 is provided to, among other uses, establish and maintain a metadata tunnel between a cloud hosted network management system and at least one private network including one or more compliant devices. In some implementations, the one or more communication buses 805 include circuitry that interconnects and controls communications between system components. The memory 804 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 804 optionally includes one or more storage devices remotely located from the one or more CPUs 801. The memory 804 comprises a non-transitory computer readable storage medium.

In some implementations, the memory 804 or the non-transitory computer readable storage medium of the memory 804 stores the following programs, modules and data structures, or a subset thereof including an optional operating system 806, the data obtainer 560, the content filterer 570 and the content curator 580. In various implementations, the device 800 performs the method 700 shown in FIG. 7.

In some implementations, the data obtainer 560 obtains a user focus indicator value (e.g., the user focus indicator value 170 shown in FIGS. 5A and 6) and contextual data (e.g., the contextual data 174 shown in FIGS. 5A and 6). In some implementations, the data obtainer 560 performs the operation(s) represented by block 710 in FIG. 7. To that end, the data obtainer 560 includes instructions 560a, and heuristics and metadata 560b.

In some implementations, the content filterer 570 identifies a set of two or more media content items based on the user focus indicator value (e.g., the set of items 510 shown in FIGS. 5A and 6, for example, the second media content item 152-2 and the fifteenth media content item 152-15 shown in FIG. 5B). In some implementations, the content filterer 570 performs the operations(s) represented by blocks 720 and 730 shown in FIG. 7. To that end, the content filterer 570 includes instructions 570a, and heuristics and metadata 570b.

In some implementations, the content curator 580 synthesizes a media content item (e.g., the curated media content item 520 shown in FIGS. 5A, 5B and 6) based on the set of media content items that the content filterer 570 identifies. In some implementations, the content curator 580 performs the operation(s) represented by block 740 shown in FIG. 7. To that end, the content curator 580 includes instructions 580a, and heuristics and metadata 580b.

In some implementations, the one or more I/O devices 810 include one or more sensors for capturing contextual data (e.g., the contextual data 174 shown in FIGS. 5A and 6). For example, in some implementations, the one or more I/O devices 810 include an image sensor (e.g., a camera), an ambient light sensor (ALS), a microphone, a location sensor, a heart rate sensor and/or a blood glucose sensor. In some implementations, the one or more I/O devices 810 include a display, a speaker and/or a haptic device (e.g., a vibrational device that generates vibrations) for presenting the media content item synthesized by the content curator 580 (e.g., for presenting the curated media content item 520 shown in FIGS. 5A, 5B and 6).

Information is curated in various fixed forms such as books, newspapers, articles, web pages, podcasts, video, etc. However, the information cannot be automatically updated. As such, portions of the information becomes inaccurate or irrelevant. Some portions of the information start becoming inaccurate and/or irrelevant as early as its curation date.

The present disclosure provides methods, systems, and/or devices for updating a media content item that provides information regarding a subject based on information provided by another media content item related to that subject. A media content item can be updated based on information provided by a more recent media content item. For example, a device identifies information in an old media content item that is outdated, and replaces the outdated information with up-to-date information from a newer media content item. A media content item can be updated to rectify inaccuracies. For example, a device identifies information in a media content item that is inaccurate, and replaces the inaccurate information with accurate information from another media content item.

A media content item can be updated to include information that is more relevant to what the user is interested in learning. For example, a device identifies information in a media content item that is not relevant to the user, and replaces the irrelevant information with relevant information from another media content item. A media content item can be updated to include information that is contextually more relevant to a context of a device or a user of the device. For example, a device identifies information in a media content item that is not relevant to a context of the user, and replaces the irrelevant information with contextually relevant information from another media content item.

Updating a media content item based on information provided by another media content item enhances a user experience of the device by presenting information that is more accurate, current and/or relevant. Updating the media content item based on information provided by another media content item tends to improve operability of the device by reducing battery consumption resulting from unnecessary user inputs that correspond to the user trying to verify the accuracy and/or currentness of information presented by the device.

Figure 9A:
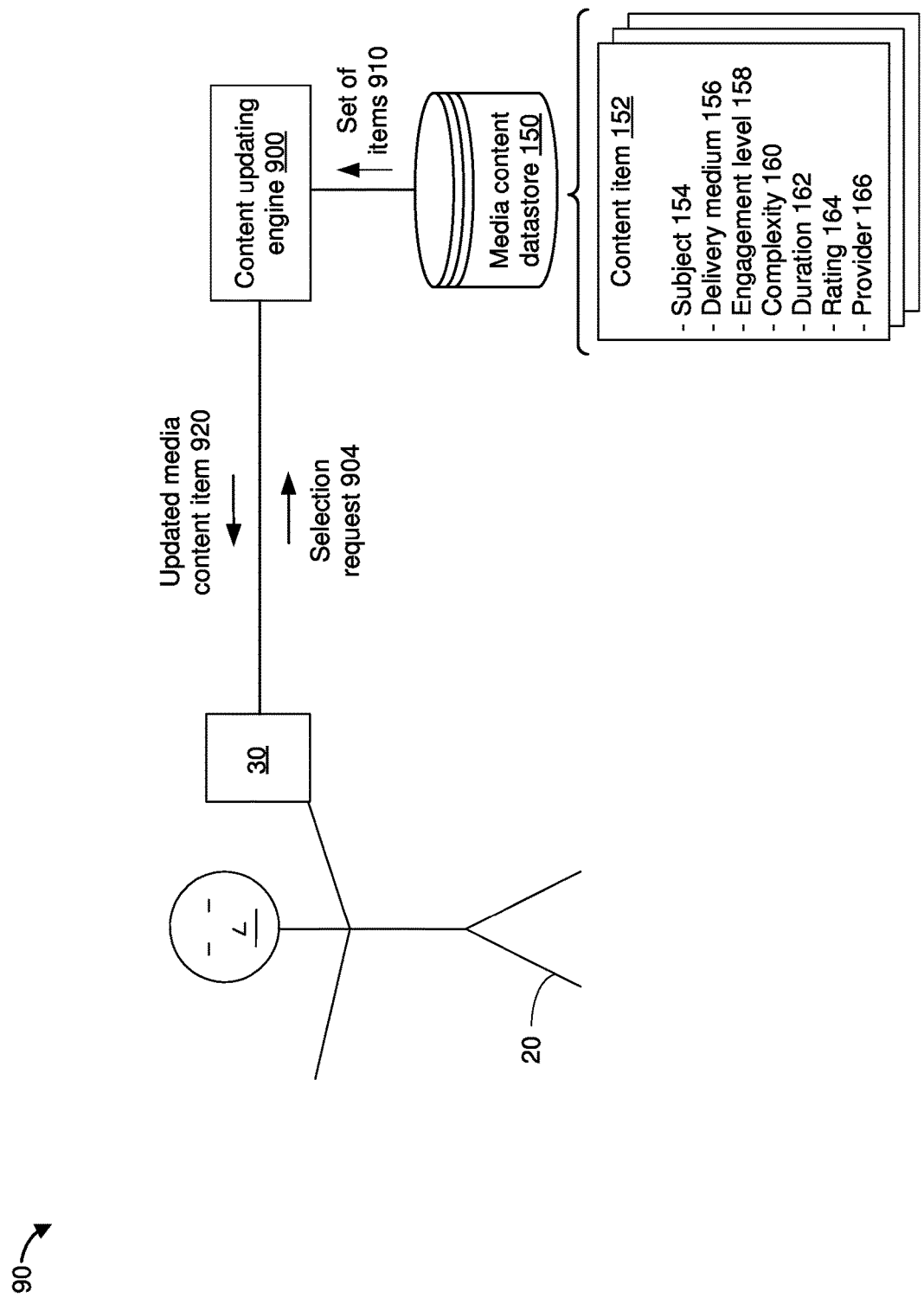
FIGS. 9A-9F are diagrams of another example operating environment in accordance with some implementations.

FIG. 9A is a block diagram of an example operating environment 90 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 90 includes the electronic device 30, a content updating engine 900 and the media content datastore 150.

Although the content updating engine 900 is shown as being separate from the electronic device 30. In some implementations, the content updating engine 900 is integrated into the electronic device 30. Although the media content datastore 150 is shown as being separate from the content updating engine 900. In some implementations, the media content datastore 150 is integrated into the content updating engine 900. In some implementations, the content updating engine 900 and/or the media content datastore 150 reside at the electronic device 30.

In some implementations, the content updating engine 900 is integrated into the content delivery platform 100 shown in FIGS. 1A and 2. As such, in some implementations, the content delivery platform 100 performs the operations described in relation to the content updating engine 900. In some implementations, the content delivery platform 100 (shown in FIGS. 1A and 2) is integrated into the content updating engine 900. As such, in some implementations, the content updating engine 900 performs the operations described in relation to the content delivery platform 100.

In some implementations, the content updating engine 900 is integrated into the content curation engine 500 shown in FIGS. 5A, 5B and 6. As such, in some implementations, the content curation engine 500 performs the operations described in relation to the content updating engine 900. In some implementations, the content curation engine 500 (shown in FIGS. 5A, 5B and 6) is integrated into the content updating engine 900. As such, in some implementations, the content updating engine 900 performs the operations described in relation to the content curation engine 500.

In some implementations, each media content item 152 is associated with a media content provider 166 that provided the media content item 152. In some implementations, the media content provider 166 includes an authoring entity (e.g., an author of the media content item 152). In some implementations, the media content provider 166 includes a publishing entity (e.g., a publisher of the media content item 152, for example, a publishing company or a publishing house). In some implementations, the media content provider 166 includes a producing entity (e.g., a producer of the media content item 152). In some implementations, the media content provider 166 includes a directing entity (e.g., a director of the media content item 152). In some implementations, the media content provider 166 is a person. In some implementations, the media content provider 166 is an autonomous entity (e.g., a bot). In some implementations, the media content datastore 150 stores media content items 152 that are associated with various different media content providers 166. For example, some of the media content items 152 are provided by a first media content provider, some of the media content items 152 are provided by a second media content provider, some of the media content items 152 are provided by a third media content provider, etc.

In various implementations, the content updating engine 900 obtains a selection request 904 that specifies a particular media content item 152 that the user 20 wants to access. In some implementations, the content updating engine 900 receives the selection request 904 from the electronic device 30. For example, in some implementations, the electronic device 30 displays representations of the media content items 152 and the user 20 selects one of the representations of the media content items 152. In such implementations, the selection request 904 indicates the media content item 152 that the user 20 selected. In some implementations, the user 20 provides a voice command that specifies a particular media content item 152, and the selection request 904 indicates the particular media content item 152 specified in the voice command.

In various implementations, the content updating engine 900 identifies a set of items 910 from the various media content items 152 based on the selection request 904. In some implementations, the set of items 910 includes a subset of the media content items 152 that provide information regarding the same subject 154 as the media content item 152 indicated by the selection request 904. In some implementations, the content updating engine 900 identifies the set of items 910 by filtering out media content items 152 that do not provide information regarding the same subject 154 as the media content item 152 indicated by the selection request 904.

In various implementations, the content updating engine 900 updates the particular media content item 152 indicated by the selection request 904 based on the set of items 910 in order to generate an updated media content item 920. In some implementations, the updated media content item 920 includes information that the particular media content item 152 requested by the user 20 does not include. In some implementations, the updated media content item 920 does not include an inaccurate portion of the particular media content item 152 that the user 20 requested. In some implementations, the updated media content item 920 includes an indicator to indicate that a portion of the particular media content item 152 requested by the user 20 is not current.

In various implementations, generating the updated media content item 920 enhances a user experience of the electronic device 30 by presenting information that is current and forgoing presentation of information that is not current.

In various implementations, generating the updated media content item 920 improves operability of the electronic device 30 by reducing the need for user inputs that correspond to the user 20 trying to verify accuracy of the information included in the updated media content item 920.

Figure 9B:
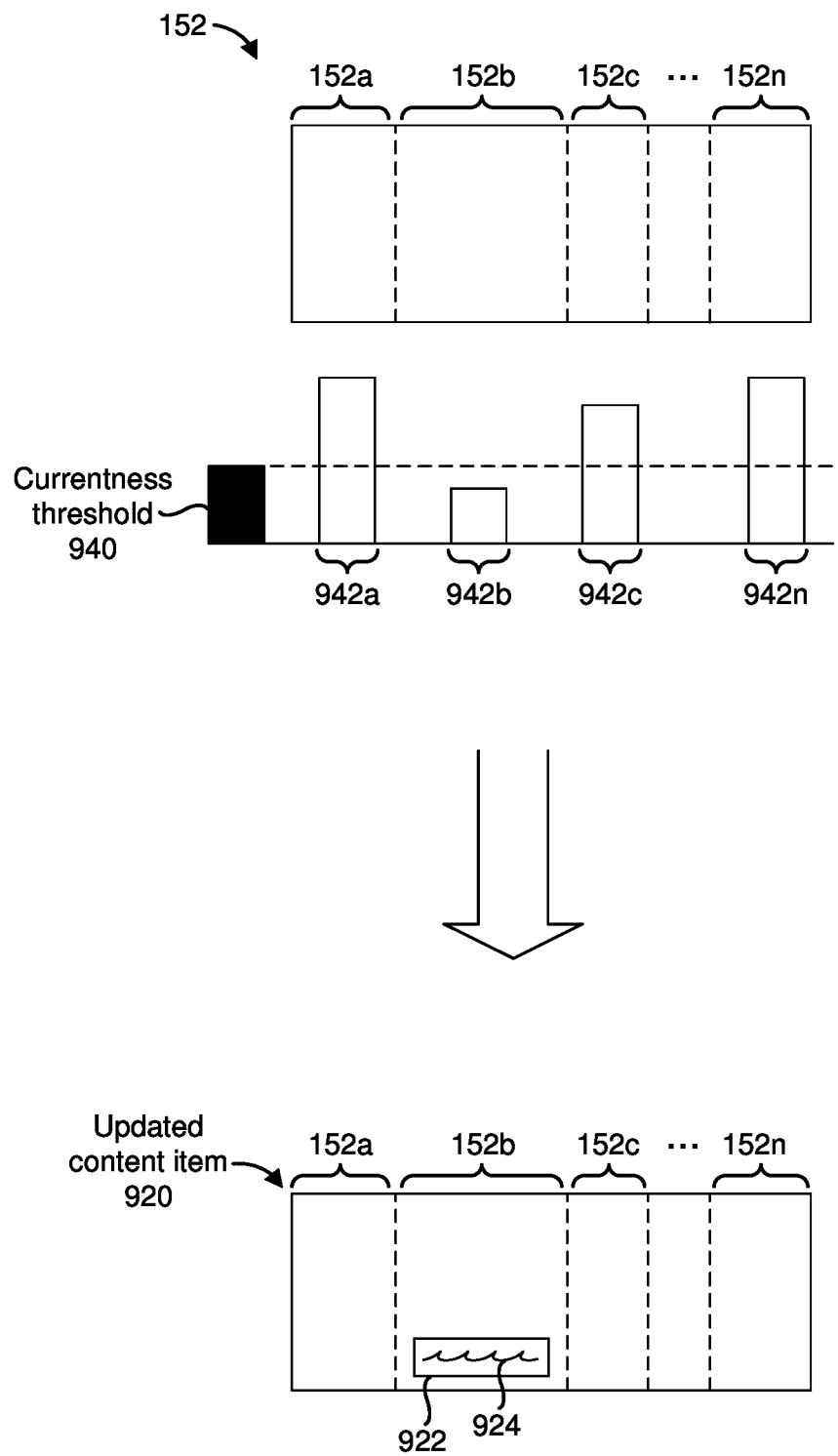

Referring to FIG. 9B, in various implementations, the media content item 152 requested by the user 20 includes a first portion 152a, a second portion 152b, a third portion, . . . , and an nth portion 152n. In some implementations, the content updating engine 900 displays an indicator 922 in association with a portion of the media content item 152 that breaches a currentness threshold 940. In some implementations, the currentness threshold 940 is the same as the currentness threshold 540 shown in FIG. 5D.

In some implementations, the content updating engine 900 determines respective currentness scores for the portions of the media content item 152. For example, the content updating engine 900 determines a first currentness score 942a for the first portion 152a, a second currentness score 942b for the second portion 152b, a third currentness score 942c for the third portion 152c, . . . , and an nth currentness score 942n for the nth portion 152n. As illustrated in FIG. 9B, the first currentness score 942a, the third currentness score 942c, . . . , and the nth currentness score 942n satisfy the currentness threshold 940 (e.g., the first currentness score 942a, the third currentness score 942c, . . . , and the nth currentness score 942n are greater than the currentness threshold 940). However, the second currentness score 942b breaches the currentness threshold 940 (e.g., the second currentness score 942b is less than the currentness threshold 940).

In various implementations, the content updating engine 900 includes an indicator 922 in the updated media content item 920 in order to indicate that a portion of the updated media content item 920 breaches the currentness threshold 940. In the example of FIG. 9B, the indicator 922 indicates that the second portion 152b of the media content item 152 breaches the currentness threshold 940. In some implementations, the indicator 922 includes text 924. In some implementations, the text 924 specifies that the second portion 152b of the media content item 152 may not be current. For example, in some implementations, the text 924 specifies that the second portion 152b of the media content item 152 may be inaccurate. In some implementations, the text 924 specifies that the second portion 152b of the media content item 152 does not cite information from a set of approved information sources. In some implementations, the text 924 specifies that the second portion 152b of the media content item 152 is stale (e.g., the information provided by the second portion 152b is older than a threshold amount of time). In some implementations, the indicator 922 is displayed while the second portion 152b is being presented and not while other portions of the media content items 152 are being presented.

In some implementations, the currentness threshold 940 indicates a threshold age. In such implementations, a currentness score for a portion of the media content item 152 indicates an age of the portion. In some implementations, the more recent a portion is, the more current the portion may be. In some implementations, the currentness score for a portion breaches the currentness threshold 940, if the age of the portion is more than the threshold age. In some implementations, the content updating engine 900 displays the indicator 922 in association with the portion, if the age of the portion is more than the threshold age.

In some implementations, the currentness threshold 940 indicates a threshold number. In some implementations, a currentness score for a portion indicates a number of later-published media content items that disavow or debunk the information provided by the portion. In various implementations, a portion of information is less likely to be current, if later-published media content items (e.g., more recent media content items than the portion of information) disavow the information provided by the portion. As such, in some implementations, the content updating engine 900 displays the indicator 922 in associated with the portion when a number of later-published media content items that disavow the information provided by the portion exceeds the threshold number.

Figure 9C:
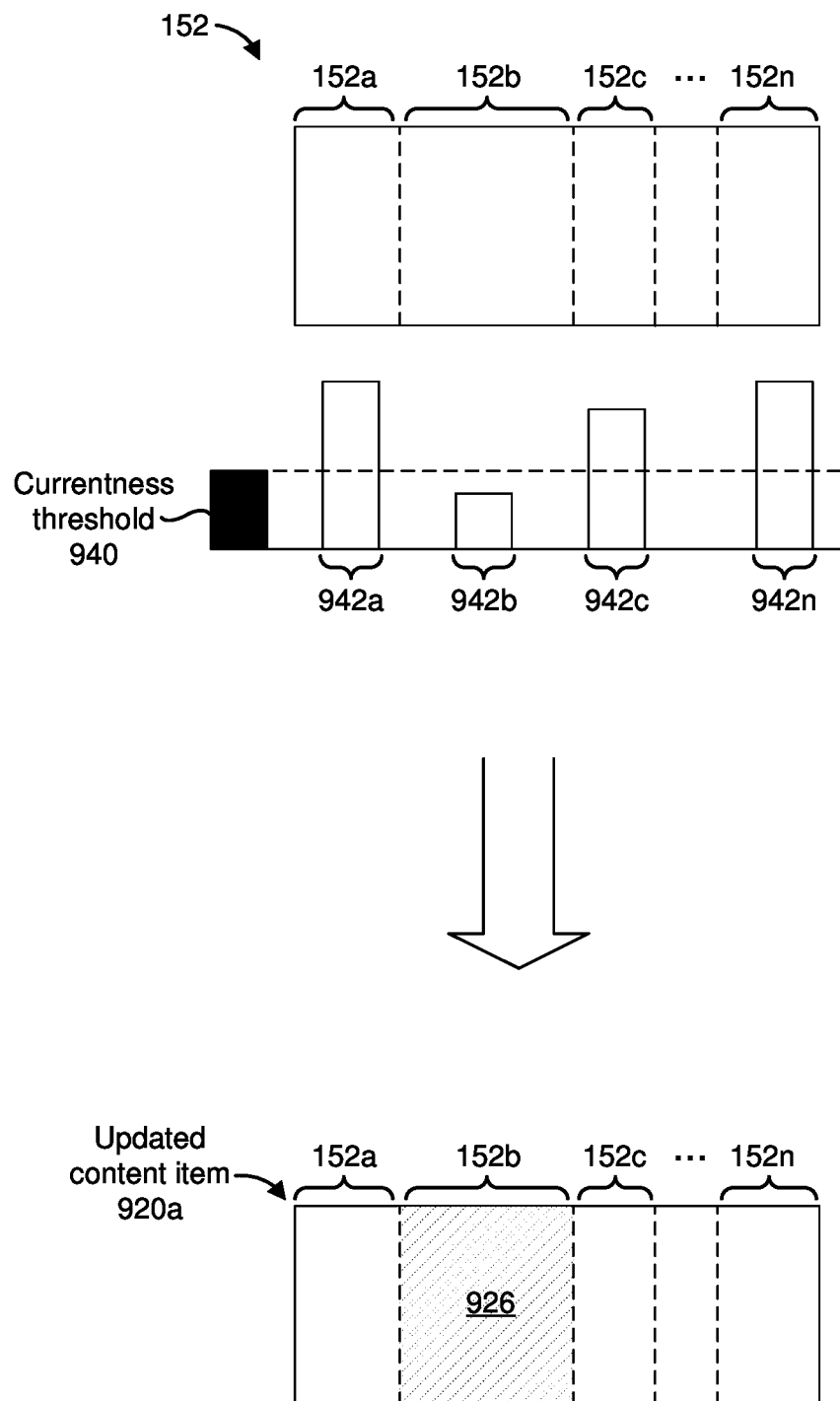

Referring to FIG. 9C, in some implementations, the content updating engine 900 generates an updated media content item 920a by modifying a visual property 926 of a portion of the media content item 152 in response to a currentness score of the portion breaching the currentness threshold 940. In the example of FIG. 9C, the content updating engine 900 modifies the visual property 926 of the second portion 152b of the media content item 152 in order to indicate that the second portion 152b breaches the currentness threshold 940. In some implementations, modifying the visual property 926 of the second portion 152b indicates that the second portion 152b is not current. In some implementations, modifying the visual property 926 of the second portion 152b indicates that the second portion 152b includes inaccurate information or stale information.

In some implementations, the visual property 926 includes a brightness value. For example, in some implementations, the content updating engine 900 lowers the brightness value of the second portion 152b in order to indicate that the second portion 152b breaches the currentness threshold 940. In some implementations, modifying the visual property 926 of the second portion 152b includes graying-out the second portion 152b in order to indicate that the second portion 152b breaches the currentness threshold 940.

In some implementations, modifying the visual property 926 of the second portion 152b includes adjusting a playback speed of the second portion 152b. For example, in some implementations, modifying the visual property 926 of the second portion 152b includes playing the second portion 152b at a faster speed so that playback of the second portion 152b occupies less time.

Figure 9D:
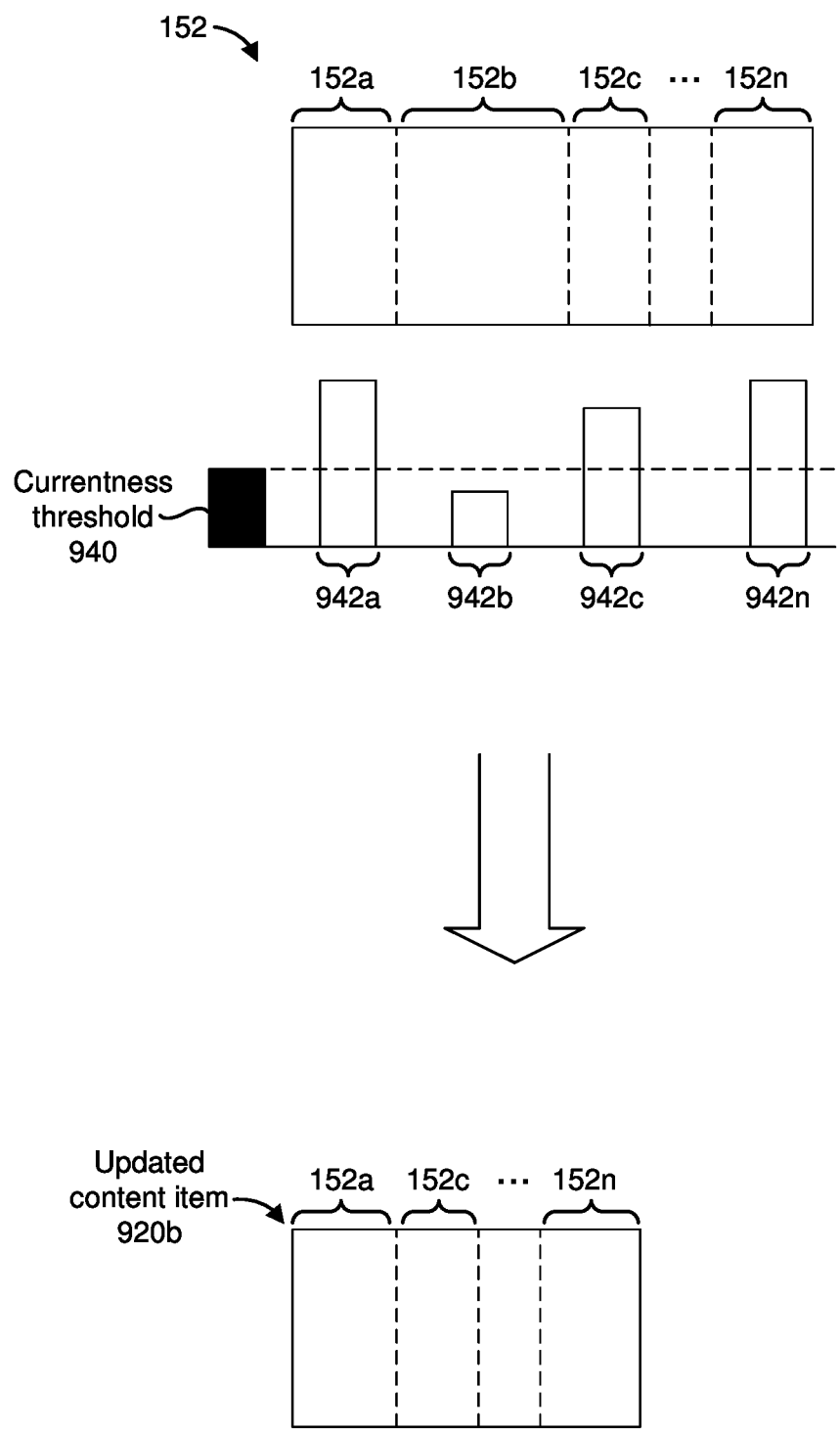

Referring to FIG. 9D, in some implementations, the content updating engine 900 generates an updated media content item 920b by removing (e.g., deleting) a portion of the media content item 152 that breaches the currentness threshold 940. In the example of FIG. 9D, the updated media content item 920b does not include the second portion 152b of the media content item 152, for example, because the second currentness score 942b is less than the currentness threshold 940.

Figure 9E:
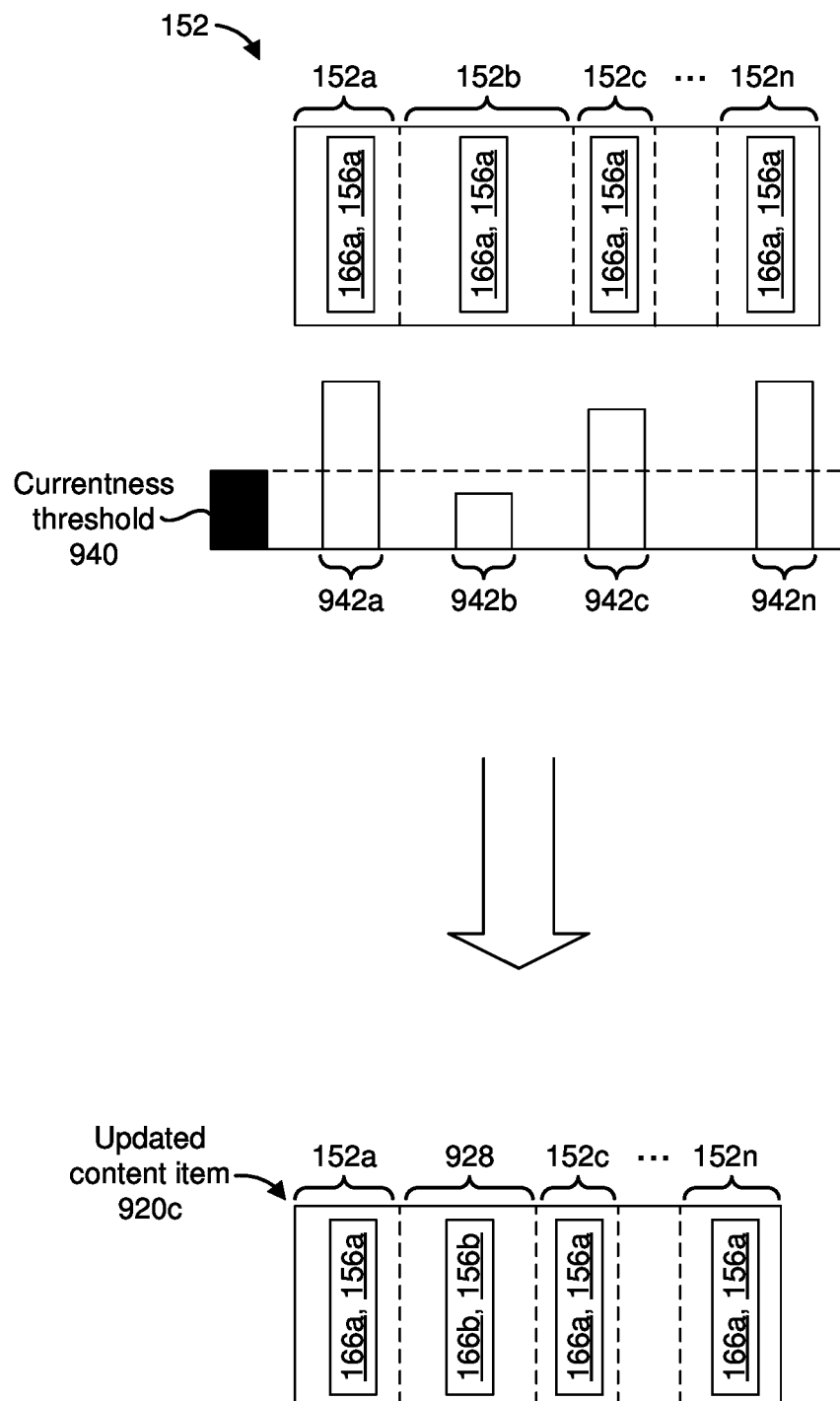

Referring to FIG. 9E, in some implementations, the content updating engine 900 generates an updated media content item 920c by replacing a portion of the media content item 152 that breaches the currentness threshold 940 with a portion from another media content item 152 that satisfies the currentness threshold 940. In the example of FIG. 9E, the content updating engine 900 replaces the second portion 152b of the media content item 152 with a replacement portion 928 from another media content item.

In some implementations, the replacement portion 928 is from another media content provider. For example, in some implementations, the media content item 152 is from a first media content provider 166a (e.g., a first author, a first producer, a first director, a first artist, a first person, a first bot, etc.) and the replacement portion 928 is from a second media content provider 166b that is different from the first media content provider 166a (e.g., a second author, a second producer, a second director, a second artist, a second person, a second bot, etc.).

In some implementations, the replacement portion 928 is associated with a different content delivery medium than the media content item 152. For example, in some implementations, the media content item 152 is associated with a first content delivery medium 156a, and the replacement portion 928 is associated with a second content delivery medium 156b that is different from the first content delivery medium 156a. In some implementations, the first content delivery medium 156a includes visual delivery, and the second content delivery medium 156b includes aural delivery (e.g., audio delivery). In some implementations, the first content delivery medium 156a includes a first type of visual delivery (e.g., video delivery, for example, a documentary movie), and the second content delivery medium 156b includes a second type of visual delivery (e.g., textual delivery, for example, a portion of an ebook).

Figure 9F:
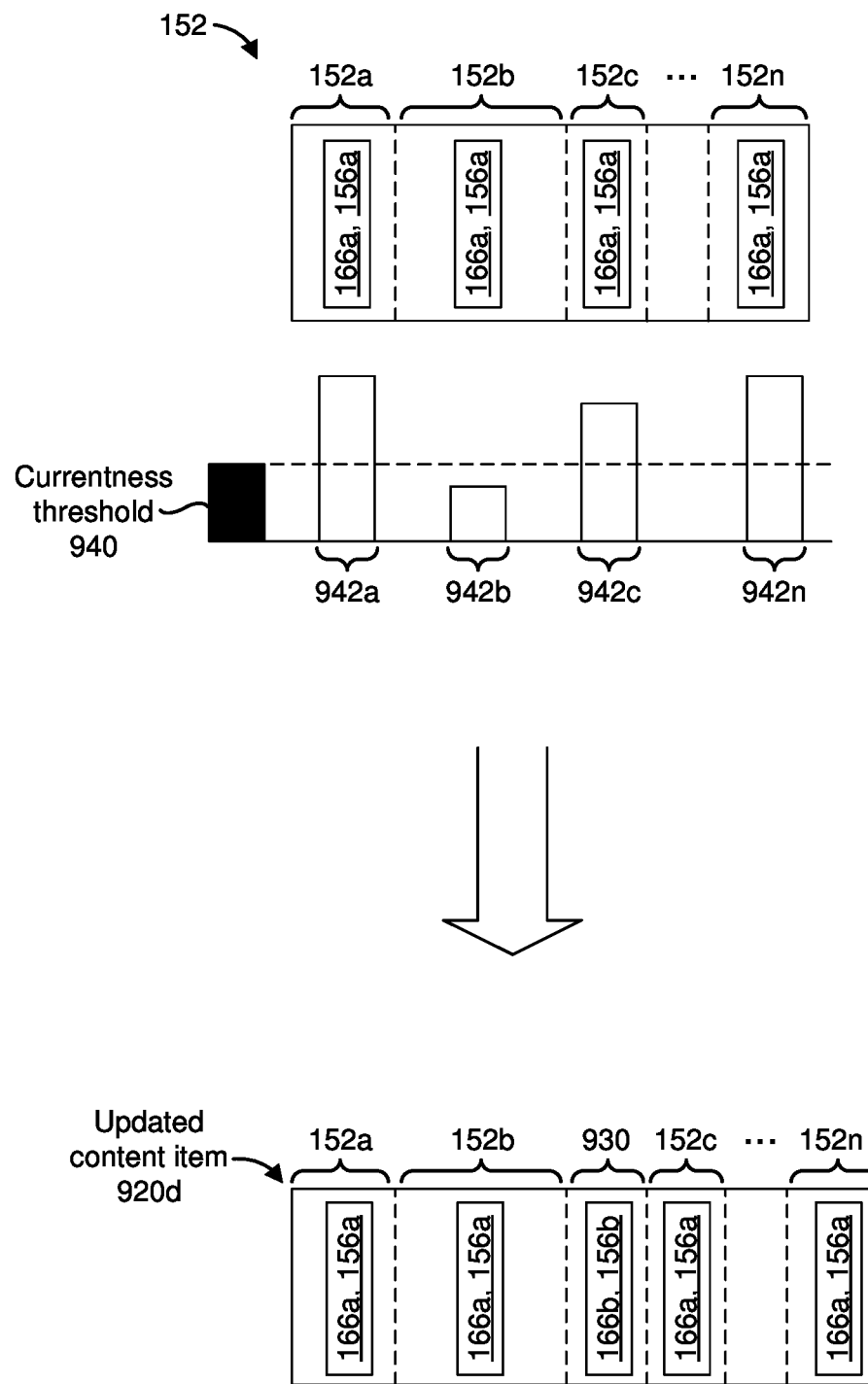

Referring to FIG. 9F, in some implementations, the content updating engine 900 generates an updated media content item 920d by including an additional portion 930 from another media content item. In some implementations, the content updating engine 900 inserts the additional portion 930 after (e.g., immediately after) the portion that breaches the currentness threshold 940. For example, as shown in FIG. 9F, the content updating engine 900 inserts the additional portion 930 immediately after the second portion 152b that breaches the currentness threshold 940. In some implementations, the content updating engine 900 inserts the additional portion 930 before (e.g., immediately before) the portion that breaches the currentness threshold 940.

In some implementations, the additional portion 930 provides information that supplements the second portion 152b. For example, in some implementations, the content updating engine 900 determines that the second portion 152b provides insufficient information regarding a subtopic, and the additional portion 930 provides additional information regarding the subtopic in order to account for the insufficiency of the second portion 152b. In some implementations, the additional portion 930 provides more details regarding the information provided by the second portion 152b. In some implementations, the additional portion 930 corrects incorrect information found in the second portion 152b. In some implementations, the additional portion 930 clarifies unclear information in the second portion 152b.

In some implementations, the additional portion 930 is from another media content provider. For example, in some implementations, the media content item 152 is from the first media content provider 166a (e.g., a first author, a first producer, a first director, a first artist, a first person, a first bot, etc.) and the additional portion 930 is from the second media content provider 166b that is different from the first media content provider 166a (e.g., a second author, a second producer, a second director, a second artist, a second person, a second bot, etc.).

In some implementations, the additional portion 930 is associated with a different content delivery medium than the media content item 152. For example, in some implementations, the media content item 152 is associated with the first content delivery medium 156a, and the additional portion 930 is associated with the second content delivery medium 156b that is different from the first content delivery medium 156a. In some implementations, the first content delivery medium 156a includes visual delivery, and the second content delivery medium 156b includes aural delivery. In some implementations, the first content delivery medium 156a includes a first type of visual delivery (e.g., video delivery, for example, a documentary movie), and the second content delivery medium 156b includes a second type of visual delivery (e.g., textual delivery, for example, a portion of an ebook).

Figure 10:
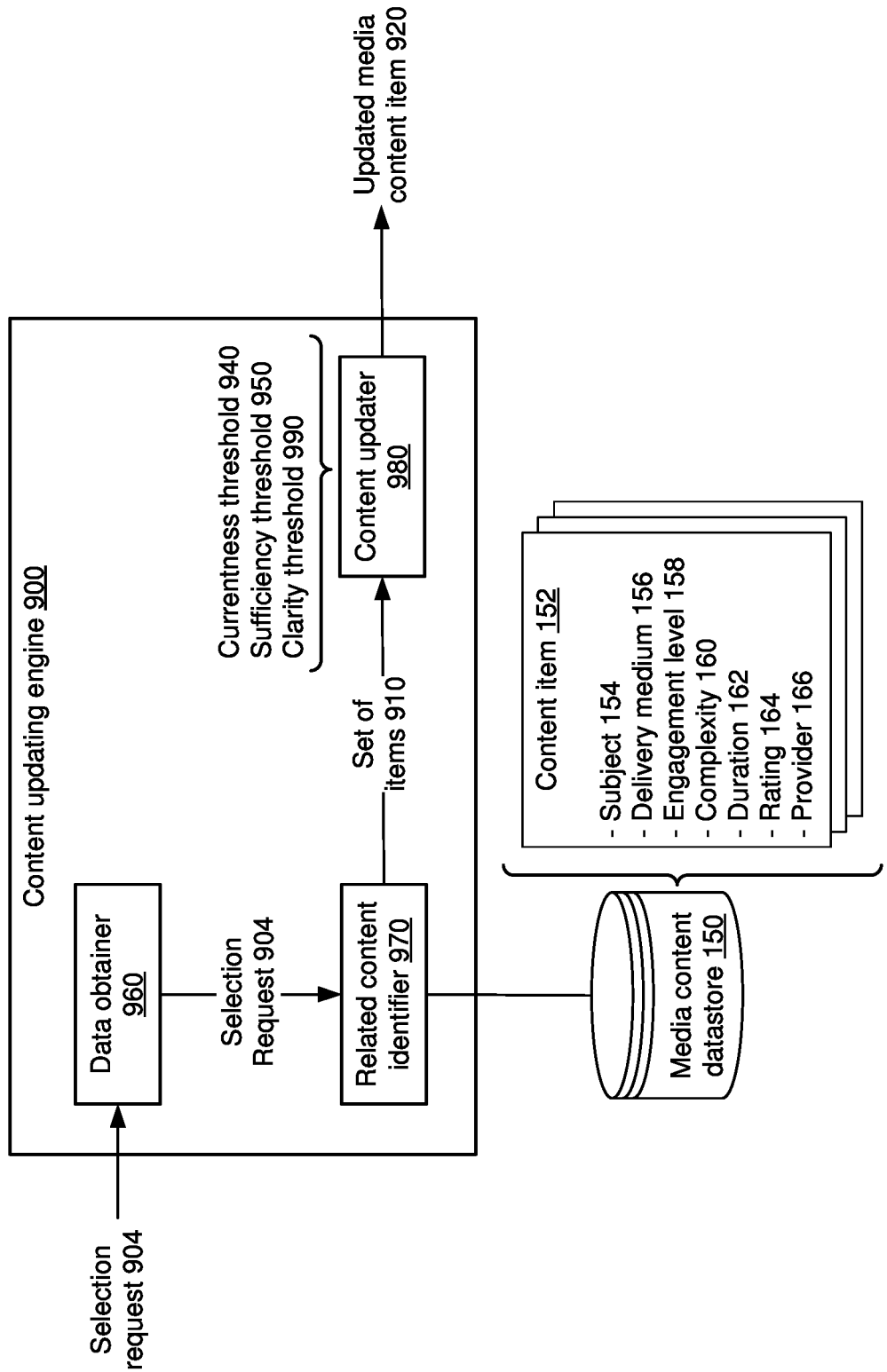
FIG. 10 is a block diagram of a content updating engine in accordance with some implementations.

FIG. 10 is a block diagram of the content updating engine 900 in accordance with some implementations. In various implementations, the content updating engine 900 includes a data obtainer 960, a related content identifier 970 and a content updater 980. In various implementations, the data obtainer 960 obtains the selection request 904. For example, in some implementations, the data obtainer 960 receives the selection request 904 from the electronic device 30. The data obtainer 960 provides the selection request 904 or an indication of the selected media content item 152 to the related content identifier 970.

In various implementations, the related content identifier 970 identifies the set of items 910 that provide information regarding the same subject as the media content item 152 specified in the selection request 904. In some implementations, the related content identifier 970 generates the set of items 910 by identifying media content items 152 with content subjects 154 that match the subject of the media content item 152 specified by the selection request 904. In some implementations, the related content identifier 970 generates the set of items 910 by filtering out media content items 152 that do not provide information regarding the same subject as the media content item 152 specified by the selection request 904.

In some implementations, the related content identifier 970 identifies the set of items 910 based on contextual data (e.g., the contextual data 174 shown in FIGS. 1A-2, 5A and 6). In some implementations, the set of items 910 includes media content items 152 that are contextually relevant to a context indicated by the contextual data 174. In some implementations, the related content identifier 970 generates the set of items 910 by filtering out media content items 152 that are not contextually relevant to the context indicated by the contextual data 174.

In some implementations, the related content identifier 970 utilizes a set of media content filters (e.g., the media content filters 110 shown in FIG. 2) to identify the set of items 910. In some implementations, the related content identifier 970 determines filter values (e.g., the filter values 130 shown in FIG. 2) for the set of media content filters based on the contextual data 174. To that end, in various implementations, the related content identifier 970 performs the operations described with respect to the filter value determiner 104 (shown in FIG. 2) to identify the set of items 910.

In some implementations, the set of items 910 includes two or more media content items 152. In some implementations, the media content items 152 in the set of items 910 utilize different content delivery mediums to provide the information regarding the same subject as the media content item 152 indicated by the selection request 904. For example, in some implementations, one media content item 152 in the set of items 910 utilizes textual delivery (e.g., the fifteenth media content item 152-15 shown in FIG. 5B), whereas another media content item 152 in the set of items 510 utilizes video delivery (e.g., the second media content item 152-2 shown in FIG. 5B).

In various implementations, the content updater 980 updates (e.g., modifies) the media content item 152 identified by the selection request 904 based on the set of items 910. In some implementations, the content updater 980 updates the media content item 152 by including an indicator (e.g., the indicator 922 shown in FIG. 9B) in the media content item 152 in order to indicate that a portion of the media content item 152 is not current (e.g., inaccurate or out-of-date). In some implementations, the content updater 980 updates the media content item 152 by modifying a visual property (e.g., the visual property 926 shown in FIG. 9C) of a portion of the media content item 152 in order to indicate a deficiency with the portion of the media content item 152. In some implementations, the content updater 980 updates the media content item 152 by removing a portion of the media content item 152 (e.g., as shown in FIG. 9D). In some implementations, the content updater 980 updates the media content item 152 by replacing a portion of the media content item 152 (e.g., as shown in FIG. 9E). In some implementations, the content updater 980 updates the media content item 152 by including an additional portion in the media content item 152 (e.g., as shown in FIG. 9F).

In various implementations, the content updater 980 performs currentness analysis on portions of the media content item 152 indicated by the selection request 904 in order to identify portions that breach the currentness threshold 940. In some implementations, portions of the media content item 152 that breach the currentness threshold 940 are less likely to be current. In some implementations, portions of the media content item 152 that breach the currentness threshold 940 are more likely to provide outdated information. In some implementations, portions of the media content item 152 that breach the currentness threshold 940 are more likely to provide inaccurate information.

In some implementations, the content updater 980 determines a respective currentness score for each portion of the media content item 152 specified by the selection request 904. In some implementations, a portion of the media content item 152 breaches the currentness threshold 940 when the currentness score for the portion is less than the currentness threshold 940. For example, as shown in FIG. 9B, the second portion 152b of the media content item 152 breaches the currentness threshold 940 because the second currentness score 942b is less than the currentness threshold 940. In some implementations, a portion of the media content item 152 satisfies the currentness threshold 940 when the currentness score for the portion is greater than the currentness threshold 940. For example, as shown in FIG. 9B, the first portion 152a, the third portion 152c and the nth portion 152n of the media content item 152 satisfy the currentness threshold 940 because their respective currentness scores 942a, 942c and 942n, respectively, are greater than the currentness threshold 940.

In some implementations, the content updater 980 includes an indicator (e.g., the indicator 922 shown in FIG. 9B) in the updated media content item 920 in order to indicate that a portion of the media content item 152 specified by the selection request 904 breaches the currentness threshold 940. In some implementations, the content updater 980 modifies a visual property (e.g., the visual property 926 shown in FIG. 9C) of the portion of the media content item 152 that breaches the currentness threshold 940 in order to indicate that the portion breaches the currentness threshold 940. In some implementations, the content updater 980 removes (e.g., deletes) the portion of the media content item 152 that breaches the currentness threshold 940 in order to avoid presenting information that is not current (e.g., as illustrated in FIG. 9D). In some implementations, the content updater 980 replaces the portion of the media content item 152 that breaches the currentness threshold 940 with a portion of another media content item 152 (e.g., the replacement portion 928 shown in FIG. 9E) that satisfies the currentness threshold 940. In some implementations, the content updater 980 includes an additional portion (e.g., the additional portion 930 shown in FIG. 9F) in the media content item 152 in order to generate the updated media content item 920.

In various implementations, the content updater 980 performs sufficiency analysis on portions of the media content item 152 indicated by the selection request 904 in order to identify portions that breach a sufficiency threshold 950. In some implementations, portions of the media content item 152 that breach the sufficiency threshold 950 are less likely to provide sufficient information regarding a subject to which the media content item 152 is directed. In some implementations, portions of the media content item 152 that satisfy the sufficiency threshold 950 are more likely to provide sufficient information regarding the subject to which the media content item 152 is directed.

In some implementations, the content updater 980 determines a respective sufficiency score for each portion of the media content item 152 specified by the selection request 904. In some implementations, a portion of the media content item 152 breaches the sufficiency threshold 950 when the sufficiency score for the portion is less than the sufficiency threshold 950. In some implementations, a portion of the media content item 152 satisfies the sufficiency threshold 950 when the sufficiency score for the portion is greater than the sufficiency threshold 950.

In some implementations, the content updater 980 removes (e.g., deletes) the portion of the media content item 152 that breaches the sufficiency threshold 950 in order to avoid presenting information that is insufficient (e.g., deficient). In some implementations, the content updater 980 replaces the portion of the media content item 152 that breaches the sufficiency threshold 950 with a portion of another media content item 152 (e.g., the replacement portion 928 shown in FIG. 9E) that satisfies the sufficiency threshold 950. In some implementations, the content updater 980 includes an additional portion (e.g., the additional portion 930 shown in FIG. 9F) in the media content item 152 in order to compensate for the insufficient portion in the media content item 152.

In various implementations, the content updater 980 performs clarity analysis on portions of the media content item 152 indicated by the selection request 904 in order to identify portions that breach a clarity threshold 990. In some implementations, portions of the media content item 152 that breach the clarity threshold 990 are less likely to be clear. In some implementations, portions of the media content item 152 that satisfy the clarity threshold 990 are more likely to be clear.

In some implementations, the content updater 980 obtains user input from various users regarding clarity of different portions of the media content item 152. In some implementations, the content updater 980 determines that a particular portion of the media content item 152 is unclear, if a number of users reporting that the particular portion is unclear exceeds the clarity threshold 990. In some implementations, the content updater 980 determines that a particular portion of the media content item 152 is clear, if a number of users reporting that the particular portion is unclear is below the clarity threshold 990.

In some implementations, the content updater 980 determines a respective clarity score for each portion of the media content item 152 specified by the selection request 904. In some implementations, a portion of the media content item 152 breaches the clarity threshold 990 when the clarity score for the portion is less than the clarity threshold 990. In some implementations, a portion of the media content item 152 satisfies the clarity threshold 990 when the clarity score for the portion is greater than the clarity threshold 990.

In some implementations, the content updater 980 removes (e.g., deletes) the portion of the media content item 152 that breaches the clarity threshold 990 in order to avoid presenting information that is unclear. In some implementations, the content updater 980 replaces the portion of the media content item 152 that breaches the clarity threshold 990 with a portion of another media content item (e.g., the replacement portion 928 shown in FIG. 9E) that satisfies the clarity threshold 990. In some implementations, the content updater 980 includes an additional portion (e.g., the additional portion 930 shown in FIG. 9F) in the media content item 152 in order to compensate for the unclear portion in the media content item 152.

Figure 11:
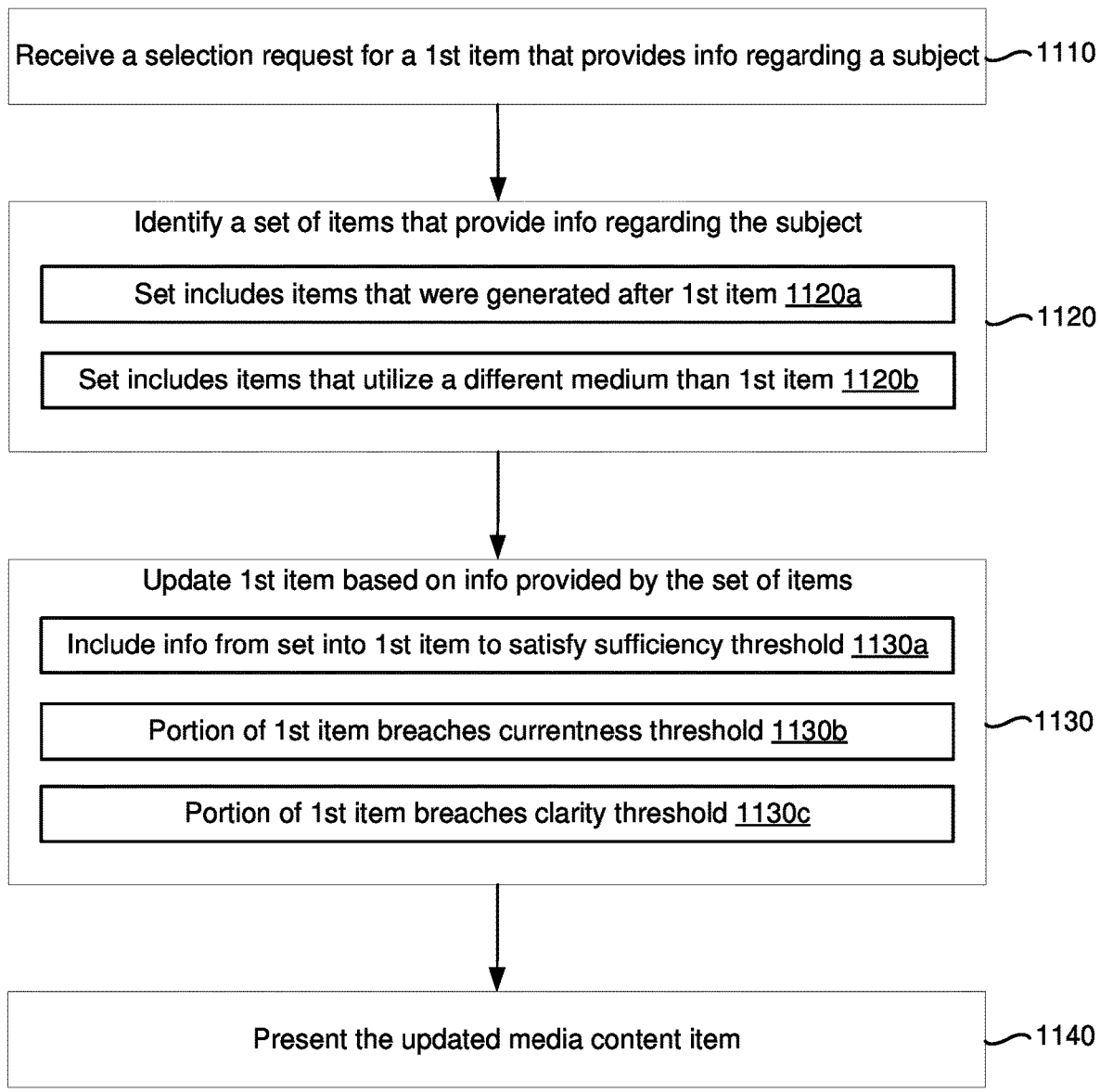
FIG. 11 is a flowchart representation of a method of updating a media content item in accordance with some implementations.

FIG. 11 is a flowchart representation of a method 1100 of updating a media content item. In various implementations, the method 1100 is performed by a device with a non-transitory memory and one or more processors coupled with the non-transitory memory (e.g., the electronic device 30 and/or the content updating engine 900 shown in FIG. 9A). In some implementations, the method 1100 is performed by processing logic, including hardware, firmware, software, or a combination thereof. In some implementations, the method 1100 is performed by a processor executing code stored in a non-transitory computer-readable medium (e.g., a memory).

As represented by block 1110, in some implementations, the method 1100 includes receiving a selection request for a first media content item that includes information about a subject. In some implementations, the first media content item is generated by a first media content provider. For example, as shown in FIG. 9A, the content updating engine 900 receives the selection request 904 from the electronic device 30. As described herein, in some implementations, the selection request 904 specifies a particular media content item 152 that the user 20 wants to access.

As represented by block 1120, in some implementations, the method 1100 includes identifying a set of media content items that provides information about the subject. In some implementations, at least a portion of the set of media content items is generated by a second media content provider that is different from the first media content provider. For example, as shown in FIG. 10, the related content identifier 970 identifies the set of items 910 that provides information regarding the same subject as the media content item 152 specified in the selection request 904. As described herein, the set of items 910 includes a media content item 152 that is provided by a different media content provider 166 than the media content item 152 specified in the selection request 904.

As represented by block 1120a, in some implementations, the first media content item was generated at a first time, and the set of media content items includes a second media content item that was generated at a second time that is after the first time. For example, the first media content item includes a book that was written in 1950, and the second media content item is a book that was written in 2010.

As represented by block 1120b, in some implementations, the first media content item is associated with a first content delivery medium, and the set of media content items includes a second media content item that is associated with a second content delivery medium that is different from the first content delivery medium. For example, in some implementations, the first media content item utilizes visual delivery (e.g., the first media content item includes a book or a video), and the second media content item utilizes aural delivery (e.g., the second media content item includes an audio recording such as a podcast).

As represented by block 1130, in some implementations, the method 1100 includes updating the first media content item based on the information provided by the set of media content items in order to generate an updated first media content item. For example, as shown in FIGS. 9A and 10, the content updating engine 900 (e.g., the content updater 980) updates the media content item 152 specified by the selection request 904 based on the set of items 910 in order to generate the updated media content item 920.

As represented by block 1130a, in some implementations, the method 1100 includes determining that the first media content item breaches a sufficiency threshold. In some implementations, updating the first media content item includes incorporating a portion of information from the set of media content items into the first media content item in order to satisfy the sufficiency threshold. In some implementations, the method 1100 includes determining that the first media content item lacks information regarding a subtopic, and incorporating information regarding the subtopic from the set of media content items into the first media content item. For example, if a book on the Civil War lacks sufficient information regarding muskets and the user is interested in learning about weapons that were used during the Civil War, then the content updating engine 900 incorporates a relevant portion from a video about muskets.

As represented by block 1130b, in some implementations, the method 1100 includes determining, based on the set of media content items, that a portion of information in the first media content item breaches a currentness threshold. For example, as shown in FIG. 9B, the content updating engine 900 determines that the second currentness score 942b for the second portion 152b of the media content item 152 is below the currentness threshold 940.

In some implementations, the method 1100 includes displaying an indicator in association with the portion of information in order to indicate that the portion of information is not current. For example, as shown in FIG. 9B, the updated media content item 920 includes the indicator 922 in order to indicate that the second portion 152b of the media content item 152 is not current.

In some implementations, the method 1100 includes modifying a visual property of the portion of the media content item. For example, as shown in FIG. 9C, the content updating engine 900 modifies the visual property 926 of the second portion 152b of the media content item 152 in order to indicate that the second portion 152b is not current. For example, in some implementations, the content updating engine 900 displays an "X" through the portion of the media content item 152 in order to indicate that the portion is not current. In some implementations, the method 1100 includes graying-out the portion of the media content item in order to indicate that the portion is not current.

In some implementations, the method 1100 includes forgoing displaying the portion of information that breaches the currentness threshold. For example, as shown in FIG. 9D, the content updating engine 900 removes the second portion 152b from the media content item 152 so that the updated media content item 920 does not include the second portion 152b.

In some implementations, the method 1100 includes replacing the portion of information in the first media content item that breaches the currentness threshold with a portion of information from the set of media content items that satisfies the currentness threshold. For example, in some implementations, the method 1100 includes determining that a portion of the first media content item includes information that is outdated, and replacing the outdated information with up-to-date information from another media content item. For example, as illustrated in FIG. 9E, in some implementations, the content updating engine 900 replaces the second portion 152b with the replacement portion 928.

In some implementations, the currentness threshold specifies a threshold age, and determining that the portion of information breaches the currentness threshold includes determining that an age of the first media content item is greater than the threshold age. For example, if the threshold age is 100 years and the portion of information is 120 years old then the content updating engine 900 determines that the portion of information is outdated. In some implementations, the threshold age is a function of the subject. For example, for media content items related to the Civil War, the threshold age may be greater than the threshold age for media content items related to the moon landing.

In some implementations, determining that the portion of information breaches the currentness threshold includes determining that the portion of information is inaccurate.

In some implementations, determining that the portion of information breaches the currentness threshold includes determining that the portion of information has been disavowed (e.g., debunked or rejected) by at least a portion of the set of media content items.

As represented by block 1130c, in some implementations, the method 1100 includes identifying, based on user feedback, a portion of the first media content item that breaches a clarity threshold (e.g., the clarity threshold 990 shown in FIG. 10). For example, in some implementations, the method 1100 includes identifying, based on feedback from other users, a portion of the first media content item that is unclear. In some implementations, the method 1100 includes modifying the portion of the first media content item in order to satisfy the clarity threshold. For example, in some implementations, the method 1100 includes replacing the portion of the first media content item with a portion from another media content item that satisfies the clarity threshold. In some implementations, the method 1100 includes modifying the portion of the media content item to make the portion clearer. In some implementations, the method 1100 includes collecting the user feedback from a plurality of devices that previously presented the first media content item to their respective users. In some implementations, the method 1100 includes receiving a user input specifying the user feedback.

In some implementations, the first media content provider includes a first authoring entity (e.g., a first human writer or a first bot writer) and the second media content provider includes a second authoring entity (e.g., a second human writer or a second bot writer).

In some implementations, the first media content provider includes a first publishing entity (e.g., a first publisher, for example, a first publishing company) and the second media content provider includes a second publishing entity (e.g., a second publisher, for example, a second publishing company).

Figure 12:
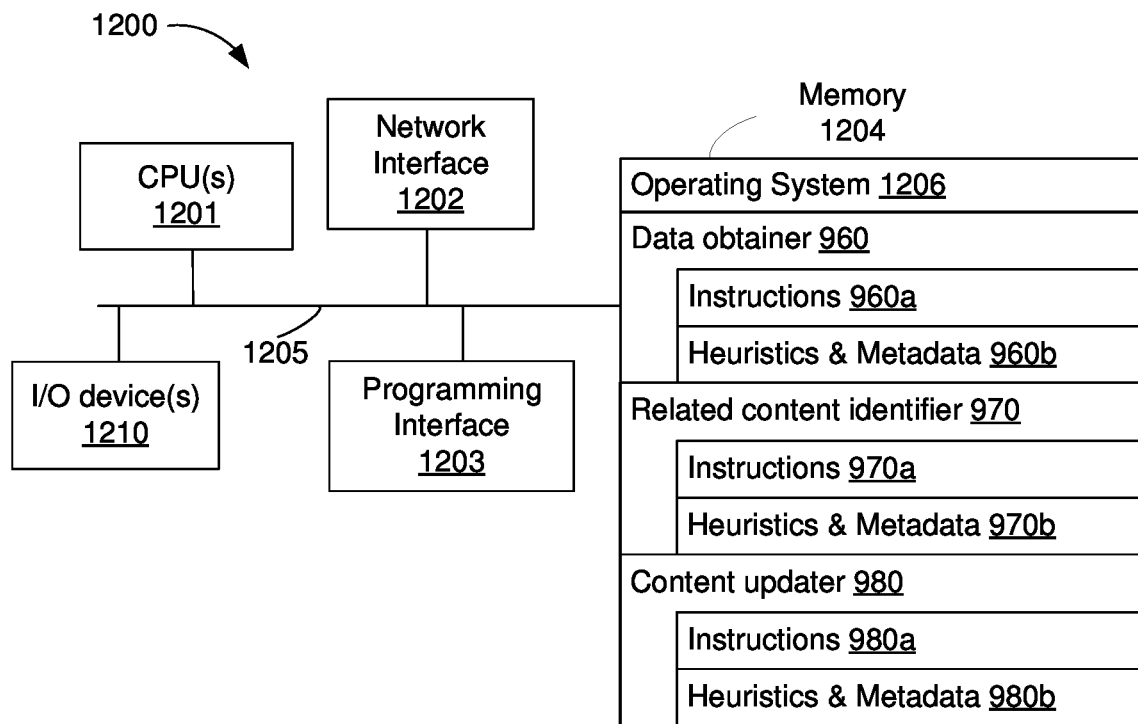
FIG. 12 is a block diagram of a device that updates a media content item in accordance with some implementations.

FIG. 12 is a block diagram of a device 1200 that updates a media content item in accordance with some implementations. In some implementations, the device 1200 implements the electronic device 30 and/or the content updating engine 900 shown in FIG. 9A. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 1200 includes one or more processing units (CPUs) 1201, a network interface 1202, a programming interface 1203, a memory 1204, one or more input/output (I/O) devices 1210, and one or more communication buses 1205 for interconnecting these and various other components.

In some implementations, the network interface 1202 is provided to, among other uses, establish and maintain a metadata tunnel between a cloud hosted network management system and at least one private network including one or more compliant devices. In some implementations, the one or more communication buses 1205 include circuitry that interconnects and controls communications between system components. The memory 1204 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 1204 optionally includes one or more storage devices remotely located from the one or more CPUs 1201. The memory 1204 comprises a non-transitory computer readable storage medium.

In some implementations, the memory 1204 or the non-transitory computer readable storage medium of the memory 1204 stores the following programs, modules and data structures, or a subset thereof including an optional operating system 1206, the data obtainer 960, the related content identifier 970 and the content updater 980. In various implementations, the device 1200 performs the method 1100 shown in FIG. 11.

In some implementations, the data obtainer 960 obtains a selection request specifying a media content item that a user wants to access (e.g., the selection request 904 shown in FIGS. 9A and 10). In some implementations, the data obtainer 960 performs the operation(s) represented by block 1110 in FIG. 11. To that end, the data obtainer 960 includes instructions 960a, and heuristics and metadata 960b.

In some implementations, the related content identifier 970 identifies a set of one or more media content items that provide information regarding the same subject as the media content item specified by the selection request (e.g., the set of items 910 shown in FIGS. 9A and 10). In some implementations, the related content identifier 970 performs the operations(s) represented by block 1120 shown in FIG. 11. To that end, the related content identifier 970 includes instructions 970a, and heuristics and metadata 970b.

In some implementations, the content updater 980 updates the media content item requested by the user based on the set of items identified by the related content identifier 970 in order to generate an updated media content item (e.g., the updated media content item 920 shown in FIGS. 9A and 10). In some implementations, the content updater 980 performs the operation(s) represented by block 1130 shown in FIG. 11. To that end, the content updater 980 includes instructions 980a, and heuristics and metadata 980b.

In some implementations, the one or more I/O devices 1210 include one or more input devices for receiving a selection request (e.g., the selection request 904 shown in FIGS. 9A and 10). For example, in some implementations, the one or more I/O devices 1210 include a touchscreen display, a keyboard, a mouse or a microphone. In some implementations, the one or more I/O devices 1210 include a display, a speaker and/or a haptic device (e.g., a vibrational device that generates vibrations) for presenting the updated media content item (e.g., for presenting the updated media content item 920 shown in FIGS. 9A and 10).

Various processes defined herein consider the option of obtaining and utilizing a user's personal information. For example, such personal information may be utilized in order to provide an improved privacy screen on an electronic device. However, to the extent such personal information is collected, such information should be obtained with the user's informed consent. As described herein, the user should have knowledge of and control over the use of their personal information.

Personal information will be utilized by appropriate parties only for legitimate and reasonable purposes. Those parties utilizing such information will adhere to privacy policies and practices that are at least in accordance with appropriate laws and regulations. In addition, such policies are to be well-established, user-accessible, and recognized as in compliance with or above governmental/industry standards. Moreover, these parties will not distribute, sell, or otherwise share such information outside of any reasonable and legitimate purposes.

Users may, however, limit the degree to which such parties may access or otherwise obtain personal information. For instance, settings or other preferences may be adjusted such that users can decide whether their personal information can be accessed by various entities. Furthermore, while some features defined herein are described in the context of using personal information, various aspects of these features can be implemented without the need to use such information. As an example, if user preferences, account names, and/or location history are gathered, this information can be obscured or otherwise generalized such that the information does not identify the respective user.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including a display, a non-transitory memory and one or more processors coupled with the display and the non-transitory memory:
   obtaining a user focus indicator value that is associated with a subject;
   determining a plurality of filter values for a respective set of media content filters based on the subject and contextual data associated with the device or a user of the device, wherein the contextual data indicates a learning style of the user and the plurality of filter values includes a value for a content engagement level filter that is set based on the learning style of the user;
   delivering, based on a first combination of the plurality of filter values, a first set of one or more media content items that are associated with a first combination of content delivery mediums, wherein the first set of one or more media content items is selected from a plurality of media content items that provide information about the subject; and
   delivering, based on a second combination of the plurality of filter values that is different from the first combination of the plurality of filter values, a second set of one or more media content items that are associated with a second combination of content delivery mediums that is different from the first combination of content delivery mediums, wherein the second set of one or more media content items is selected from the plurality of media content items, wherein the second set is different from the first set.

2. The method of claim 1, wherein the first combination of content delivery mediums includes a first combination of visual delivery, audio delivery or tactile delivery, and the second combination of content delivery mediums includes a second combination of visual delivery, audio delivery or tactile delivery.

3. The method of claim 2, wherein the visual delivery includes displaying text, a still image or a video.

4. The method of claim 2, wherein the audio delivery includes playing an audiobook, a podcast, a song or an audio portion of a video.

5. The method of claim 2, wherein the tactile delivery includes generating vibrations or providing tactile feedback.

6. The method of claim 1, wherein determining the plurality of filter values comprises setting a value of a content delivery medium filter to visual delivery when the learning style of the user corresponds to a visual learner.

7. The method of claim 1, wherein determining the plurality of filter values comprises setting a value of a content delivery medium filter to audio delivery when the learning style of the user corresponds to an auditory learner.

8. The method of claim 1, wherein determining the plurality of filter values comprises setting the value of the content engagement level filter to a value that is less than a threshold engagement level when the learning style of the user corresponds to a passive learner.

9. The method of claim 1, wherein determining the plurality of filter values comprises setting the value of the content engagement level filter to a value that is greater than a threshold engagement level when the learning style of the user corresponds to an active learner.

10. The method of claim 1, wherein the contextual data indicates other devices that are proximate to the device.

11. The method of claim 1, wherein determining the plurality of filter values comprises setting a value of a content delivery medium filter to visual delivery when the contextual data indicates that there is a television within a threshold viewing distance of the user.

12. The method of claim 1, wherein determining the plurality of filter values comprises setting a value of a content delivery medium filter to tactile delivery when the contextual data indicates that there is a tactile device within a threshold tactile distance of the user.

13. The method of claim 1, wherein determining the plurality of filter values comprises setting a value of a content delivery medium filter to audio delivery when the contextual data indicates that there is a speaker within a threshold auditory distance of the user.

14. The method of claim 1, wherein determining the plurality of filter values comprises setting a value of a content delivery medium filter based on a time of day.

15. The method of claim 1, wherein determining the plurality of filter values comprises setting a value of a content delivery medium filter based on a location of the device.

16. The method of claim 1, wherein determining the plurality of filter values comprises setting a value of a content delivery medium filter based on a user preference for a particular content delivery medium.

17. The method of claim 1, further comprising converting a first media content item from a first content delivery medium to a second content delivery medium based on the contextual data.

18. A non-transitory memory storing one or more programs, which, when executed by one or more processors of a device, cause the device to:
obtain a user focus indicator value that is associated with a subject;
determine a plurality of filter values for a respective set of media content filters based on the subject and contextual data associated with the device or a user of the device, wherein the contextual data indicates a learning style of the user and the plurality of filter values includes a value for a content engagement level filter that is set based on the learning style of the user;
deliver, based on a first combination of the plurality of filter values, a first set of one or more media content items that are associated with a first combination of content delivery mediums, wherein the first set of one or more media content items is selected from a plurality of media content items that provide information about the subject; and
deliver, based on a second combination of the plurality of filter values that is different from the first combination of the plurality of filter values, a second set of one or more media content items that are associated with a second combination of content delivery mediums that is different from the first combination of content delivery mediums, wherein the second set of one or more media content items is selected from the plurality of media content items, wherein the second set is different from the first set.

19. A device comprising:
one or more processors;
a non-transitory memory;
one or more displays; and
one or more programs stored in the non-transitory memory, which, when executed by the one or more processors, cause the device to:
obtain a user focus indicator value that is associated with a subject;
determine a plurality of filter values for a respective set of media content filters based on the subject and contextual data associated with the device or a user of the device wherein the contextual data indicates a learning style of the user and the plurality of filter values includes a value for a content engagement level filter that is set based on the learning style of the user;
deliver, based on a first combination of the plurality of filter values, a first set of one or more media content items that are associated with a first combination of content delivery mediums, wherein the first set of one or more media content items is selected from a plurality of media content items that provide information about the subject; and
deliver, based on a second combination of the plurality of filter values that is different from the first combination of the plurality of filter values, a second set of one or more media content items that are associated with a second combination of content delivery mediums that is different from the first combination of content delivery mediums, wherein the second set of one or more media content items is selected from the plurality of media content items, wherein the second set is different from the first set.

20. The non-transitory memory of claim 18, wherein the first combination of content delivery mediums includes a first combination of visual delivery, audio delivery or tactile delivery, and the second combination of content delivery mediums includes a second combination of visual delivery, audio delivery or tactile delivery.

21. The non-transitory memory of claim 18, wherein determining the plurality of filter values comprises setting a value of a content delivery medium filter to visual delivery when the learning style of the user corresponds to a visual learner.

22. The non-transitory memory of claim 18, wherein determining the plurality of filter values comprises setting the value of the content engagement level filter to a value that is less than a threshold engagement level when the learning style of the user corresponds to a passive learner.

23. The non-transitory memory of claim 18, wherein determining the plurality of filter values comprises setting a value of a content delivery medium filter to visual delivery when the contextual data indicates that there is a television within a threshold viewing distance of the user.

24. The non-transitory memory of claim 18, wherein determining the plurality of filter values comprises setting a value of a content delivery medium filter based on a location of the device.

25. The device of claim 19, wherein determining the plurality of filter values comprises setting a value of a content delivery medium filter to audio delivery when the learning style of the user corresponds to an auditory learner.

26. The device of claim 19, wherein determining the plurality of filter values comprises setting the value of the content engagement level filter to a value that is greater than a threshold engagement level when the learning style of the user corresponds to an active learner.

27. The device of claim 19, wherein determining the plurality of filter values comprises setting a value of a content delivery medium filter to audio delivery when the contextual data indicates that there is a speaker within a threshold auditory distance of the user.

28. The device of claim 19, wherein determining the plurality of filter values comprises setting a value of a content delivery medium filter based on a time of day.

29. The device of claim 19, wherein the one or more programs further cause the device to convert a first media content item from a first content delivery medium to a second content delivery medium based on the contextual data.

* * * * *